United States Patent
Okamoto et al.

(10) Patent No.: US 11,568,223 B2
(45) Date of Patent: Jan. 31, 2023

(54) NEURAL NETWORK CIRCUIT

(71) Applicant: Semiconductor Energy Laboratory Co., Ltd., Kanagawa-ken (JP)

(72) Inventors: Yuki Okamoto, Kanagawa (JP); Munehiro Kozuma, Kanagawa (JP); Yoshiyuki Kurokawa, Kanagawa (JP); Takayuki Ikeda, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 575 days.

(21) Appl. No.: 16/604,363

(22) PCT Filed: Apr. 2, 2018

(86) PCT No.: PCT/IB2018/052250
§ 371 (c)(1),
(2) Date: Oct. 10, 2019

(87) PCT Pub. No.: WO2018/189620
PCT Pub. Date: Oct. 18, 2018

(65) Prior Publication Data
US 2020/0160158 A1 May 21, 2020

(30) Foreign Application Priority Data
Apr. 14, 2017 (JP) .............................. JP2017-080355

(51) Int. Cl.
*G06F 7/50* (2006.01)
*G06F 7/523* (2006.01)
(Continued)

(52) U.S. Cl.
CPC .............. *G06N 3/063* (2013.01); *G06F 7/50* (2013.01); *G06F 7/523* (2013.01); *G06F 7/5443* (2013.01); *G06F 7/57* (2013.01)

(58) Field of Classification Search
CPC ........ G06N 3/063; G06N 3/08; G06N 3/0454; G06N 3/0481; G06N 3/0635;
(Continued)

(56) References Cited

U.S. PATENT DOCUMENTS

| 5,444,822 A | 8/1995 | Shinohara |
| 8,832,004 B2 | 9/2014 | Kato et al. |

(Continued)

FOREIGN PATENT DOCUMENTS

| JP | 06-052132 A | 2/1994 |
| JP | 06-274459 A | 9/1994 |

(Continued)

OTHER PUBLICATIONS

International Search Report re Application No. PCT/IB2018/052250, dated Jun. 12, 2018.
(Continued)

*Primary Examiner* — Emily E Larocque
*Assistant Examiner* — Huy Duong
(74) *Attorney, Agent, or Firm* — Husch Blackwell LLP

(57) ABSTRACT

A neural network circuit having a novel structure is provided.
A plurality of arithmetic circuits each including a register, a memory, a multiplier circuit, and an adder circuit are provided. The memory outputs different weight data in response to switching of a context signal. The multiplier circuit outputs multiplication data of the weight data and input data held in the register. The adder circuit performs a product-sum operation by adding the obtained multiplication data to data obtained by a product-sum operation in an adder circuit of another arithmetic circuit. The obtained product-sum operation data is output to an adder circuit of another arithmetic circuit, so that product-sum operations of different weight data and input data are performed.

12 Claims, 30 Drawing Sheets

(51) Int. Cl.
  *G06F 7/57* (2006.01)
  *G06F 7/544* (2006.01)
  *G06N 3/063* (2006.01)

(58) Field of Classification Search
  CPC ...... G06F 7/57–575; G06F 7/523; G06F 7/50; G06F 7/5443; G06F 17/16
  See application file for complete search history.

(56) References Cited

U.S. PATENT DOCUMENTS

| | | |
|---|---|---|
| 9,135,553 B2 | 9/2015 | Kato et al. |
| 10,141,069 B2 | 11/2018 | Ikeda et al. |
| 10,489,116 B1 * | 11/2019 | Esposito .................. G06F 7/57 |
| 2011/0239032 A1 | 9/2011 | Kato et al. |
| 2015/0324685 A1 | 11/2015 | Bohn et al. |
| 2016/0343452 A1 | 11/2016 | Ikeda et al. |
| 2017/0102921 A1 * | 4/2017 | Henry ..................... G06F 5/01 |
| 2018/0157465 A1 * | 6/2018 | Bittner .................... G06F 7/52 |
| 2018/0217962 A1 * | 8/2018 | Takahashi .............. G06N 5/046 |
| 2018/0300105 A1 * | 10/2018 | Langhammer .......... G06F 17/16 |
| 2019/0164620 A1 | 5/2019 | Ikeda et al. |

FOREIGN PATENT DOCUMENTS

| | | |
|---|---|---|
| JP | 2010-134697 A | 6/2010 |
| JP | 2016-219011 A | 12/2016 |
| WO | WO 2010/064728 A1 | 6/2010 |

OTHER PUBLICATIONS

Written Opinion re Application No. PCT/IB2018/052250, dated Jun. 12, 2018.

* cited by examiner

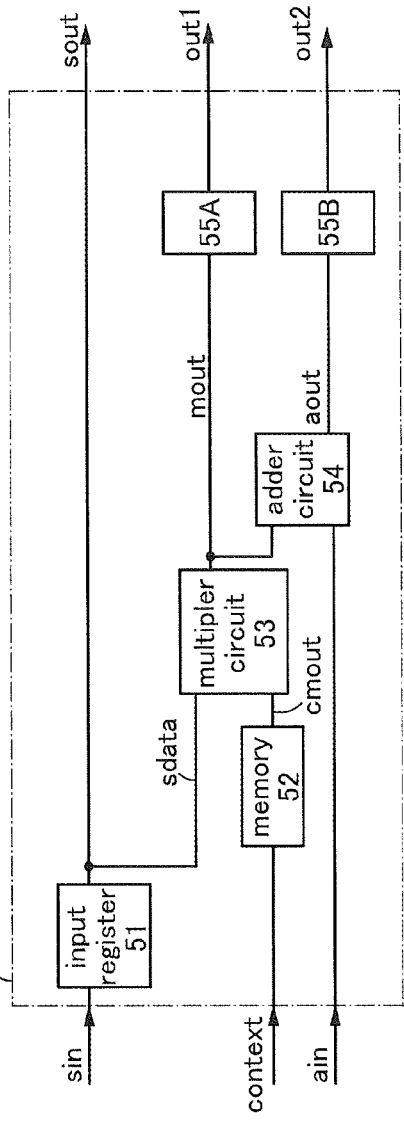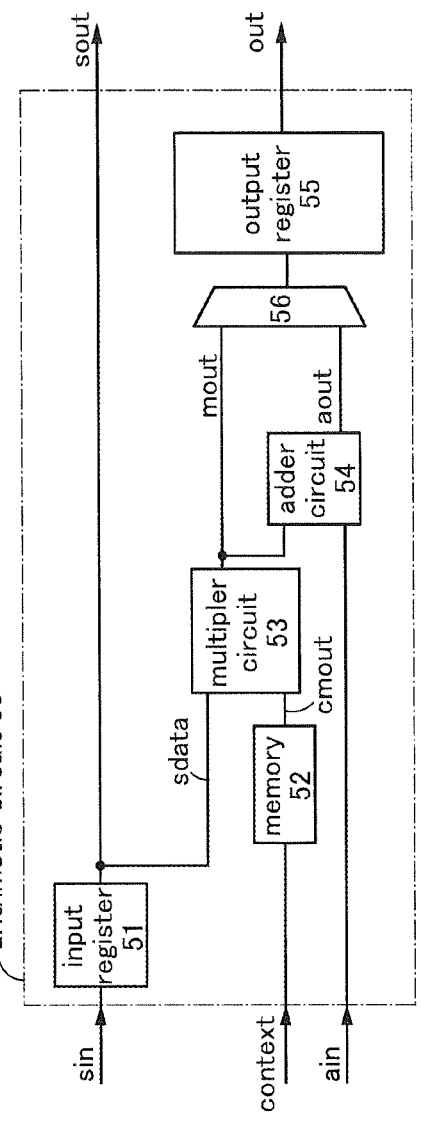

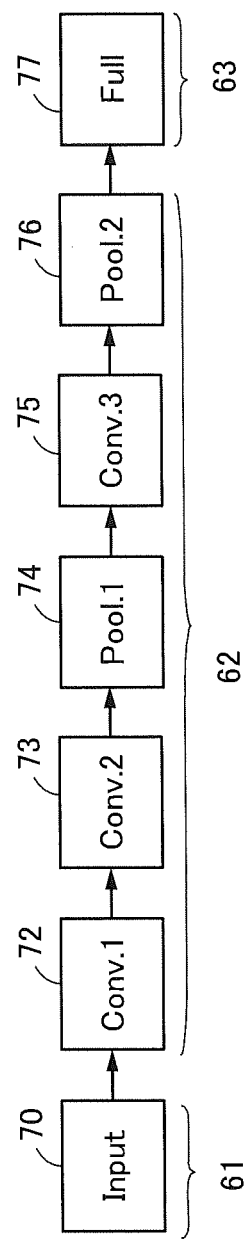
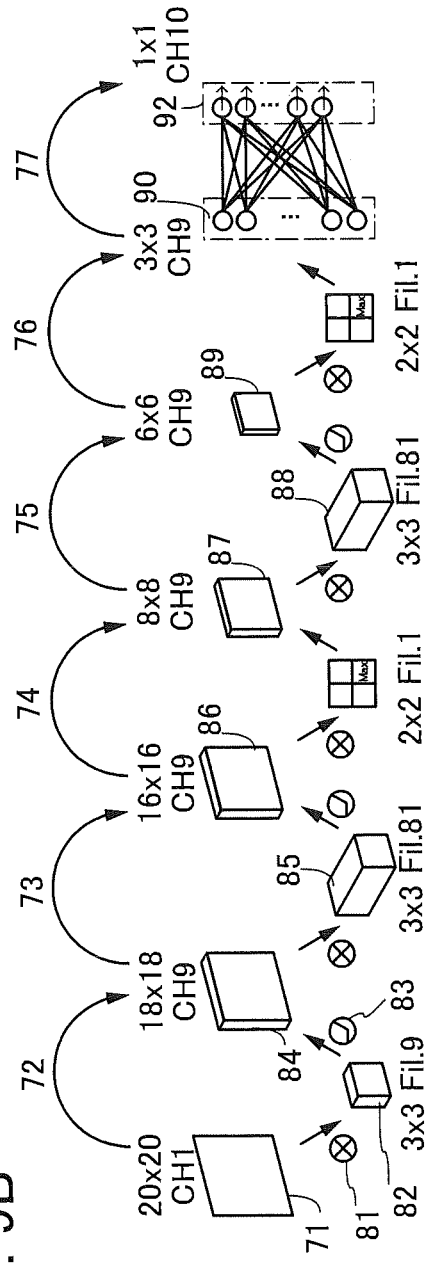
FIG. 9A
FIG. 9B

FIG. 13A  T0
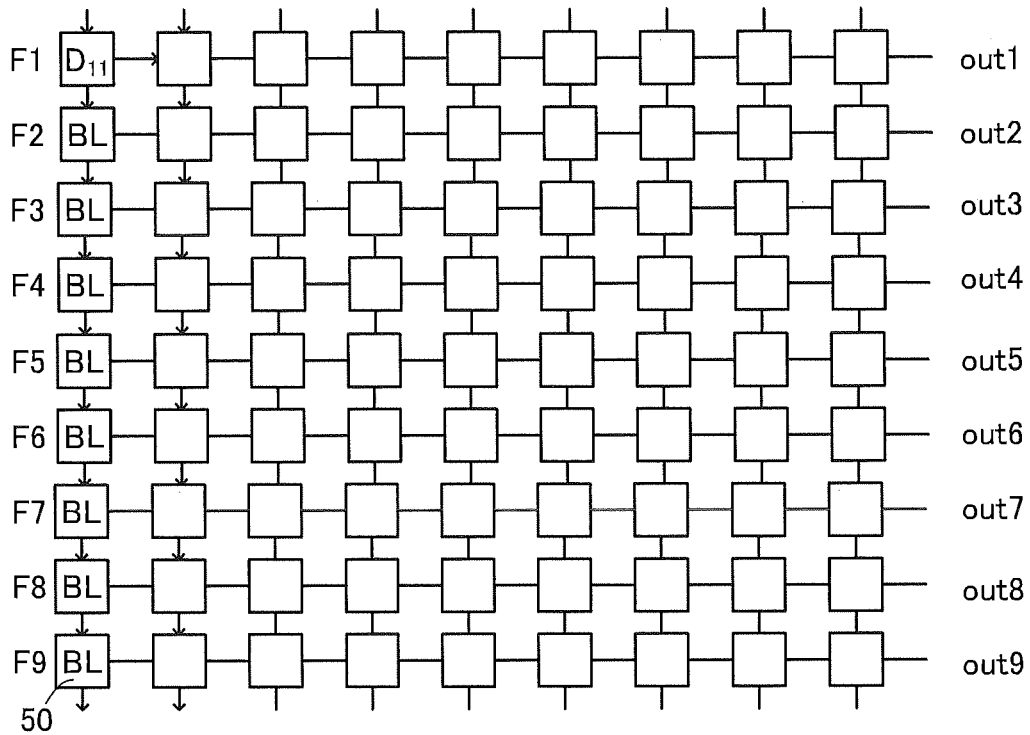
FIG. 13B  T1
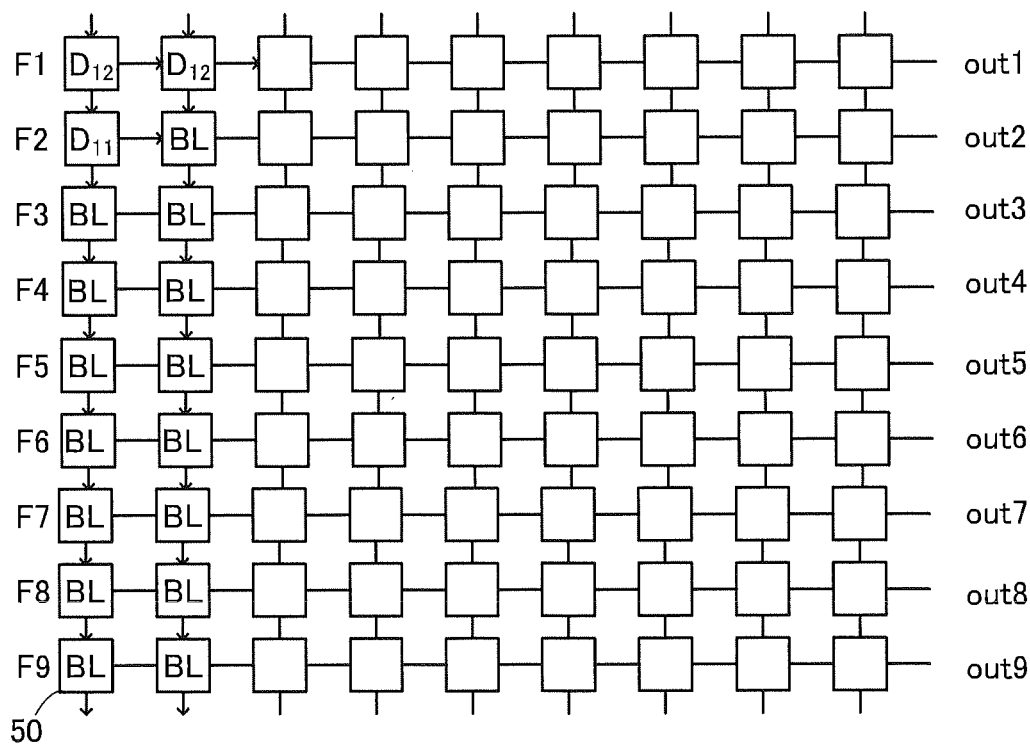

FIG. 14A  T2
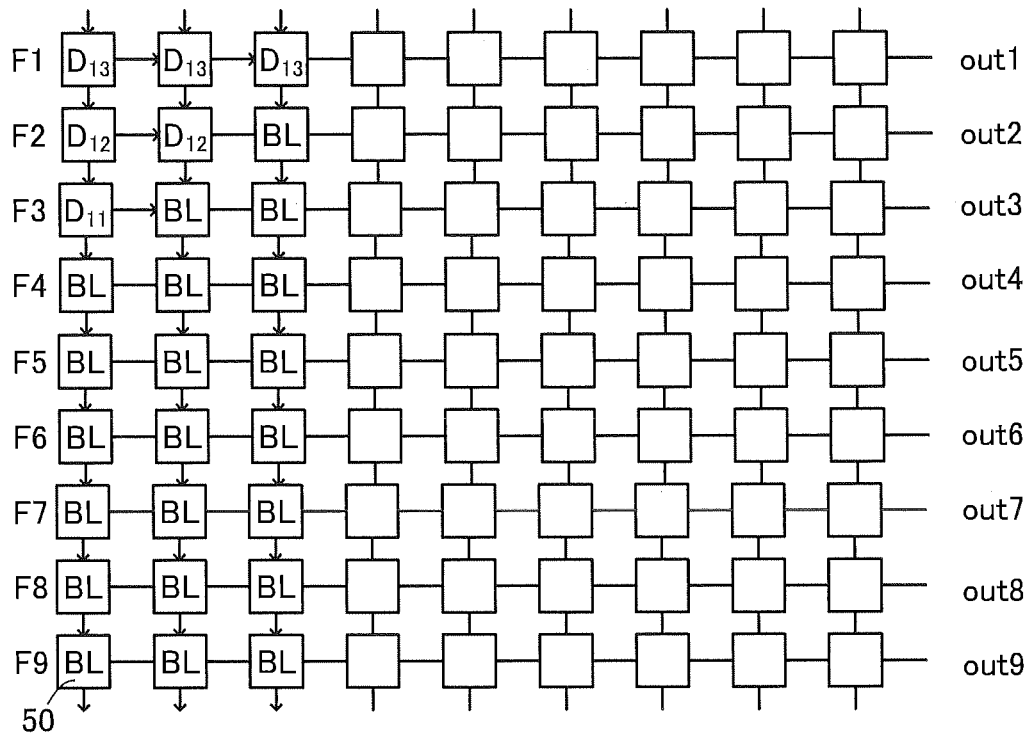
FIG. 14B  T3
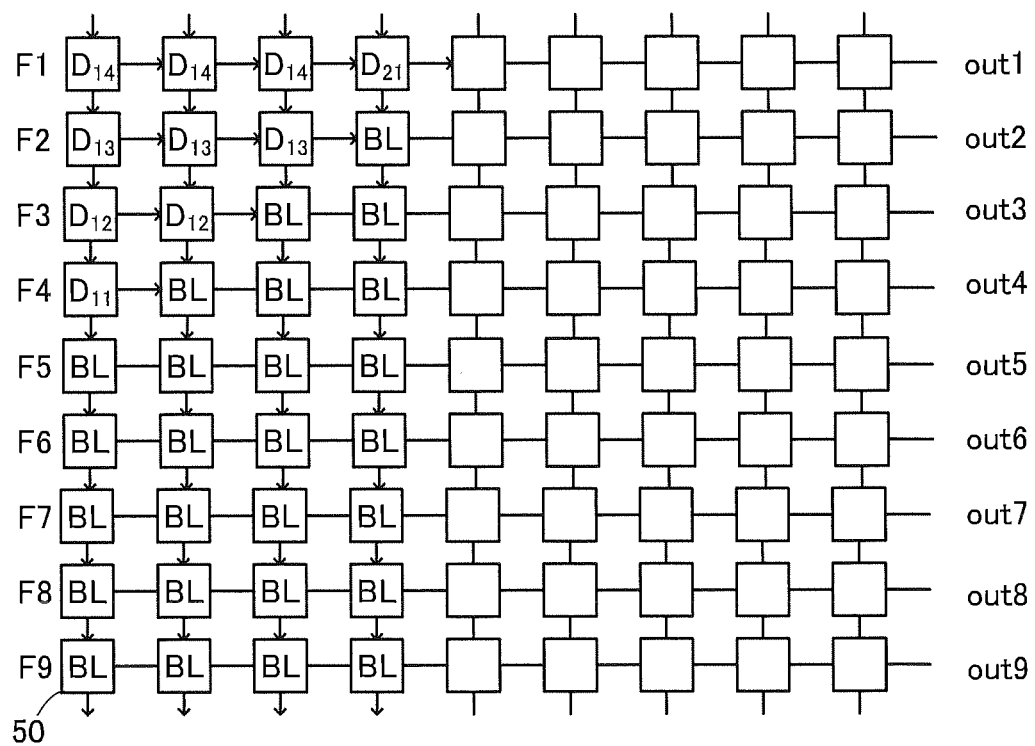

FIG. 15A T8
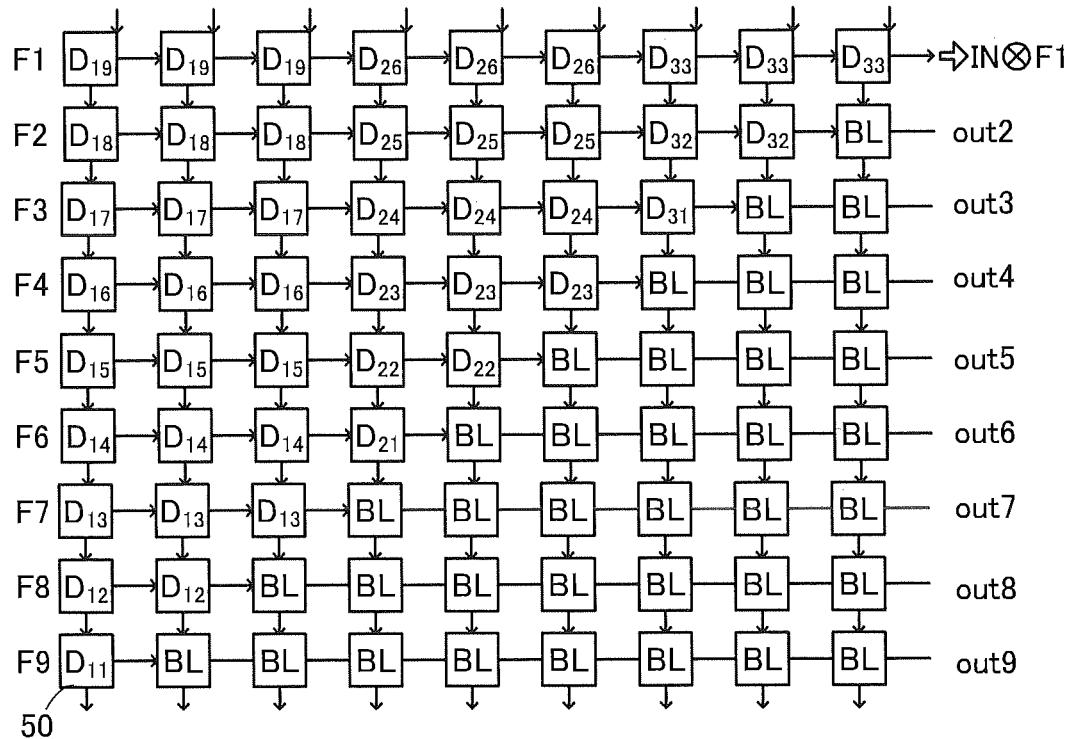
FIG. 15B T9
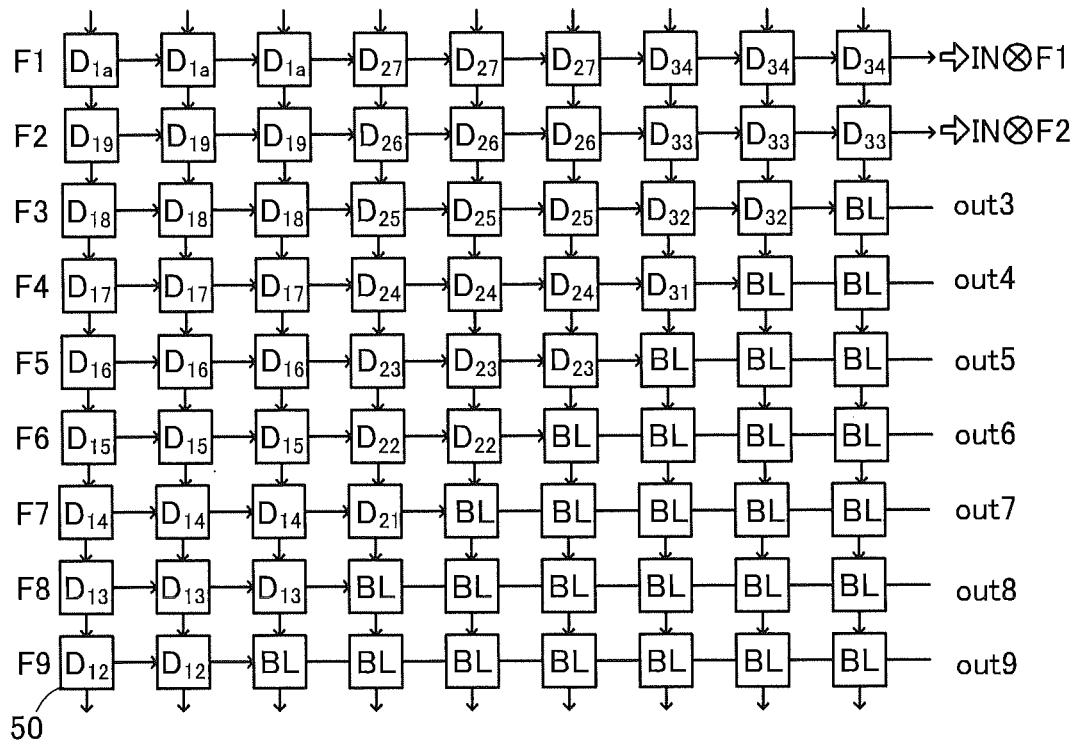

FIG. 17A  T$_{write1}$
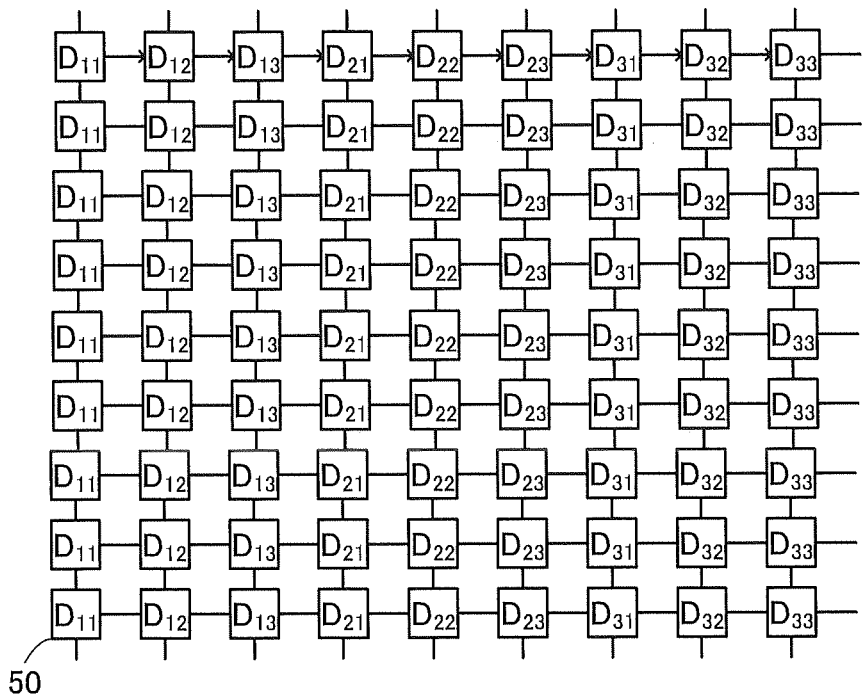
FIG. 17B  T10
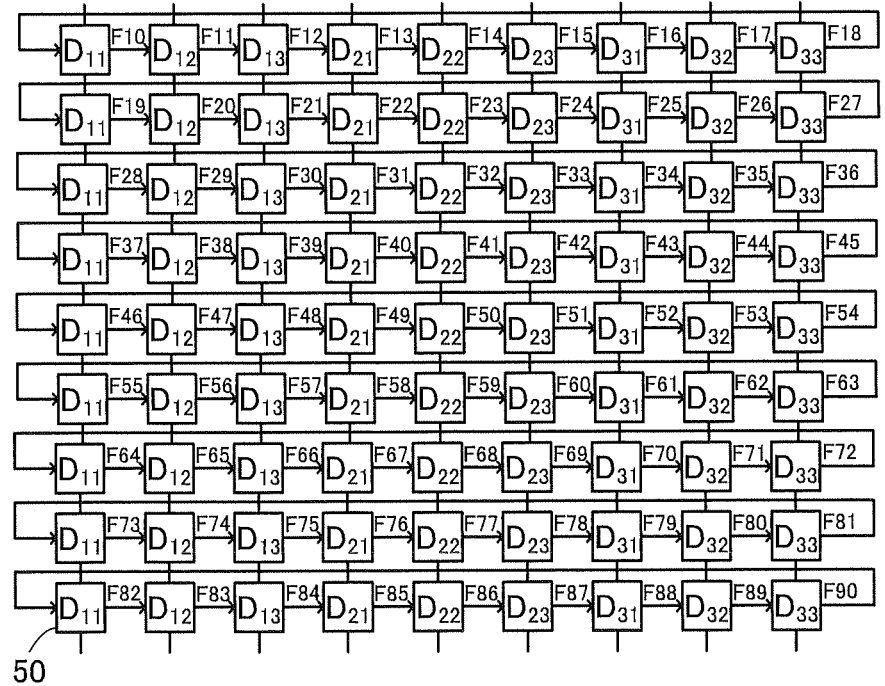

FIG. 18A  T11
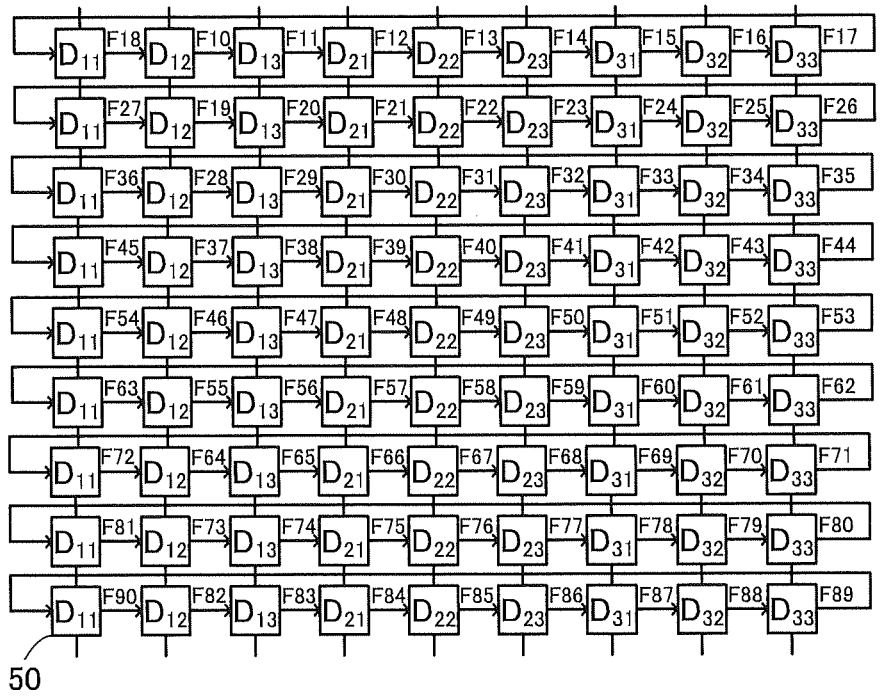
FIG. 18B  T18
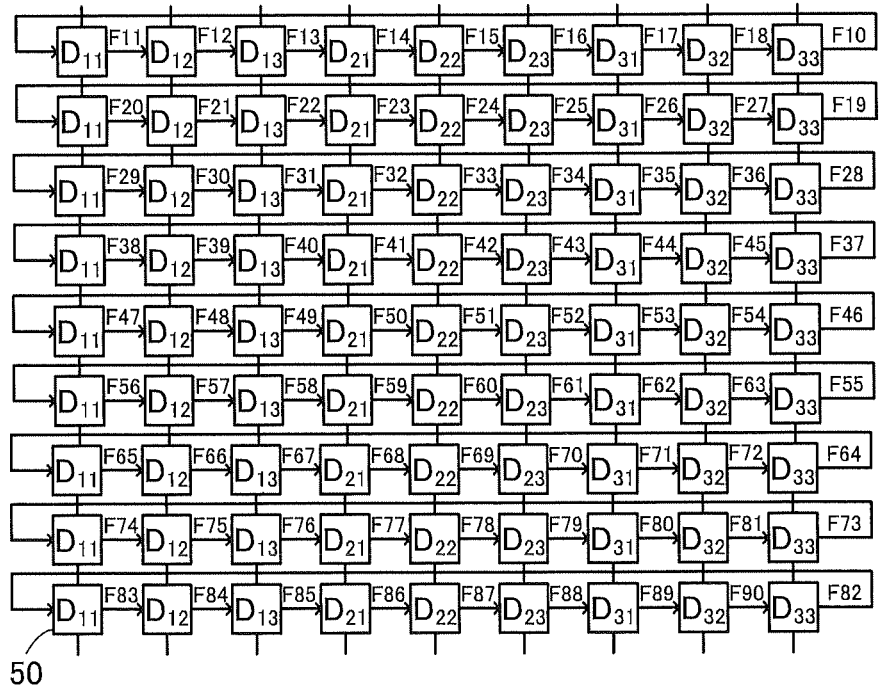

FIG. 19A  T_read1
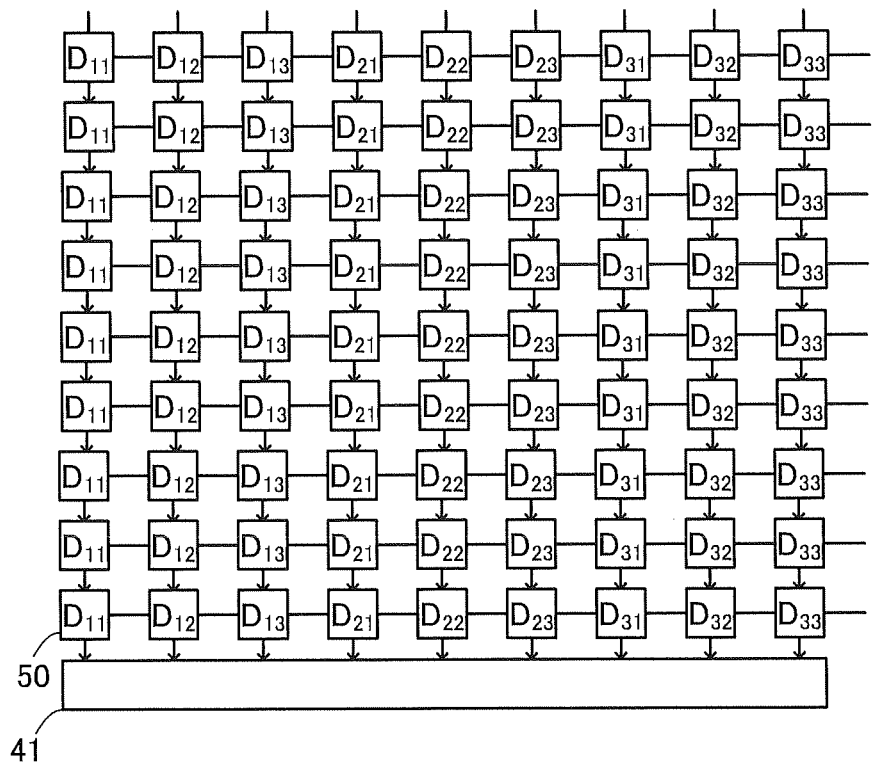
50
41
FIG. 19B  T_write2
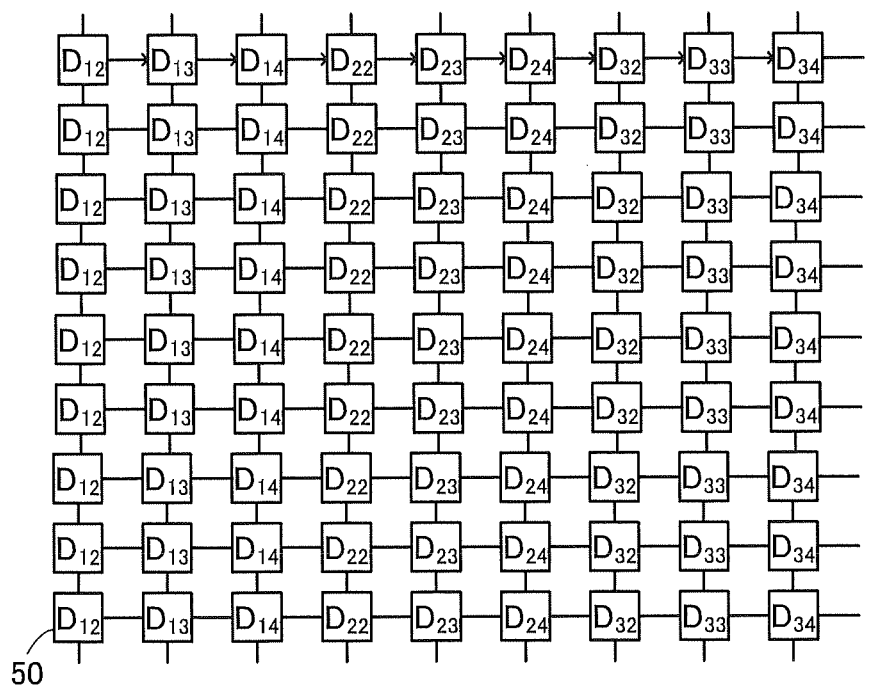
50

FIG. 24A  T_write3
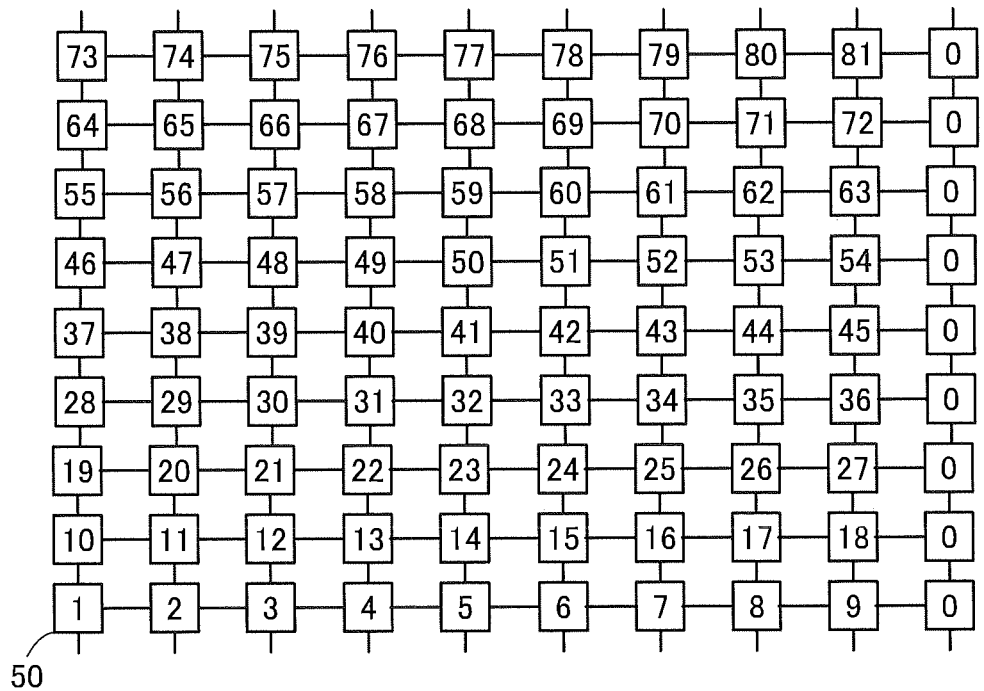
50
FIG. 24B  T20
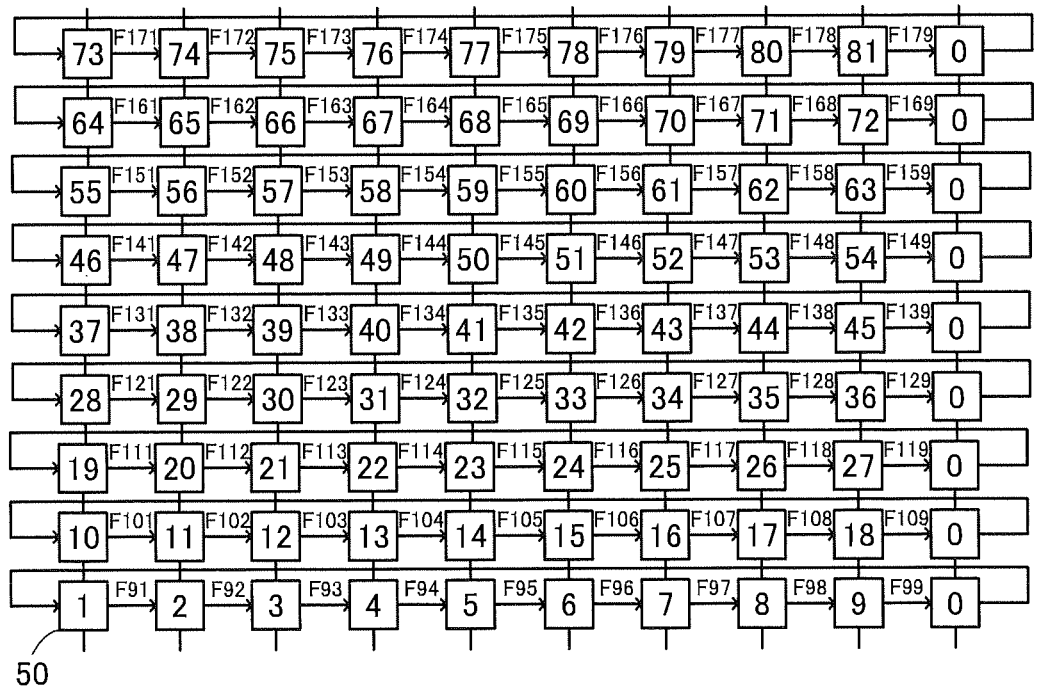
50

FIG. 25A T21
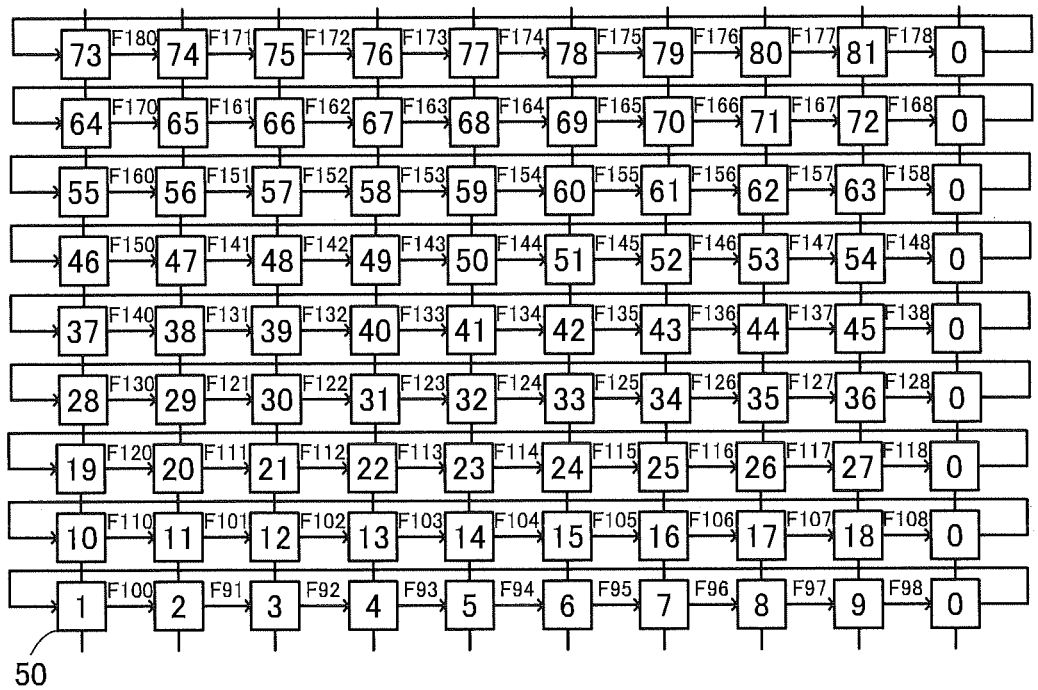
FIG. 25B T29
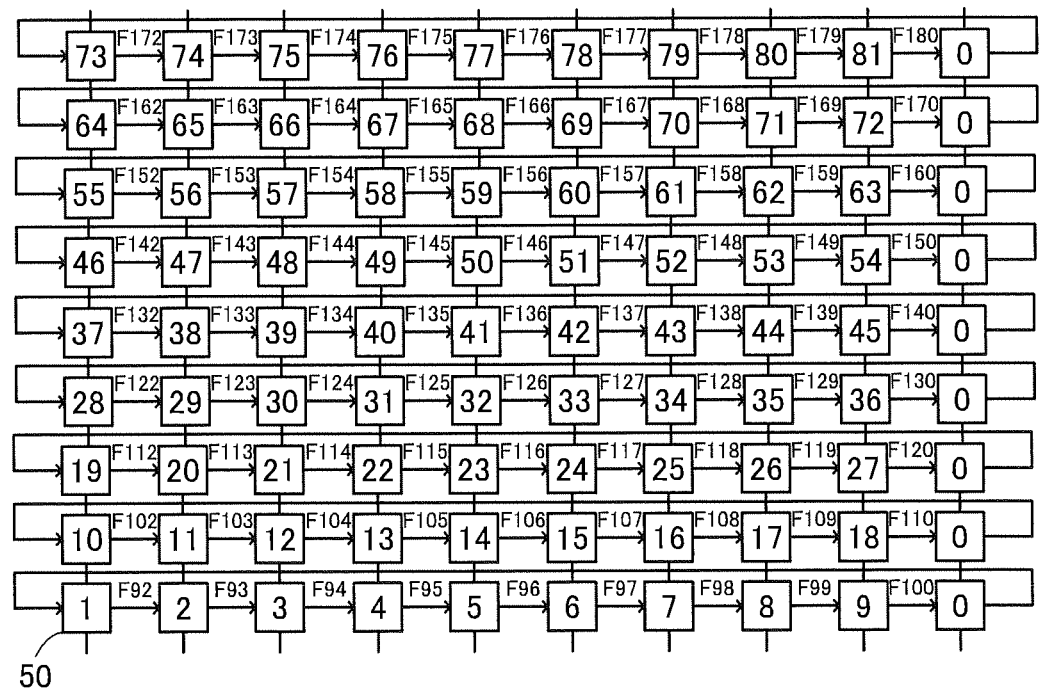

FIG. 26 T_read2
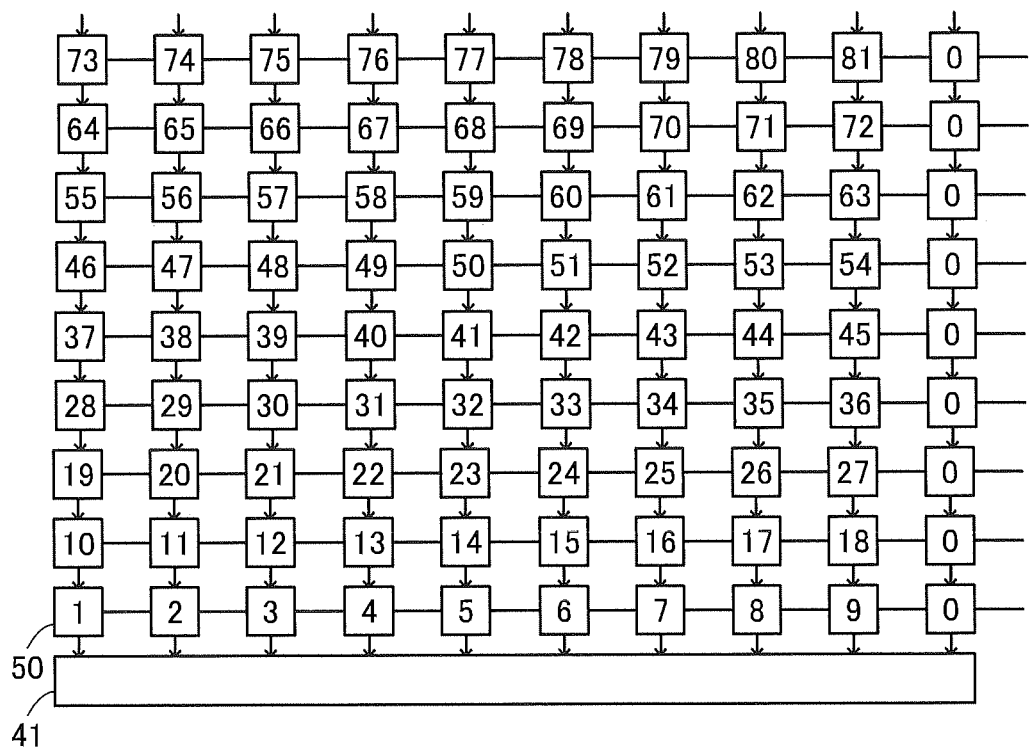

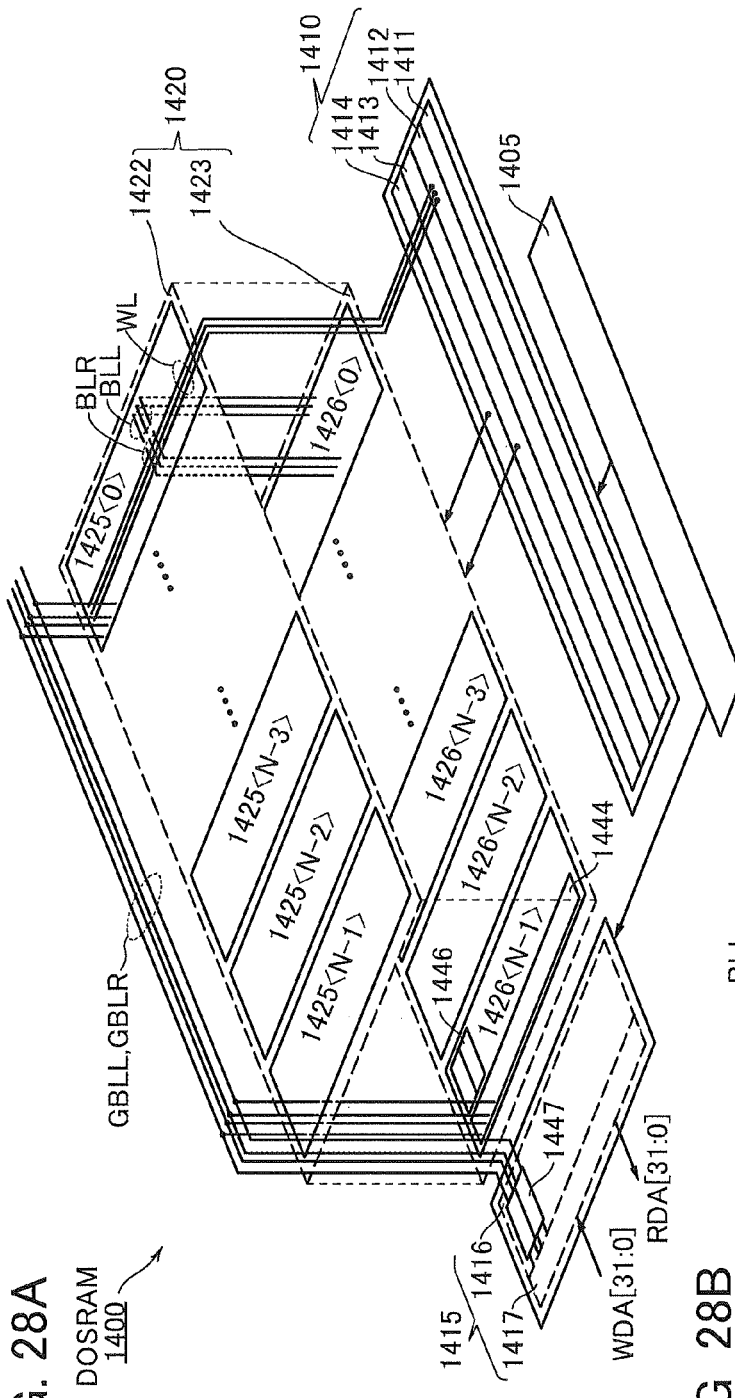
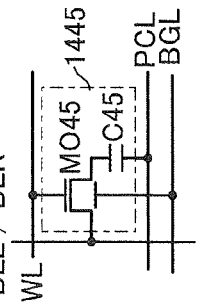
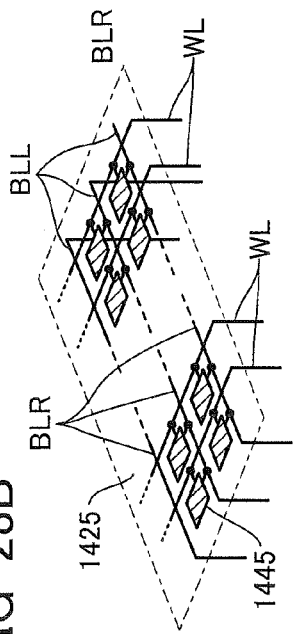
FIG. 28A
FIG. 28B
FIG. 28C

NEURAL NETWORK CIRCUIT

This application is a 371 of international application PCT/IB2018/052250 filed on Apr. 2, 2018 which is incorporated herein by reference.

TECHNICAL FIELD

One embodiment of the present invention relates to a neural network circuit.

BACKGROUND ART

The processing capability of computers has been considerably improved in recent years with the progress of element miniaturization. A von Neumann computer is known for a basic computer architecture. A von Neumann computer performs information processing (a sequential processing method) by a stored-program method, that is, by sequentially executing instructions (programs) and data stored in memory. It is, however, difficult for information processing with instruction execution to perform learning and inference at the same level as a human mind. Accordingly, an artificial neural network (hereinafter referred to as a neural network), which is an approach imitating an information processing method for a biological neural network, has been attracting attention.

A neural network consists of a plurality of layers such as an input layer, an intermediate layer, and an output layer. The input layer, the intermediate layer, and the output layer each have a plurality of neurons. Data obtained by processing is output from the input layer to the intermediate layer and from the intermediate layer to the output layer. In the neural network, data is input in parallel to a plurality of neurons in the input layer, and data is processed in the intermediate layer and the output layer in this order; hence, information processing (a parallel processing method) is executed. The information processing of the neural network achieves a function of a neuron by software processing using a von Neumann computer. As the amount of data to be input increases, it becomes difficult to employ a parallel processing method because a processor performs processing in a plurality of neurons in a time-division manner. For this reason, a structure where an integrated circuit (a neural network circuit) is configured with neurons formed using hardware is proposed (see Patent Document 1, for example).

REFERENCE

Patent Document

[Patent Document 1] Japanese Published Patent Application No. 2016-219011

SUMMARY OF THE INVENTION

Problems to be Solved by the Invention

When data processing such as a convolutional neural network is performed using a neural network circuit, increasing the number of intermediate layers to increase the recognition accuracy, which is called deep learning, is effective. However, when a deep intermediate layer is formed with hardware, the circuit size may increase. When the circuit size increases, the power consumption may increase.

In a neural network, product-sum operations account for a large portion of arithmetic operations. For that reason, to prevent the increase in circuit size of a neural network circuit, it is important how efficiently a product-sum operation is performed. Moreover, it is important to utilize circuit resources effectively with a structure where product-sum operations for different processes are performed using the same circuit.

An object of one embodiment of the present invention is to provide a neural network circuit having a novel structure. Another object of one embodiment of the present invention is to provide a novel neural network circuit that can inhibit an increase in circuit size. Another object of one embodiment of the present invention is to provide a novel neural network circuit that can perform product-sum operations for different processes by using the same circuit.

Note that the description of these objects does not preclude the existence of other objects. One embodiment of the present invention does not need to achieve all these objects. Other objects will be apparent from and can be derived from the description of the specification, the drawings, the claims, and the like.

Means for Solving the Problems

One embodiment of the present invention is a neural network circuit including first to third arithmetic circuits. Each of the first to third arithmetic circuits includes a first register, a memory, a multiplier circuit, and an adder circuit. The first register has a function of holding input data. The memory has a function of storing weight data. The memory has a function of outputting weight data varying in response to switching of a context signal that is input thereto. The multiplier circuit included in the first arithmetic circuit has a function of outputting multiplication data corresponding to a product of the weight data and the input data. The adder circuit included in the first arithmetic circuit has a function of outputting first addition data. The first addition data corresponds to a sum of the multiplication data and second addition data output from the adder circuit included in the second arithmetic circuit. The first addition data is data output to the adder circuit included in the third arithmetic circuit.

One embodiment of the present invention is preferably the neural network circuit in which a programmable switch element is included between the first to third arithmetic circuits, and the programmable switch element has a function of switching electrical connection between the first to third arithmetic circuits by switching of the context signal.

One embodiment of the present invention is preferably the neural network circuit in which the memory includes a transistor, and the transistor contains an oxide semiconductor in a channel formation region.

One embodiment of the present invention is preferably the neural network circuit in which the first to third addition data are data used for convolutional operation processing or fully connected operation processing.

One embodiment of the present invention is preferably the neural network circuit in which the first arithmetic circuit includes a second register, and the second register has a function of holding the first addition data or the multiplication data.

The neural network circuit of one embodiment of the present invention preferably includes a circuit performing activation function processing and a circuit performing pooling operation processing.

One embodiment of the present invention is a neural network circuit including first to third arithmetic circuits. The first arithmetic circuit includes a first register, a first memory, a first multiplier circuit, and a first adder circuit. The second arithmetic circuit includes a second register, a second memory, a second multiplier circuit, and a second adder circuit. The third arithmetic circuit includes a third register, a third memory, a third multiplier circuit, and a third adder circuit. The first to third registers have a function of holding respective first to third input data. Each of the first to third memories has a function of storing weight data. The first to third memories have a function of outputting respective first to third weight data varying in response to switching of a context signal that is input to each of them. The first multiplier circuit has a function of outputting first multiplication data corresponding to a product of the first weight data and the first input data. The second multiplier circuit has a function of outputting second multiplication data corresponding to a product of the second weight data and the second input data. The third multiplier circuit has a function of outputting third multiplication data corresponding to a product of the third weight data and the third input data. The first adder circuit has a function of outputting first addition data. The second adder circuit has a function of outputting second addition data. The third adder circuit has a function of outputting third addition data. The second addition data corresponds to a sum of the second multiplication data and the first addition data. The first addition data includes the first multiplication data and the third addition data.

One embodiment of the present invention is preferably the neural network circuit in which a programmable switch element is included between the first to third arithmetic circuits, and the programmable switch element has a function of switching electrical connection between the first to third arithmetic circuits by switching of the context signal.

One embodiment of the present invention is preferably the neural network circuit in which each of the first to third memories includes a transistor, and the transistor contains an oxide semiconductor in a channel formation region.

One embodiment of the present invention is preferably the neural network circuit in which the first to third addition data are data used for convolutional operation processing or fully connected operation processing.

One embodiment of the present invention is preferably the neural network circuit in which the first arithmetic circuit includes a fourth register, the second arithmetic circuit includes a fifth register, the third arithmetic circuit includes a sixth register, the fourth register has a function of holding the first addition data or the first multiplication data, the fifth register has a function of holding the second addition data or the second multiplication data, and the sixth register has a function of holding the third addition data or the third multiplication data.

The neural network circuit of one embodiment of the present invention preferably includes a circuit performing activation function processing and a circuit performing pooling operation processing.

Note that other embodiments of the present invention will be shown in the following embodiments and the drawings.

Effect of the Invention

One embodiment of the present invention can provide a neural network circuit having a novel structure. Alternatively, one embodiment of the present invention can provide a novel neural network circuit that can inhibit an increase in circuit size. Alternatively, one embodiment of the present invention can provide a novel neural network circuit that can perform product-sum operations for different processes by using the same circuit.

Note that the description of these effects does not preclude the existence of other effects. One embodiment of the present invention does not necessarily achieve all these effects. Other effects will be apparent from and can be derived from the description of the specification, the drawings, the claims, and the like.

BRIEF DESCRIPTION OF DRAWINGS

FIGS. 2A and 2B are diagrams for describing a neural network circuit.

FIGS. 9A and 9B are diagrams for describing a neural network circuit.

FIGS. 13A and 13B are diagrams for describing a neural network circuit.

FIGS. 14A and 14B are diagrams for describing a neural network circuit.

FIGS. 15A and 15B are diagrams for describing a neural network circuit.

FIGS. 17A and 17B are diagrams for describing a neural network circuit.

FIGS. 18A and 18B are diagrams for describing a neural network circuit.

FIGS. 19A and 19B are diagrams for describing a neural network circuit.

FIG. 20 is a diagram for describing a neural network circuit.

FIGS. 24A and 24B are diagrams for describing a neural network circuit.

FIGS. 25A and 25B are diagrams for describing a neural network circuit.

FIG. 26 A block FIG. 26 is a diagram for describing a neural network circuit.

FIG. 28A: A functional block diagram illustrating a structure example of a DOSRAM. FIG. 28B: A diagram illustrating a structure example of a memory cell array. FIG. 28C: A circuit diagram illustrating a structure example of a memory cell.

MODE FOR CARRYING OUT THE INVENTION

Figure 1:
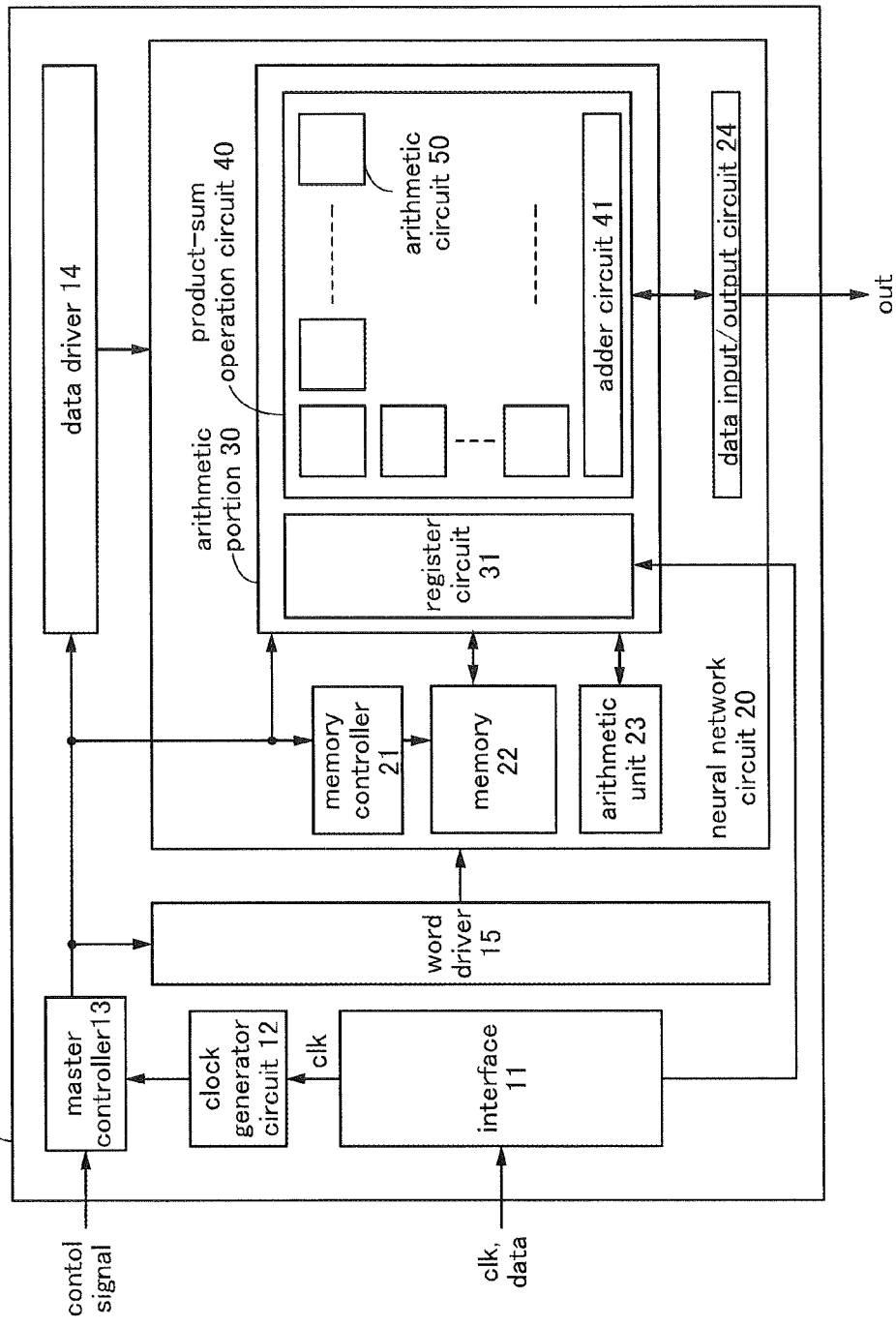
FIG. 1 is a diagram for describing a neural network circuit.

Hereinafter, embodiments will be described with reference to the drawings. Note that embodiments can be implemented with many different modes, and it will be readily appreciated by those skilled in the art that modes and details can be changed in various ways without departing from the spirit and scope thereof. Thus, the present invention should not be interpreted as being limited to the following description of the embodiments.

In this specification and the like, ordinal numbers such as first, second, and third are used in order to avoid confusion among components. Thus, the terms do not limit the number of components. Moreover, the terms do not limit the order of components. For example, a "first" component in one embodiment in this specification and the like can be referred to as a "second" component in other embodiments or claims. For another example, a "first" component in one embodiment in this specification and the like can be omitted in other embodiments or claims.

In the drawings, the same elements, elements having similar functions, elements formed of the same material, elements formed at the same time, or the like are sometimes denoted by the same reference numerals, and description thereof is not repeated in some cases.

In this specification, a neural network refers to a general model that is modeled on a biological neural network, determines the connection strength of neurons by learning, and has the capability of solving problems. A neural network includes an input layer, an intermediate layer (also referred to as a hidden layer), and an output layer. A neural network having two or more intermediate layers is referred to as a deep neural network. Learning by a deep neural network is referred to as deep learning. A circuit capable of executing a neural network by hardware is referred to as a neural network circuit.

In describing a neural network in this specification, to determine a connection strength of neurons (also referred to as a weight coefficient) from existing information is sometimes referred to as learning.

Moreover, in this specification, to draw a new conclusion from a neural network formed using connection strengths obtained by learning is sometimes referred to as inference.

Embodiment 1

In this embodiment, a structure of a neural network circuit that can achieve a neural network function by hardware will be described. A neural network circuit of one embodiment of the present invention can perform a product-sum operation efficiently. Therefore, its application to a convolutional neural network, in which the frequency of product-sum operations is high, is extremely effective. A specific structure example is described below. Note that a product-sum operation is an arithmetic operation in which data obtained by multiplication are added to obtain the sum.

FIG. 1 is a block diagram of a data processing circuit 10 including a neural network circuit. The data processing circuit 10 includes an interface 11, a clock generator circuit 12, a master controller 13, a data driver 14, a word driver 15, and a neural network circuit 20.

The neural network circuit 20 includes a memory controller 21, a memory 22, an arithmetic unit 23, a data input/output circuit 24, and an arithmetic portion 30.

The arithmetic portion 30 includes a register circuit 31 and a product-sum operation circuit 40. The product-sum operation circuit 40 includes a plurality of arithmetic circuits 50 and an adder circuit 41. Although not illustrated in FIG. 1, between the plurality of arithmetic circuits, programmable switch elements (PSE) for switching electrical connection between the arithmetic circuits are provided.

The master controller 13 has a function of receiving a control signal control signal from the outside of the data processing circuit 10 and controlling the overall data processing circuit 10. Specifically, the master controller 13 performs control such as control of the operation of the data driver 14 and the word driver 15, control of the memory controller 21, and context switching in the neural network circuit 20.

The clock generator circuit 12 generates a clock signal used for the circuit operation for the master controller 13 and the like, on the basis of a reference clock signal clk received by the interface 11.

The interface 11 has a function of receiving the reference clock signal clk and a data signal data from the outside of the data processing circuit 10. The interface 11 has a function of converting a signal that is compatible with transmission and reception. As the interface 11, an interface such as LVDS (Low Voltage Differential Signaling) or a MIPI (Mobile Industry Processor Interface) can be used.

The data driver 14 has a function of generating a data signal to be written to a memory of the arithmetic circuit 50. The word driver 15 has a function of generating a control signal for writing data to the memory of the arithmetic circuit 50 (e.g., a word signal).

The product-sum operation circuit 40 performs a product-sum operation. The product-sum operation circuit 40 can switch a plurality of kinds of arithmetic processing with control by the master controller 13. Thus, appropriate arithmetic processing based on input data can be selected and performed while using the same circuit resources. Switching of arithmetic processing in the product-sum operation circuit 40 will be described in detail with reference to FIG. 9 to FIG. 26.

The data signal data input through the interface 11 is held in the register circuit 31. Data held in the register circuit 31 can be stored in the memory 22 at a desired timing. Data obtained in the middle of an arithmetic operation in the neural network circuit 20 can be stored in the memory 22. As the memory 22, SRAM (Static Random Access Memory) can be used, for example.

Data held in the register circuit 31 can be used for an arithmetic operation in the neural network circuit 20 at a desired timing. Moreover, data held in the register circuit 31 can be subjected to desired processing in the arithmetic unit 23 at a desired timing. The arithmetic unit 23 performs pooling arithmetic processing and an arithmetic operation with an activation function when arithmetic processing by a convolutional neural network is performed. As the activation function, a sigmoid function, a rectified linear unit (hereinafter ReLU), a hyperbolic tangent (tanh) function, or a step function can be used, for example.

The data input/output circuit 24 outputs an arithmetic result obtained by an arithmetic operation in the data processing circuit 10, to the outside of the data processing circuit 10 as data out.

Functions of the product-sum operation circuit 40 included in the neural network circuit 20 are described.

The plurality of arithmetic circuits 50 included in the product-sum operation circuit 40 each include a register circuit that retains input data. Each of the plurality of arithmetic circuits also includes a memory that stores weight data corresponding to a connection strength (also referred to as a weight coefficient). The weight data can be switched in accordance with a context signal for switching the context. The memory that stores weight data can output corresponding weight data by decoding a context signal. The plurality of arithmetic circuits 50 included in the product-sum operation circuit 40 each include a multiplier circuit that generates multiplication data corresponding to the product of weight data and input data. Multiplication data is obtained in the multiplier circuit. The plurality of arithmetic circuits 50 included in the product-sum operation circuit 40 each include an adder circuit. The adder circuit can obtain addition data by adding the multiplication data obtained by the multiplier circuit to data obtained by another arithmetic circuit 50. The plurality of arithmetic circuits 50 included in the product-sum operation circuit 40 each include a register for holding multiplication data and addition data. Data held in the register is output to another arithmetic circuit 50 at a predetermined timing.

The product-sum operation circuit 40 can execute a product-sum operation by performing the product of a weight coefficient that varies among the arithmetic circuits 50 and input data by switching input/output of data between the above arithmetic circuits, and by adding addition data obtained by another arithmetic circuit 50 and the multiplication data obtained earlier. An enormous number of product-sum operations can be efficiently performed by arranging a plurality of arithmetic circuit 50 in series and shifting obtained data in succession. The product-sum operation circuit 40 including the arithmetic circuits 50 can execute product-sum operations by concurrently processing multiplication data and addition data, which are among input data held in the plurality of arithmetic circuits 50, between the arithmetic circuits 50 as in pipeline processing in a processor, and by shifting the multiplication data and the addition data between the plurality of arithmetic circuits 50. Accordingly, when arithmetic processing with product-sum operations is performed by limited hardware, massively parallel data processing can be efficiently performed with limited circuit resources.

FIG. 2(A) is a block diagram for showing an example of the arithmetic circuit 50 included in the product-sum operation circuit 40. As an example, the arithmetic circuit includes an input register 51, a memory 52, a multiplier circuit 53, an adder circuit 54, an output register 55A, and an output register 55B.

An input signal sin is input to the input register 51. The input register 51 outputs an output signal sout. The input register 51 outputs input data sdata to the multiplier circuit 53.

A context signal context is input to the memory 52. The memory 52 includes a dataset corresponding to contexts. A dataset is data corresponding to a plurality of pieces of weight data used in product-sum operation processing. The memory outputs one piece of weight data among the plurality of pieces of weight data corresponding to contexts, as weight data cmout in accordance with the context signal.

The plurality of pieces of weight data stored in the memory 52 are effective when arithmetic operations are performed while a context is changed, for example, when the number of filters used in convolutional operation processing is large. Performing arithmetic operations while a context is changed enables multiplication under a variety of conditions by using one multiplier circuit.

The multiplier circuit 53 generates multiplication data mout by multiplication of the input data sdata and the weight data cmout. The multiplication data mout is output to the adder circuit 54. The multiplication data mout held in the output register 55A is output as an output signal out1 to another arithmetic circuit 50. A configuration is such that the multiplication data mout is output through the output register 55A, and the multiplication data mout can be transmitted to another arithmetic circuit 50 at the next timing after the multiplication is performed. Moreover, an error in the arithmetic result due to signal delay can be prevented.

The output signal out1 is input to another arithmetic circuit 50 as input addition data ain. Input/output of signals can be switched by arranging programmable switch elements between the arithmetic circuits 50. By controlling the programmable switch elements, intended wirings can be connected and signals can be input and output between the arithmetic circuits at a desired timing.

The adder circuit 54 generates addition data aout by adding the multiplication data mout to the input addition data ain. The addition data aout is output to the output register 55B. The addition data aout stored in the output register 55B is output as an output signal out2 to another arithmetic circuit 50. A configuration in which the addition data aout is output through the output register 55B can prevent an error in the arithmetic result due to signal delay.

The output signal out2 is input to another arithmetic circuit 50 as the input addition data ain. Input/output of signals can be switched by arranging programmable switch elements between the arithmetic circuits 50. By controlling the programmable switch elements, intended wirings can be connected and signals can be input and output between the arithmetic circuits at a desired timing.

A nonvolatile memory is used as the memory 52. For the memory 52, an OS memory using a transistor (an OS transistor) whose channel formation region contains an oxide semiconductor (OS) is useful. Examples of an OS memory include a DOSRAM and a NOSRAM. By providing the memory 52 in each arithmetic circuit 50, access to (read and write of) the above-described weight data is achieved at higher speed and lower power consumption than in the case of providing the memory 52 outside the product-sum operation circuit 40.

DOSRAM (registered trademark) is an abbreviation of dynamic oxide semiconductor RAM, which is RAM including a 1T (transistor)-1C (capacitor) memory cell. The DOSRAM is a memory utilizing a low off-state current of an OS transistor. The DOSRAM is DRAM including an OS transistor. The DOSRAM includes a memory cell including an OS transistor, and a read circuit portion including a Si transistor. The memory cell and the read circuit portion can be provided in different layers that are stacked, whereby the entire circuit area of the DOSRAM can be small. Note that the details of the DOSRAM will be described later in Embodiment 3.

In large-scale parallel calculation using a neural network, the amount of input data and the number of filters exceed 1000 in some cases. In the case where the input data is stored in SRAM, the input data has to be stored piece by piece because of limited bus width and circuit area and a small storage capacity of the SRAM. The DOSRAM can be stacked in a limited circuit area, and thus memory cells can be arranged at a high density.

NOSRAM (registered trademark) is an abbreviation of nonvolatile oxide semiconductor RAM, which is RAM including a gain cell (2T or 3T) memory cell. The NOSRAM is a memory utilizing a low off-state current of an OS transistor.

The NOSRAM is a memory using an OS transistor. The NOSRAM consumes less power in data writing than other nonvolatile memories such as flash memory, ReRAM (Resistive Random Access Memory), and MRAM (Magnetoresistive Random Access Memory). Furthermore, unlike flash memory and ReRAM, elements do not deteriorate when data is written, and there is no limitation on data write cycles. Moreover, unlike flash memory and ReRAM, there is no problem of variations between cells due to element deterioration. Unlike in a two-terminal memory such as flash memory and ReRAM, a circuit for writing and reading is not complicated. Note that the details of the NOSRAM will be described later in Embodiment 3.

The NOSRAM can hold multilevel data of two or more bits as well as 1-bit binary data. The multilevel data storage in the NOSRAM leads to a reduction of the memory cell area per bit. Furthermore, the NOSRAM can hold analog data as well as digital data. The NOSRAM can hold analog data as it is; hence, a D/A converter circuit or an A/D converter circuit is unnecessary. Accordingly, the area of peripheral circuits for the NOSRAM can be small.

Note that the arithmetic circuit 50 is not limited to having the structure in FIG. 2(A) and can also employ a structure in FIG. 2(B). In the arithmetic circuit 50 illustrated in FIG. 2(B), the output registers 55A and 55B in the structure of FIG. 2(A) are merged into an output register 55. Moreover, a switching circuit 56 (also referred to as a multiplexer) is provided between the output register 55 and the multiplier circuit 53 and the adder circuit 54. With the structure in FIG. 2(B), the addition data aout and the multiplication data mout can be switched and output as an output signal out.

Figure 3A:
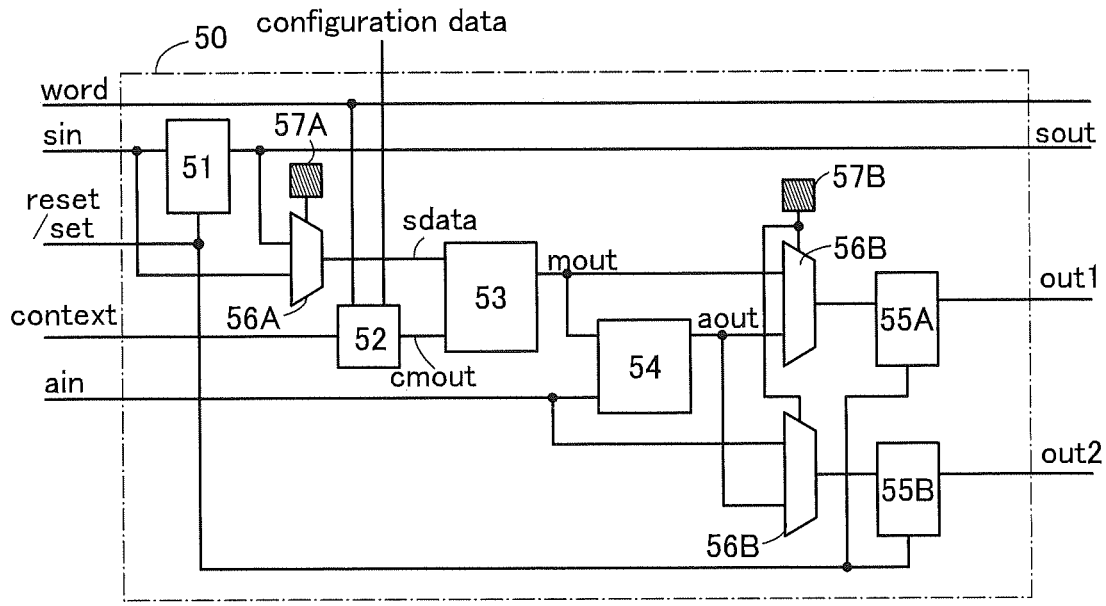
FIGS. 3A and 3B are diagrams for describing a neural network circuit.

FIG. 3(A) illustrates more details of the block diagram of the arithmetic circuit 50 shown in FIGS. 2(A) and 2(B). In the arithmetic circuit 50 illustrated in FIG. 3(A), a switching circuit 56A, a memory circuit 57A, switching circuits 56B, and a memory circuit 57B are shown in addition to the components shown in FIGS. 2(A) and 2(B).

The switch circuit 56A is a circuit for controlling whether the input signal sin without being processed is output as the multiplier circuit 53 or data held in the input register 51 is output as the input data sdata. The memory circuit 57A has a function of switching electrical connection in the switching circuit 56A in response to switching of the context signal context. The switching circuit 56B is a circuit for controlling whether the multiplication data mout, the addition data aout, or the input addition data ain is output as the output signal out1 or out2. The memory circuit 57B has a function of switching electrical connection in the switching circuit 56B in response to switching of the context signal context.

FIG. 3(A) illustrates a set signal set and a reset signal reset for controlling the input register 51, the output register 55A, and the output register 55B. A configuration can be such that the multiplication data mout, the addition data aout, or the like is output at a predetermined timing in accordance with control by the set signal set and the reset signal reset; thus, an error in the arithmetic result due to signal delay can be prevented.

In addition, FIG. 3(A) illustrates configuration data configuration data and a word signal word for controlling writing of weight data to be held in the memory 52. By controlling the configuration data configuration data and the word signal word independently in each arithmetic circuit 50, weight data set for each arithmetic circuit 50 can be rewritten individually.

Figure 3B:
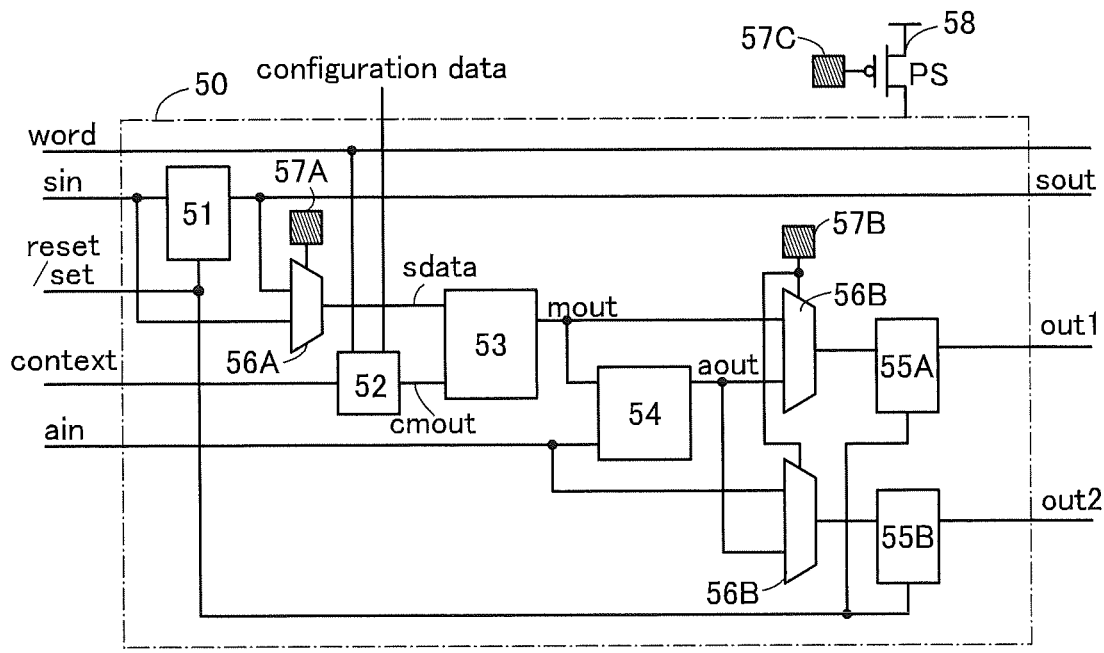

FIG. 3(B) illustrates more details of the block diagram of the arithmetic circuit 50 shown in FIG. 3(A). In the arithmetic circuit 50 illustrated in FIG. 3(B), a power switch (PS) 58 and a memory circuit 57C are shown in addition to the components shown in FIG. 3(A). The memory circuit 57C can switch the on/off state of the power switch 58 in response to switching of the context signal context. With a configuration in which the power switch 58 in the arithmetic circuit 50 that is not used in arithmetic processing can be turned off, power consumption due to leakage current can be cut in unused arithmetic circuits 50 among a large number of arithmetic circuits 50.

Figure 4:
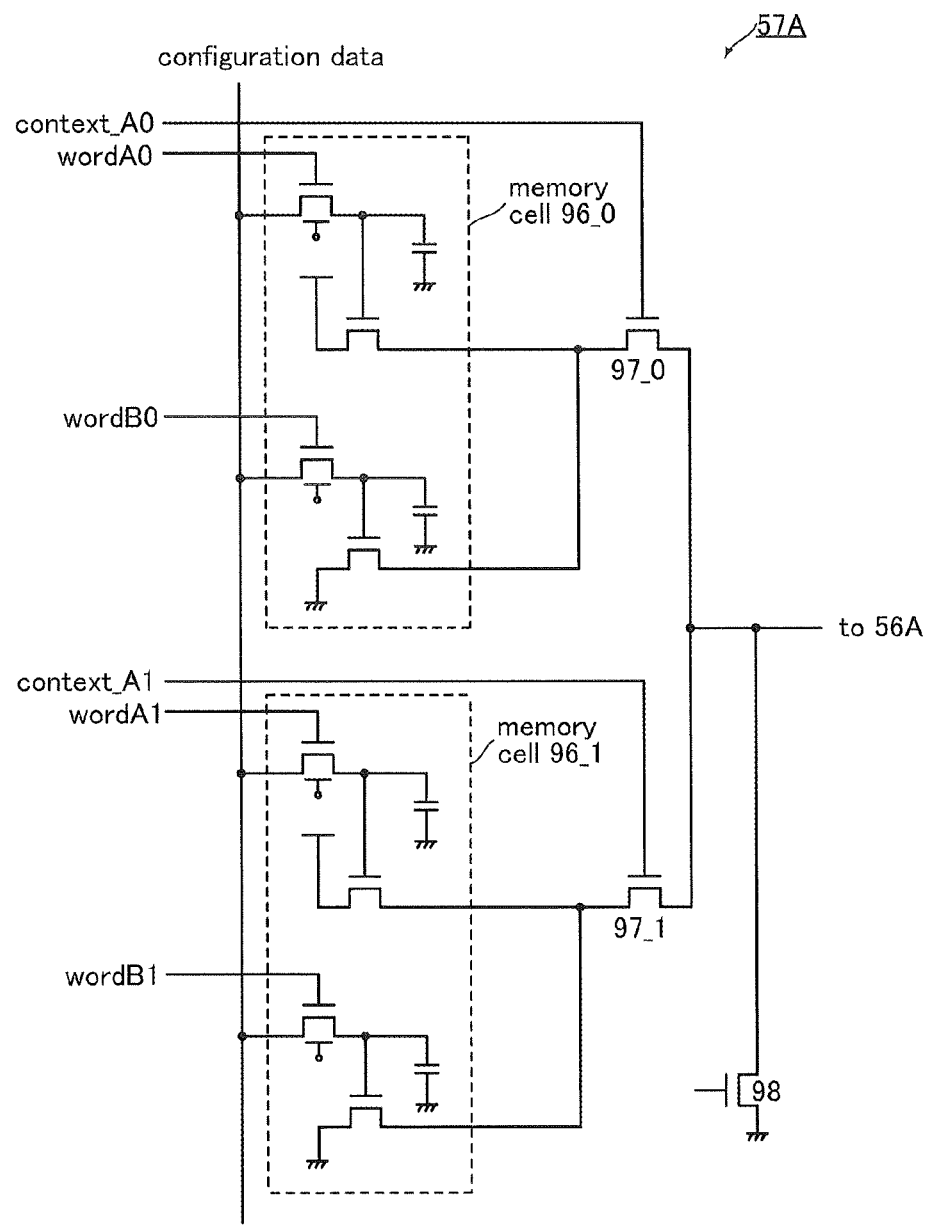
FIG. 4 is a diagram for describing a neural network circuit.

FIG. 4 illustrates a configuration example of the memory circuit 57A. The memory circuit 57A includes memory cells 96_0 and 96_1 and transistors 97_0, 97_1, and 98. Configuration data, switching signals context_A0 and context_A1 and signals wordA0, wordB0, wordA1, and wordB1 are input to the memory circuit 57A.

The memory cells 96_0 and 96_1 each consist of two memory circuits functioning as NOSRAM. To write configuration data "1" to the memory cell 96_0, the signal wordA0 is set to "H", and the signals wordB0, wordA1, and wordB1 are set to "L". To write configuration data "0" to the memory cell 96_1, the signal wordB0 is set to "H", and the signals wordA0, wordA1, and wordB1 are set to "L".

The transistor 98 is off while a control signal is output to the switching circuit 56A. One of the transistors 97_0 and 97_1 is turned on by the switching signals context_A0 and context_A1. For example, when the transistor 97_0 is turned on, a control signal whose logic corresponds to data retained in the memory cell 96_0 is output to the switching circuit 56A.

The memory circuits 57B and 57C have the same circuit configuration as the memory circuit 57A.

Figure 5A:
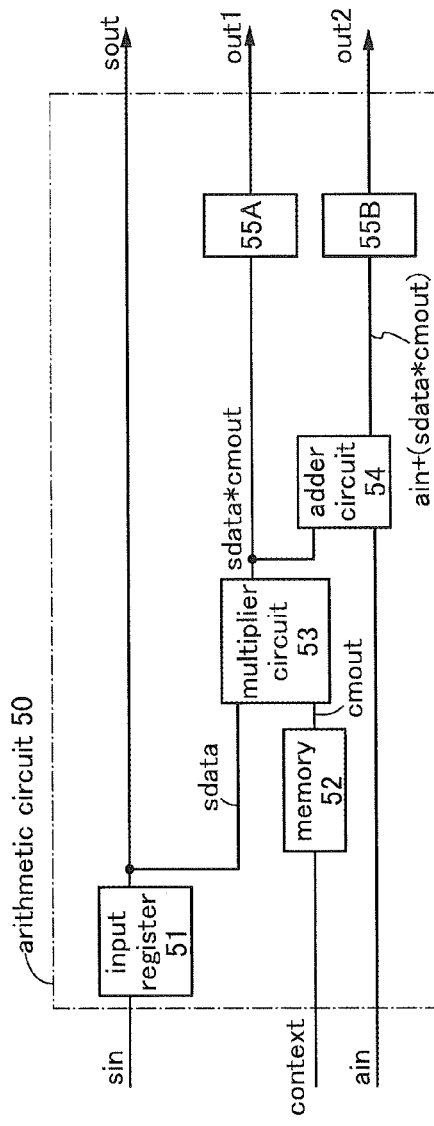
FIGS. 5A and 5B are diagrams for describing a neural network circuit.

FIG. 5(A) shows "sdata*cmout" to clarify that the multiplication data mout shown in the block diagram of the arithmetic circuit 50 in FIG. 2 is data obtained by multiplication of the input data sdata and the weight data cmout. Similarly, FIG. 5(A) shows "ain+(sdata*cmout)" to clarify that the addition data aout shown in the block diagram of the arithmetic circuit 50 in FIG. 2 is data obtained by adding the multiplication data mout to the input addition data ain.

Figure 5B:
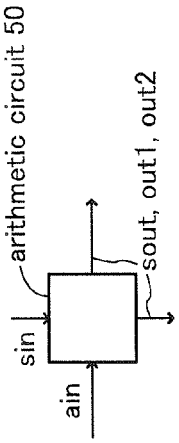

FIG. 5(B) illustrates a symbol for simply showing the arithmetic circuit 50. Arrows pointing to the arithmetic circuit 50 as shown in FIG. 5(B) represent data input to the arithmetic circuit 50, that is, the input signal sin (or the input data sdata) and the input addition data ain. Arrows pointing opposite to the arithmetic circuit 50 as shown in FIG. 5(B) represent data output from the arithmetic circuit 50, that is, the output signals out1 and out2 (or the multiplication data mout and the addition data aout) and the output signal sout.

The representation in FIG. 5(B) is described in more details with reference to FIG. 6 to FIG. 8.

Figure 6A:
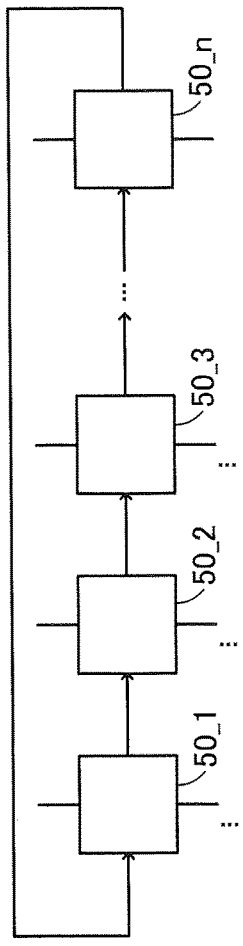
FIGS. 6A and 6B are diagrams for describing a neural network circuit.
Figure 6B:
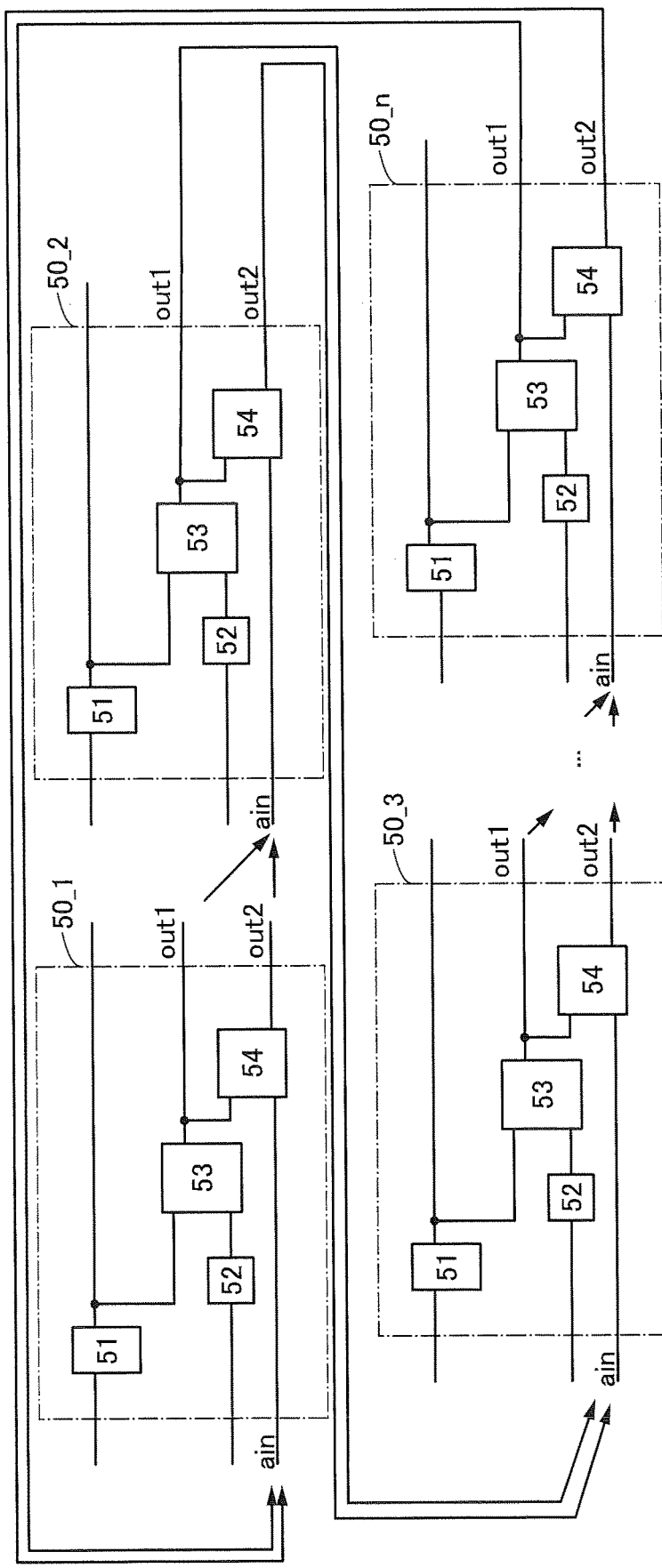

FIG. 6(A) is a diagram illustrating the case where a plurality of arithmetic circuits 50_1 to 50_n (n is a natural number of 2 or more) shown as the symbol in FIG. 5(B) are arranged in the horizontal direction (also referred to as the row direction). FIG. 6(B) is a diagram describing the arrangement like FIG. 6(A) by using a structure where the structures of the switching circuits 55A and 55B and the output registers 55A and 55B in the arithmetic circuit 50 illustrated in FIG. 3(A) are simplified. The diagrams shown in FIGS. 6(A) and 6(B) illustrate the operation in the case where generation of multiplication data and generation of addition data are processed in parallel in the plurality of arithmetic circuits 50_1 to 50__n_.

Specifically, data input and output between the arithmetic circuits are shown as arrows in FIG. 6(B). Between adjacent arithmetic circuits, for example, between the arithmetic circuit 50_1 and the arithmetic circuit 50_2, output data output from the arithmetic circuit 50_1 is input as input addition data of the arithmetic circuit 50_2. Between the arithmetic circuit 50_2 and the arithmetic circuit 50_3, output data output from the arithmetic circuit 50_2 is input as input addition data of the arithmetic circuit 503. Between the arithmetic circuit 50_1 and the arithmetic circuit 50__n_, output data output from the arithmetic circuit 50__n_ is input as input addition data of the arithmetic circuit 50_1. In other words, generation of multiplication data of input data that differ between the arithmetic circuits and different weight data and arithmetic processing of adding the multiplication data to the input addition data input from the previous-stage arithmetic circuit can be processed in parallel in the plurality of arithmetic circuits 50_1 to 50__n_.

Figure 7A:
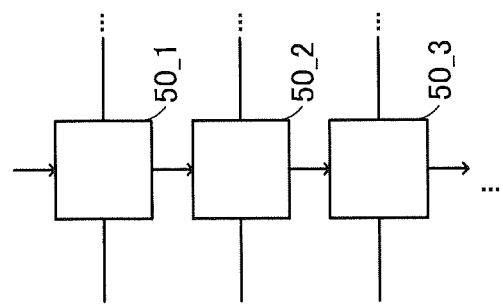
FIGS. 7A and 7B are diagrams for describing a neural network circuit.
Figure 7B:
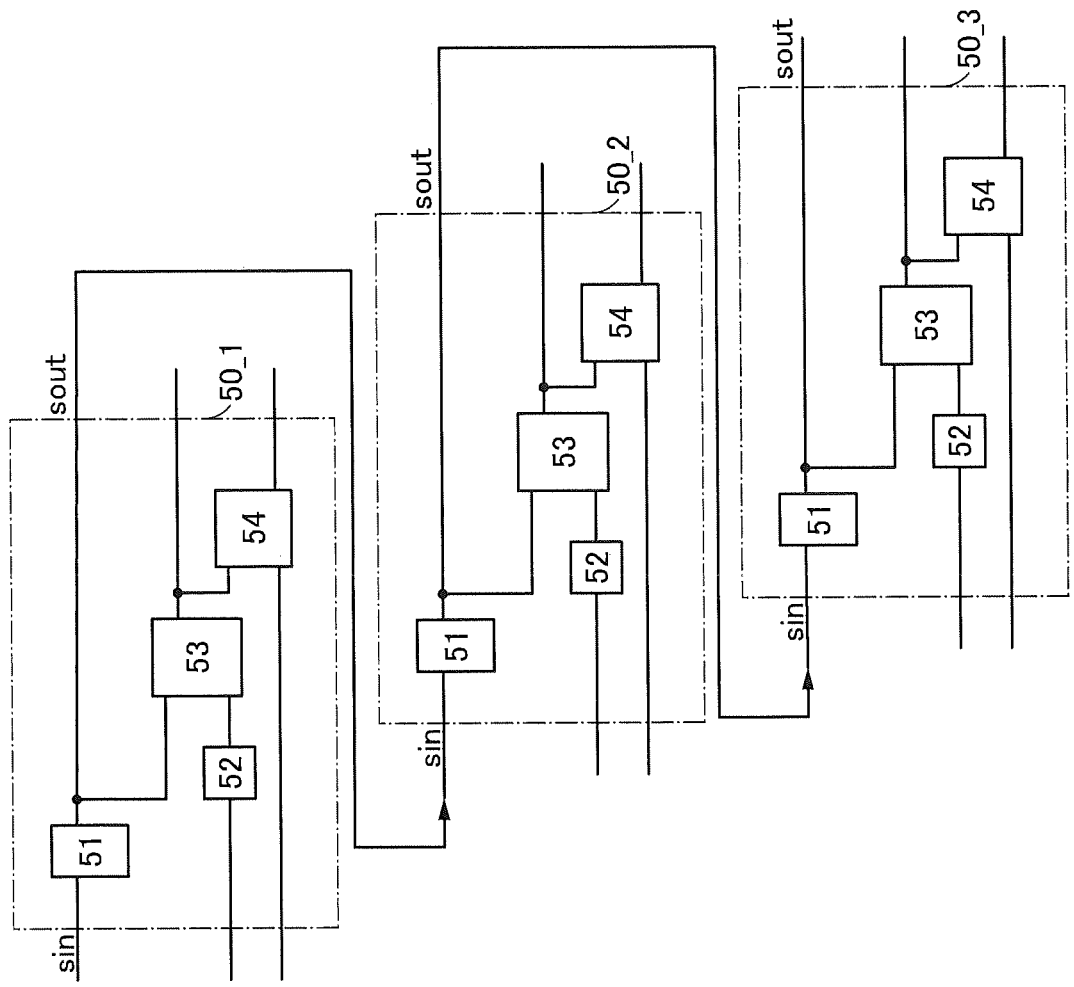

FIG. 7(A) is a diagram illustrating the case where a plurality of arithmetic circuits 50_1 to 50_3 shown as the symbol in FIG. 5(B) are arranged in the vertical direction (also referred to as the column direction). FIG. 7(B) is a diagram describing the arrangement like FIG. 7(A) by using a structure where the structures of the switching circuits 55A and 55B and the output registers 55A and 55B in the arithmetic circuit 50 illustrated in FIG. 3(A) are simplified. The diagrams shown in FIGS. 7(A) and 7(B) illustrate the operation in the case where input data to the input register circuit in each of the arithmetic circuits 50_1 to 50_3 is written through another arithmetic circuit.

Specifically, data input and output between the arithmetic circuits are shown as arrows in FIG. 7(B). Between adjacent arithmetic circuits, for example, between the arithmetic circuit 50_1 and the arithmetic circuit 50_2, the output signal sout output from the arithmetic circuit 50_1 is input as the input signal sin of the arithmetic circuit 50_2. Between the arithmetic circuit 50_2 and the arithmetic circuit 50_3, the output signal sout output from the arithmetic circuit 50_2 is input as the input signal sin of the arithmetic circuit 50_3. In other words, a signal can be input to an arithmetic circuit electrically connected through another arithmetic circuit.

Figure 8B:
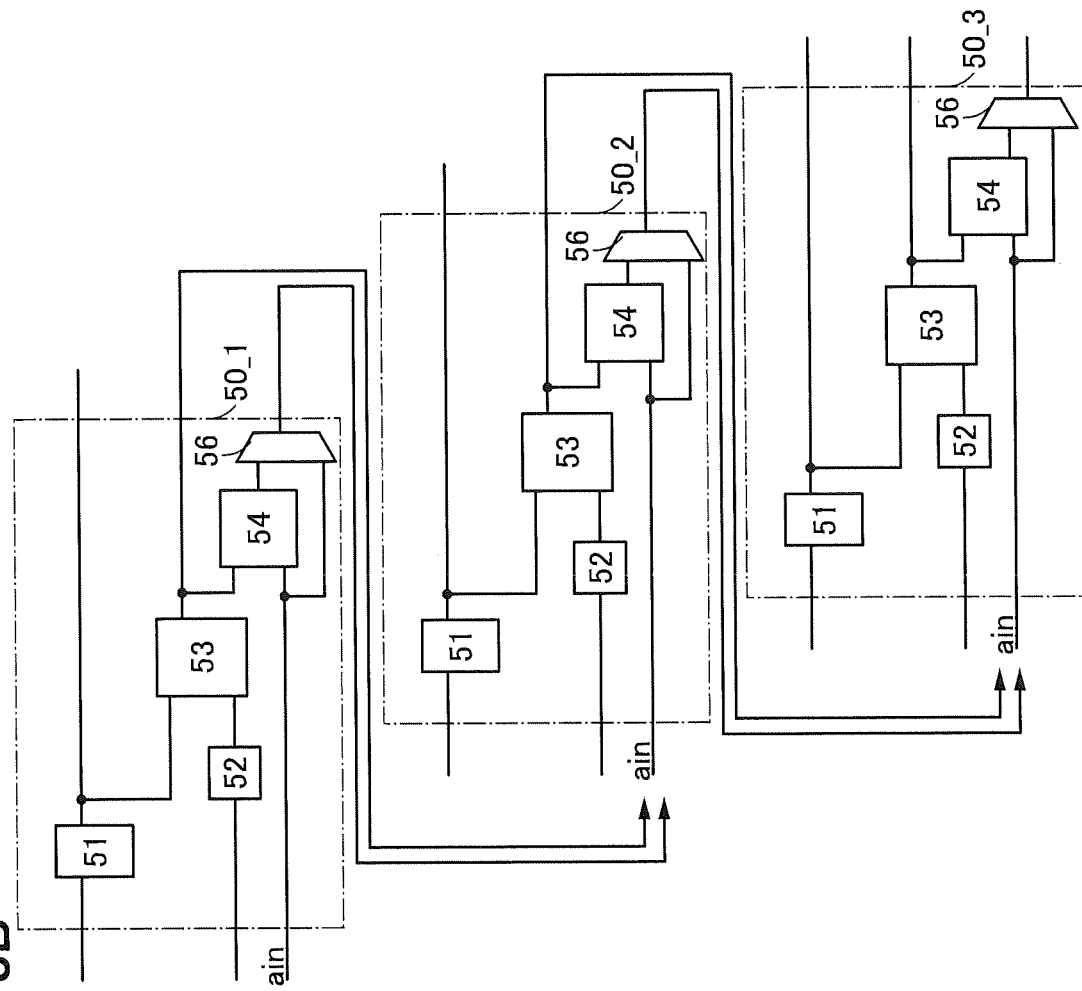
FIGS. 8A and 8B are diagrams for describing a neural network circuit.
Figure 8A:
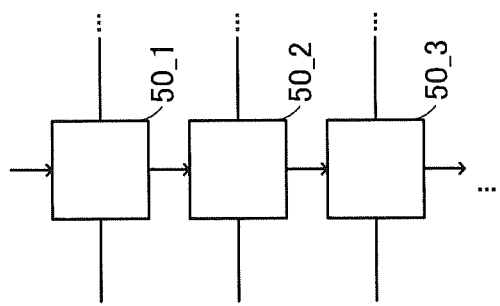

Like FIG. 7(A), FIG. 8(A) is a diagram illustrating the case where a plurality of arithmetic circuits 50_1 to 50_3 shown as the symbol in FIG. 5(B) are arranged in the vertical direction (also referred to as the column direction). FIG. 8(B) is a diagram describing the arrangement like FIG. 8(A) by using a structure where the structures of the switching circuits 55A and 55B and the output registers 55A and 55B in the arithmetic circuit 50 illustrated in FIG. 3(A) are simplified. The diagrams shown in FIGS. 8(A) and 8(B) illustrate the operation in the case where product-sum operation data based on generation of the multiplication data and generation of the addition data shown in FIGS. 7(A) and 7(B) is output to the adder circuit 41 through another arithmetic circuit.

Specifically, data input and output between the arithmetic circuits are shown as arrows in FIG. 8(B). Between adjacent arithmetic circuits, for example, between the arithmetic circuit 50_1 and the arithmetic circuit 50_2, the output signals out1 and out2 output from the arithmetic circuit 50_1 are input as the input addition data signal ain of the arithmetic circuit 50_2 without through the adder circuit 54 because of switching by the switching circuit 56. Between the arithmetic circuit 50_2 and the arithmetic circuit 50_3, the output signals out1 and out2 output from the arithmetic circuit 50_2 are input as the input addition data signal ain of the arithmetic circuit 50_3 without through the adder circuit 54 because of switching by the switching circuit 56. In other words, signals can be transferred to an arithmetic circuit electrically connected to another arithmetic circuit.

Next, the operation of the above-described neural network circuit will be described with reference to FIG. 9 to FIG. 26. Specifically, the operation of the neural network circuit at the time of performing arithmetic processing of a convolutional neural network, particularly product-sum operation processing between arithmetic circuits will be described in detail.

First, the sequence of arithmetic processing of a convolutional neural network performed in the following operation description will be described. FIG. 9(A) shows the sequence of the arithmetic processing of a convolutional neural network.

FIG. 9(A) illustrates an input layer 61, intermediate layers 62 (also referred to as hidden layers), and an output layer 63. In the input layer 61, an input process 70 (shown as Input in the diagram) of input data is shown. In the intermediate layers 62, convolutional operation processes 72, 73, and 75 (shown as Conv in the diagram) and a plurality of pooling operation processes 74 and 76 (shown as Pool. in the diagram) are shown. In the output layer 63, a fully connected operation process 77 (shown as Full in the diagram) is shown. The sequence of the arithmetic processing in the input layer 61, the intermediate layers 62, and the output layer 63 is an example, and it is possible that another arithmetic processing such as a softmax operation is performed in actual arithmetic processing of a convolutional neural network.

Arithmetic processing at the time of performing the convolutional neural network shown in FIG. 9(A) by using the data processing circuit 10 in FIG. 1 is visualized and shown in FIG. 9(B).

As the arithmetic processing using the data processing circuit 10 in FIG. 1, first, input data 71 and a filter 82 are subjected to a product-sum operation and convolution (the convolutional operation process 72), as illustrated in FIG. 9(B).

Note that as the input data 71, data of 20 (the vertical direction)×20 (the horizontal direction) with a channel direction (depth direction) of 1 is shown as an example. The arithmetic processing performed using the data processing circuit 10 in FIG. 1 is assumed to be a convolutional neural network (CNN) performed using MNIST (Mixed National Institute of Standards and Technology database: a dataset of handwritten digits "0 to 9" with correct labels) as the input data 71. Note that in the diagram, a symbol 81 represents a product-sum operation, here, a product-sum operation of the input data 71 and the filter 82. The filter 82 for performing the convolutional operation process 72 consists of nine 3×3 filters (shown as 3×3 Fil.9 in the diagram), and the stride is one. In addition, zero padding is not performed.

Data obtained by the product-sum operation of the input data 71 and the filter 82 is processed with a ReLU in the arithmetic unit 23 outside the product-sum operation circuit 40, whereby data 84 is obtained. The data 84 is 18×18 data with nine channels as a result of the convolutional operation process 72. Note that in the diagram, a symbol 83 represents processing with a rectified linear unit, which is an activation function, here, processing with a ReLU on data obtained by the product-sum operation.

The data 84 and a filter 85 are subjected to a product-sum operation and the convolutional operation process 73. The filter 85 for performing the convolutional operation process 73 consists of eighty-one 3×3 filters (shown as 3×3 Fil.81 in the diagram). Data obtained by the product-sum operation of the data 84 and the filter 82 is processed with a ReLU in the arithmetic unit 23 outside the product-sum operation circuit 40, whereby data 86 is obtained. The data 86 is 16×16 data with nine channels as a result of the convolutional operation process 73.

The data 86 is subjected to the pooling operation process 74 in the arithmetic unit 23 outside the product-sum operation circuit 40. In the pooling operation process 74, max pooling is performed, for example. The pooling operation process 74 is performed using a filter with a size of 2×2. Data obtained by the pooling operation process is denoted as data 87. The data 87 is 8×8 data with nine channels as a result of the pooling operation process 74.

The data 87 and a filter 88 are subjected to a product-sum operation and the convolutional operation process 75. The filter 88 for performing the convolutional operation process 75 consists of eighty-one 3×3 filters (shown as 3×3 Fil.81 in the diagram). The filter 88 includes nine types of filters for each channel of the input, that is, a total of 81 different filters. Data obtained by the product-sum operation of the data 87 and the filter 88 is processed with a ReLU in the arithmetic unit 23 outside the product-sum operation circuit 40, whereby data 89 is obtained. The data 89 is 6×6 data with nine channels as a result of the convolutional operation process 75.

The data 89 is subjected to the pooling operation process 76 in the arithmetic unit 23 outside the product-sum operation circuit 40. In the pooling operation process 76, max pooling is performed, for example. The pooling operation process 76 is performed using a filter with a size of 2×2. Data obtained by the pooling operation process is denoted as data 90. The data 90 is 3×3 data with nine channels, that is, 81 pieces of data as a result of the pooling operation process 76.

The data 90 and weight parameters 91 are subjected to a product-sum operation and the fully connected operation process 77. There are 810 types of weight parameters 91 for performing the fully connected operation process 77 because the number of inputs is 81 and the number of outputs is 10. Data obtained by the fully connected operation process 77 is denoted as data 92. The data 92 is 10 pieces of data as a result of the fully connected operation process 77.

Next, the operation at the time when the data processing circuit 10 including the product-sum operation circuit 40, which is shown in FIG. 1, performs the arithmetic processing in FIG. 9(B) will be described with reference to FIG. 10 to FIG. 26.

Figure 10A:
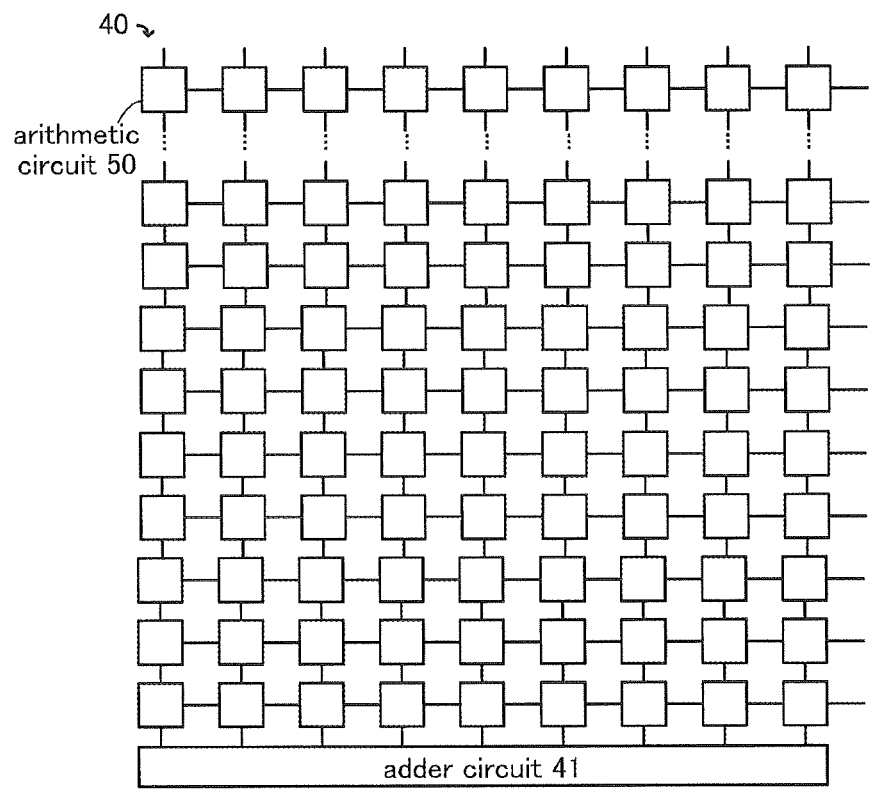
FIGS. 10A and 10B are diagrams for describing a neural network circuit.

FIG. 10(A) illustrates the product-sum operation circuit 40, which is also shown in FIG. 1. FIG. 10(A) shows a matrix of the arithmetic circuits 50 that are necessary for executing the convolutional operation processes 72, 73, and 75. FIG. 10(A) also illustrates the adder circuit 41.

Figure 10B:
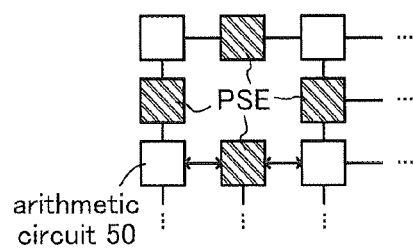

Note that electrical connection between the arithmetic circuits 50 can be switched by programmable switch elements as described above. FIG. 10(B) illustrates programmable switch elements PSE between the arithmetic circuits 50. The programmable switch element PSE is configured with a combination of a configuration memory and a switch. The configuration memory can be an SRAM or a memory using an OS transistor. The programmable switch element using an OS transistor can be provided by stacking elements such as transistors, and thus is advantageous in terms of integration.

Figure 11A:
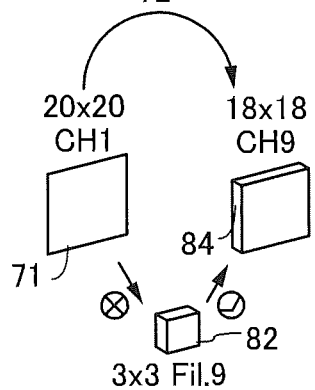
FIGS. 11A-11C are diagrams for describing a neural network circuit.

FIG. 11(A) selectively shows the convolutional operation process 72 described with reference to FIG. 9(B).

Figure 11B:
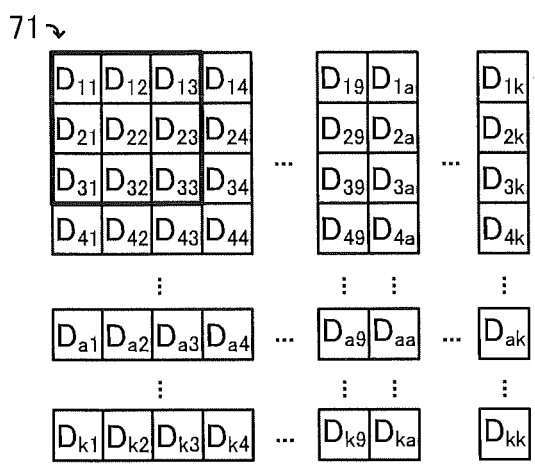

FIG. 11(B) is a diagram visualizing the input data 71. $D_{11}$ to $D_{1k}$ are shown as data in the row direction (the horizontal direction), and $D_{11}$ to $D_{k1}$ are shown as data in the column direction (the vertical direction). In FIG. 11(B), the data $D_{11}$ to $D_{33}$ enclosed by the bold line (i.e., nine pieces of $D_{11}$, $D_{12}$, $D_{13}$, $D_{21}$, $D_{22}$, $D_{23}$, $D_{31}$, $D_{32}$, and $D_{33}$) represent data subjected to product-sum operations with the 3×3 filter.

Without limitation to the input data 71, data obtained by performing a convolutional operation process on input data such as the data 84, 86, 87, and 89, which are described with reference to FIG. 9(B), can be illustrated in a similar manner to that of the input data 71 shown in FIG. 11(B). Accordingly, the data 84, 86, 87, and 89 are sometimes referred to as input data.

Figure 11C:
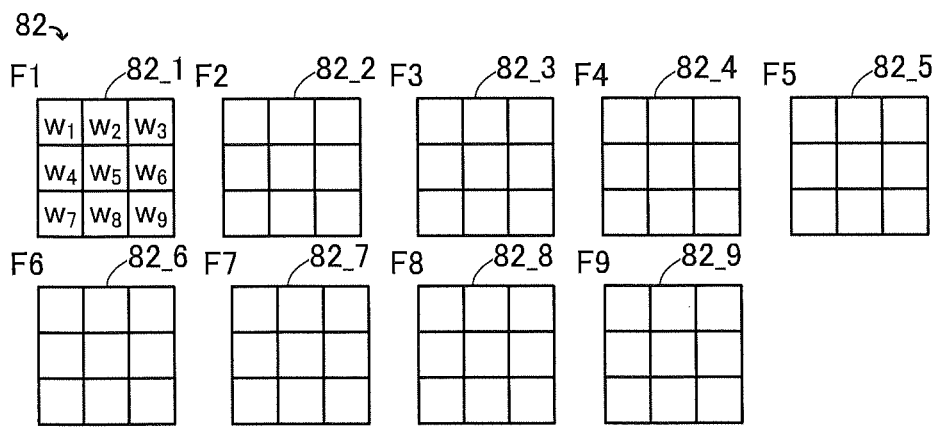

FIG. 11(C) is a diagram visualizing the filters used in the filter 82. The nine channels can be represented by filters 82_1 to 82_9 (F1 to F9) each of which is a 3×3 filter, as in FIG. 11(C). For example, the filter 82_1 includes 3×3 weight data. FIG. 11(C) shows weight data $w_1$ to $w_9$.

Without limitation to the filter 82, filters used in other convolutional operation processes, the fully connected operation process, and the like, such as the filters 85, 88, and 91, which are described with reference to FIG. 9(B), can be illustrated in a similar manner to that of the filter 82 shown in FIG. 11(C).

FIG. 12 to FIG. 15 are diagrams for describing the operation at the time when the product-sum operation circuit 40 shown in FIG. 10(A) performs the convolutional operation process 72 using the input data 71 and the filter 82 shown in FIGS. 11(B) and 11(C).

Figure 12A:
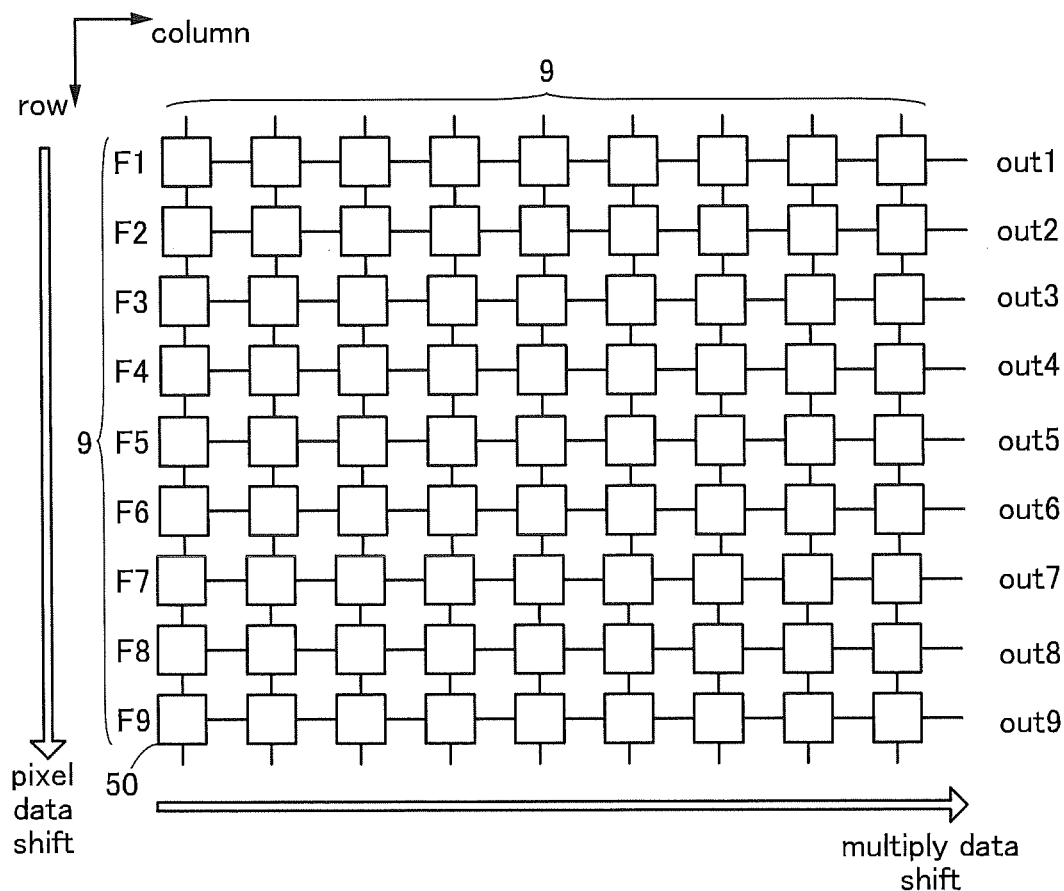
FIGS. 12A and 12B are diagrams for describing a neural network circuit.

As illustrated in FIG. 12(A), the convolutional operation process 72 is performed using 9×9 arithmetic circuits 50 in the product-sum operation circuit 40 shown in FIG. 10(A). In FIG. 12(A), the arithmetic circuits 50 are arranged in a matrix, and the row direction and the column direction are also shown. The row direction is a shift (pixel data shift) direction of image data that is input data. The column direction is a shift (multiply data shift) direction of multiplication data obtained by multiplication of input data and weight data.

In FIG. 12(A), in the arithmetic circuits 50 in the first row in the row direction, the weight data $w_1$ to $w_9$ of the filter F1, that is, the filter 82_1 are set in the respective columns. For example, the weight data are sequentially set in such a manner that $w_1$ is set in the arithmetic circuit 50 in the first row and the first column, $w_2$ in the arithmetic circuit 50 in the first row and the second column, and $w_3$ in the arithmetic circuit 50 in the first row and the third column. The setting can be performed by context switching with a context signal.

Next, the filter F2 is set in the arithmetic circuits 50 in the second row in the row direction. Similarly, the weight data of the filters F3 to F9 are set in the arithmetic circuits 50 in the third to ninth rows in the row direction.

The above setting of the weight data is made with the context "1". In the arithmetic circuit 50 in the first row and the first column, $D_{11} \times W_1$ that is the multiplication result is obtained. This is sequentially shifted in the column direction. Moreover, the input data $D_{11}$ in the first row and the first column is shifted in the row direction at the next timing. Then, as in the first row, the multiplication data is shifted in the column direction. The weight data of the filter F2, that is, the filter 82_2 are set in the arithmetic circuits 50 in the second row, and the multiplication data of each weight data of the filter F2 and input data are shifted in the column direction.

The input data is shifted also to the rows subsequent to the second row, and the multiplication data of the weight data of the set filters F3 to F9, that is, the filters 82_3 to 82_9 and the input data are generated and shifted in the column direction. The arithmetic circuits 50 in the ninth column and the first to ninth rows obtain output data corresponding to the product-sum operation of one of the filters (F1 to F9) and the input data. Terminals in the ninth column and the first to ninth rows are shown as out1 to out9.

Figure 12B:
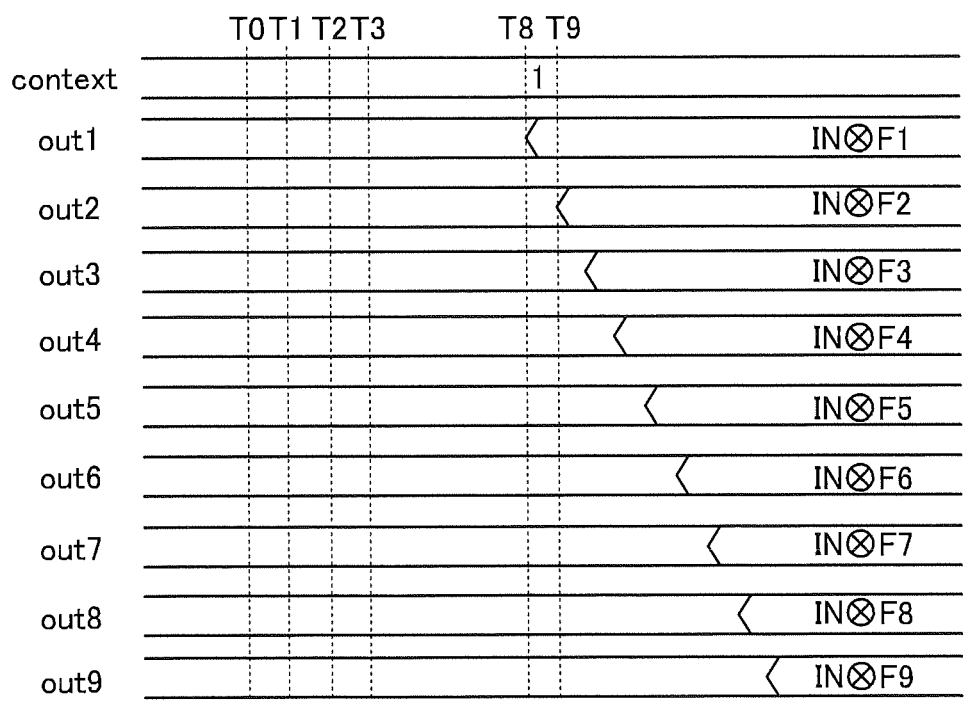

The summary of the operation in FIG. 12(A) can be represented as in FIG. 12(B). When the convolutional operation process 72 is performed, the context signal context is 1 for fixing with the context. The operation starts at Time T0, and after Time T8, the product-sum operation result (In×F1) of 3×3 input data $D_{11}$ to $D_{33}$ (the data enclosed by the bold line in FIG. 11(B)) and the filter F1 in the arithmetic circuit 50 in the first row and the ninth column is obtained at out1. Since the data is shifted in the row direction, the product-sum operation result of 3×3 input data $D_{11}$ to $D_{33}$ (the data enclosed by the bold line in FIG. 11(B)) and any one of the filters F2 to F9 in the arithmetic circuit 50 in the first row and the ninth column is obtained also at out2 to out9. By shifting the input data 71 as the input data $D_{12}$ to $D_{14}$, the input data $D_{22}$ to $D_{24}$, and the input data $D_{32}$ to $D_{34}$ (i.e., nine pieces of $D_{12}$, $D_{13}$, $D_{14}$, $D_{22}$, $D_{23}$, $D_{24}$, $D_{32}$, $D_{33}$, and $D_{34}$) in the row direction, the multiplication data of the filters F1 to F9 and all the coordinates of the input data 71 can be obtained.

A more specific example is described with reference to FIG. 13 to FIG. 15.

FIG. 13(A) is a diagram visualizing input data held in the arithmetic circuit 50 at Time T0. An arrow in the row direction indicates the shift direction of the input data. An arrow in the column direction indicates the shift direction of multiplication data. Note that "BL" shown in the diagram represents the arithmetic circuit 50 that is positioned in the shift direction of the input data in relation to the arithmetic circuit to which the input data has been input. In the diagram, the arithmetic circuit 50 shown as a blank is the arithmetic circuit 50 to which input data from the arithmetic circuit 50 in the previous row is not shifted, and is the arithmetic circuit 50 that can be power-gated. As illustrated in FIG. 13(A), $D_{11}$, which is the input data, is input to the arithmetic circuit 50 in the first row and the first column at Time T0. Then, the arithmetic circuit 50 in the first row and the first column generates multiplication data with the weight data $w_1$ held by context switching.

FIG. 13(B) is a diagram visualizing the input data held in the arithmetic circuits 50 at Time T1. As illustrated in FIG. 13(A), at Time T1, the input data $D_{11}$ in the first row and first column is shifted and input to the arithmetic circuit 50 in the second row and the first column. Moreover, the input data $D_{12}$ is input to the arithmetic circuits 50 in the first row and the first column and in the first row and the second column. Then, multiplication data of the input data $D_{12}$ and the weight data $w_1$ held by context switching and multiplication data of the input data $D_{12}$ and the weight data $w_2$ held by context switching are generated. At the same time, multiplication data of the input data $D_{11}$ and the weight data of the filter F2 is generated. At Time T1, addition data obtained by adding the multiplication data of the input data $D_{12}$ and the weight data $w_1$, which is obtained at Time T1, to the multiplication data of the input data $D_{11}$ and the weight data $w_1$, which is generated at Time T0, in the arithmetic circuit 50 in the first row and the second column is shifted in the column direction.

FIG. 14(A) is a diagram visualizing the input data held in the arithmetic circuits 50 at Time T2. As illustrated in FIG. 14(A), at Time T2, the input data $D_{11}$ in the second row and the first column is shifted and input to the arithmetic circuit 50 in the third row and the first column. Moreover, the input data $D_{12}$ in the first row and the first column and the input data $D_{12}$ in the first row and the second column are shifted and input to the arithmetic circuit 50 in the second row and the first column and the arithmetic circuit 50 in the second row and the second column, respectively. Furthermore, the input data $D_{13}$ is input to the arithmetic circuits 50 in the first row and the first column, the first row and the second column, and the first row and the third column. Then, multiplication data of the input data $D_{13}$ and the weight data $w_1$ held by context switching, multiplication data of the input data $D_{13}$ and the weight data $w_2$ held by context switching, and multiplication data of the input data $D_{13}$ and the weight data $w_3$ held by context switching are generated. At the same time, multiplication data of the input data $D_{11}$ and the weight data of the filter F3 and multiplication data of the input data $D_{12}$ and the weight data of the filter F2 are generated. At Time T2, addition data obtained by adding the multiplication data of the input data $D_{13}$ and the weight data $w_3$, which is obtained at Time T2, to the addition data generated at Time T2 in the arithmetic circuit 50 in the first row and the third column is shifted in the column direction.

FIG. 14(B) is a diagram visualizing the input data held in the arithmetic circuits 50 at Time T3. As illustrated in FIG. 14(B), at Time T3, the input data $D_{11}$ in the third row and the first column is shifted and input to the arithmetic circuit 50 in the fourth row and the first column. In addition, the input data $D_{12}$ in the second row and the first column and the input data $D_{12}$ in the second row and the second column are shifted and input to the arithmetic circuit 50 in the third row and the first column and the arithmetic circuit 50 in the third row and the second column, respectively. Moreover, $D_{13}$ in the first row and the first column, the input data $D_{13}$ in the first row and the second column, and the input data $D_{13}$ in the first row and the third column are shifted and input to the arithmetic circuit 50 in the second row and the first column, the arithmetic circuit 50 in the second row and the second column, and the arithmetic circuit 50 in the second row and the third column, respectively. Furthermore, the input data $D_{14}$, which is the input data, is input to the arithmetic circuits 50 in the first row and the first column, the first row and the second column, and the first row and the third column; and $D_{21}$ is input to the arithmetic circuit 50 in the first row and the fourth column. Then, multiplication data of the input data $D_{14}$ and the weight data $w_1$ held by context switching, multiplication data of the input data $D_{14}$ and the weight data $w_2$ held by context switching, multiplication data of the input data $D_{14}$ and the weight data $w_3$ held by context switching, and multiplication data of the input data $D_{21}$ and the weight data $w_4$ held by context switching are generated. At the same time, multiplication data of the input data $D_{11}$ and the weight data of the filter F4, multiplication data of the input data $D_{12}$ and the weight data of the filter F3, and multiplication data of the input data $D_{13}$ and the weight data of the filter F2 are generated. At Time T3, addition data obtained by adding the multiplication data of the input data $D_{21}$ and $w_4$, which is obtained at Time T3, to the addition data generated at Time T3 in the arithmetic circuit 50 in the first row and the fourth column is shifted in the column direction.

Shift of the input data and shift of data obtained by adding multiplication data and addition data from Time T4 to T7 make a state at Time T8 shown in FIG. 15(A).

At Time T8 shown in FIG. 15(A), the input data $D_{11}$ is shifted to the ninth row and the first column; the input data $D_{33}$ is input to the first row and the ninth column and multiplication data with the weight data $w_9$ is generated; and addition data obtained by adding the multiplication data and addition data that is the product-sum operation result generated in the first row and the eight column is generated. The addition data is output from out1. The addition data is the product-sum operation result of the 3×3 input data $D_{11}$ to $D_{33}$ and the weight data $w_1$ to $w_9$ of the filter F1, that is, $D_{11} \cdot w_1 + (\ldots) + D_{33} w_9$. This operation result corresponds to part of the product-sum operation of the input data enclosed by the bold line in FIG. 11(B) and the filter F1.

At Time T9 shown in FIG. 15(B), the input data $D_{12}$ is shifted to the ninth row and the first column; the input data $D_{33}$ is input to the second row and the ninth column and multiplication data with the weight data $w_9$ is generated; and addition data obtained by adding the multiplication data and addition data that is the product-sum operation result generated in the first row and the eight column is generated. The addition data is output from out2. The addition data is the product-sum operation result of the input data $D_{11}$ to $D_{33}$ and the weight data of the filter F2. This operation result corresponds to the product-sum operation of the input data enclosed by the bold line in FIG. 11(B) and the filter F2.

In the structure of the neural network circuit of this embodiment, multiplication data and addition data can be efficiently generated in each arithmetic circuit, and product-sum operations can be efficiently conducted. Therefore, a problem of the increase in circuit size of a neural network circuit, accompanied by the increase in input data, weight data, and the like, can be solved. In other words, product-sum operations for different processes can be performed using the same circuit; thus, circuit resources can be effectively utilized.

FIG. 16 to FIG. 21 are diagrams for describing the operation at the time when the convolutional operation processes 73 and 75 by the product-sum operation circuit 40 shown in FIG. 10(A) are performed using the data shown in FIGS. 11(B) and 11(C).

Figure 16A:
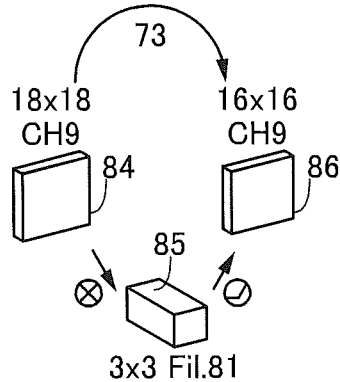
FIGS. 16A-16D are diagrams for describing a neural network circuit.
Figure 16B:
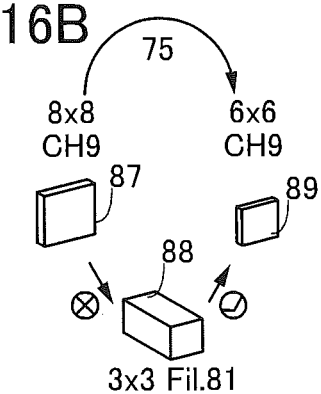
Figure 16C:
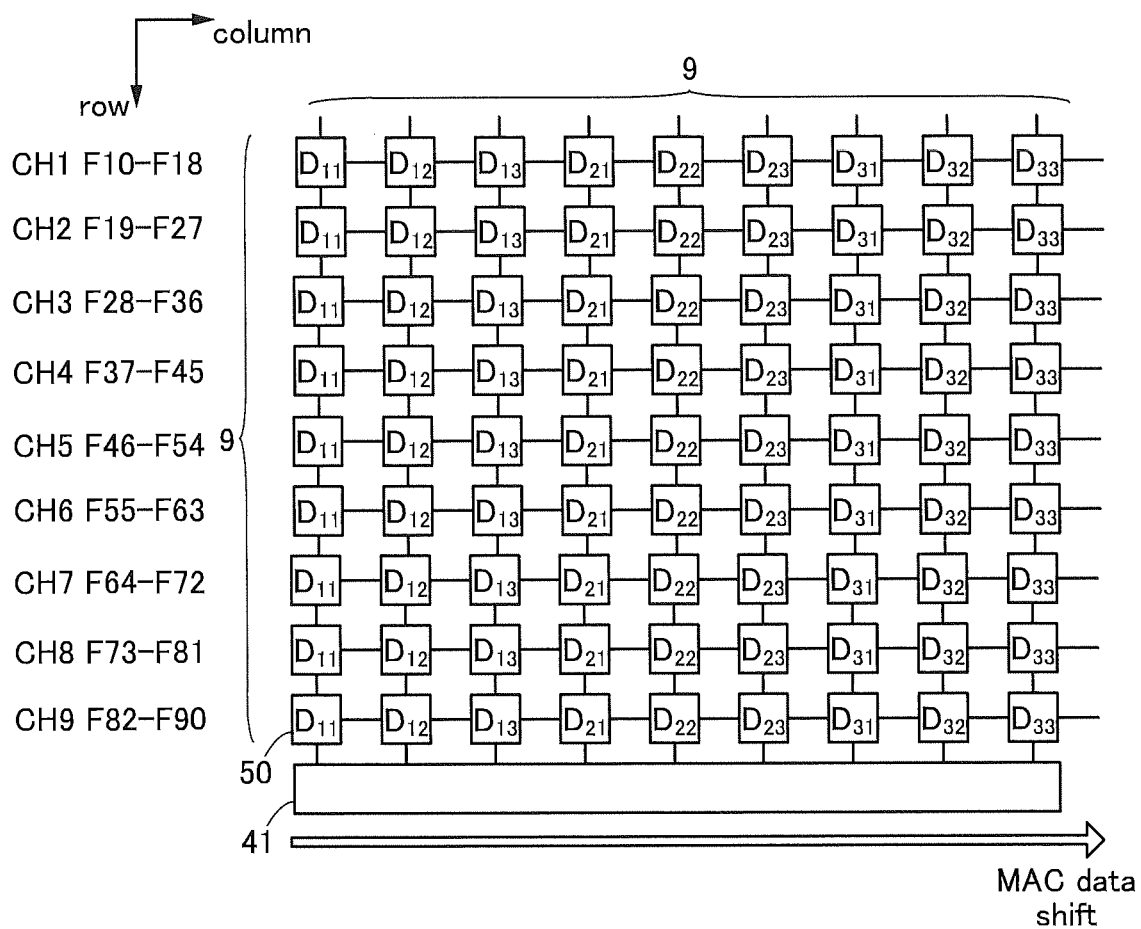

FIGS. 16(A) and 16(B) selectively show the convolutional operation processes 73 and 75 described with reference to FIG. 9(B). The convolutional operation processes 73 and 75 are performed using 9×9 arithmetic circuits 50 in the product-sum operation circuit 40 shown in FIG. 10. In FIG. 16(C), the arithmetic circuits 50 are arranged in a matrix, and the row direction and the column direction are shown, as in FIG. 12(A). The column direction is a shift (MAC data shift) direction of product-sum operation data obtained from input data (corresponding to the data 84 or 87) and weight data (weight data included in the filter 85 or the filter 88).

In FIG. 16(C), input data is set in each column such that the input data $D_{11}$ (hereinafter abbreviated as $D_{11}$) is set in the arithmetic circuits 50 in the first column and $D_{12}$ in the arithmetic circuits 50 in the second column. The input data is set by shifting the data from the first row and writing the data in all the rows. As a result, $D_{11}$ to $D_{33}$ are set in the respective columns as shown in FIG. 16(C). Note that the arithmetic circuits 50 perform product-sum operation processing for each input channel in the row direction. Accordingly, data corresponding to the input channel 1 is in the first row, data corresponding to the input channel 2 is in the second row, and data corresponding to the input channel 9 is in the ninth row. In addition, in FIG. 16(C), in the arithmetic circuits 50 in the first row in the row direction, weight data of nine types of filters F10 to F18 (hereinafter abbreviated as F10 to F18)) for performing arithmetic operations on the input channel 1 are set in the respective columns. Multiplication data is obtained by multiplication of the context set, that is, the filter set, and $D_{11}$ to $D_{33}$, which are set in advance; the multiplication result is output as addition data to the arithmetic circuit 50 in the next column; and a product-sum operation is performed. For example, in the context 2, weight data are set such that F10 weight data is set in the arithmetic circuit 50 in the first row and the first column, F11 weight data in the arithmetic circuit 50 in the first row and the second column, and F12 weight data in the arithmetic circuit 50 in the first row and the third column. In the context 3 and the following contexts, the filters corresponding to the arithmetic circuits 50 are shifted in the column direction. The filter corresponding to the arithmetic circuit 50 in the ninth column returns to the first column. For example, in the context 3, weight data are set such that F18 weight data is set in the arithmetic circuit 50 in the first row and the first column, F10 weight data in the arithmetic circuit 50 in the first row and the second column, and F11 weight data in the arithmetic circuit 50 in the first row and the third column. The weight data that is set can be switched to weight data of another filter by context switching.

At the same time, weight data corresponding to a filter is set in the arithmetic circuits 50 in the second and subsequent rows. For example, in the context 2, weight data are set such that F19 weight data is set in the arithmetic circuit 50 in the second row and the first column, F20 weight data in the arithmetic circuit 50 in the second row and the second column, and F21 weight data in the arithmetic circuit 50 in the second row and the third column. In the context 3 and the following contexts, the filters corresponding to the arithmetic circuits 50 are shifted in the column direction. The filter corresponding to the arithmetic circuit 50 in the ninth column returns to the first column. For example, in the context 3, weight data are set such that F27 weight data is set in the arithmetic circuit 50 in the second row and the first column, F19 weight data in the arithmetic circuit 50 in the second row and the second column, and F20 weight data in the arithmetic circuit 50 in the second row and the third column. The weight data that is set can be switched to weight data of another filter by context switching. The context is switched until the filters are shifted through the nine columns of the arithmetic circuits. That is, the context is switched from the context 2 up to the context 10.

The product-sum operation data obtained by the shift of the product-sum operation results is read out to the adder circuit 41. The adder circuit 41 adds the product-sum operation data in one column. Data obtained by performing processing with a ReLU on the thus obtained data in the arithmetic unit 23 outside the product-sum operation circuit 40 corresponds to data after the convolutional operation process.

Figure 16D:
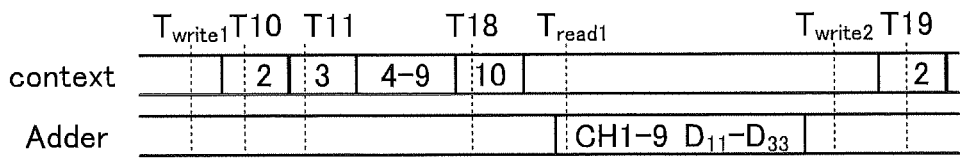

The summary of the above-described operation in FIG. 16(C) can be represented as in FIG. 16(D). When the convolutional operation processes 73 and 75 are performed, the context signal context is switched from 2 up to 10 so that product-sum operations of $D_{11}$ to $D_{33}$ and different filters are executed. After $D_{11}$ to $D_{33}$ are set in the arithmetic circuits 50 at Time $T_{write1}$, the context signal is switched from 2 up to 10 at Time T10 to T18. After the product-sum operation results of $D_{11}$ to $D_{33}$, which are 3×3 input data, and the nine filters are obtained in the arithmetic circuit 50 in each row and each column, they are read out to the adder circuit 41 at Time $T_{read1}$, and data subjected to the convolutional operation process (CH1-9 $D_{11}$-$D_{33}$) are obtained. Then, $D_{12}$ to $D_{34}$ are set in the arithmetic circuits 50 as the next input data (Time $T_{write2}$), the contexts 2 to 10 are switched, and a product-sum operation is executed in each row.

A more specific example is described with reference to FIG. 17 to FIG. 20.

FIG. 17(A) is a diagram visualizing the input data held in the arithmetic circuits 50 at Time $T_{write1}$.

As illustrated in FIG. 17(A), $D_{11}$ to $D_{33}$ are set in the respective columns. Note that a set of weight data is written to the memory 52 in the arithmetic circuit 50. The set of weight data is switched in response to context switching.

FIG. 17(B) is a diagram visualizing the input data held in the arithmetic circuits 50 at Time T10.

At time T10, the context "2" is set by switching of the context signal, and filters for performing multiplication are set in the arithmetic circuits 50 as shown in FIG. 17(B). In FIG. 17(B), an arrow in the column direction indicates the shift direction of multiplication data or addition data obtained by adding addition data of the previous column to the multiplication data. "F10" and the like written between the arithmetic circuits 50 in one row represent filters for the product-sum operation with the filter F10. Data obtained by the arithmetic operation is added to addition data of the previous column, and the resulting data is output as addition data to the arithmetic circuit 50 in the data shift direction.

For example, when the description is made with a focus on the operation in the arithmetic circuits 50 in the first row, the first-column arithmetic circuit 50 in which $D_{11}$ is held performs an arithmetic operation with the filter F10. The obtained data is output to the second-column arithmetic circuit 50. At the same time, the second-column arithmetic circuit 50 in which $D_{12}$ is held performs an arithmetic operation with the filter F11. The obtained data is output to the third-column arithmetic circuit 50. The arithmetic circuits 50 in the third column to the eighth column also perform an arithmetic operation with the respective filters F12 to F17 and output the obtained data to the arithmetic circuits 50. At the same time, the ninth-column arithmetic circuit 50 in which $D_{33}$ is held performs an arithmetic operation with the filter F18. The obtained data is output to the first-column arithmetic circuit 50. In the second and subsequent rows, an arithmetic operation of the held input data and the filter is performed and the obtained data is output to the arithmetic circuits 50.

FIG. 18(A) is a diagram visualizing the input data held in the arithmetic circuits 50 at Time T11.

At time T11, the context "3" is set by switching of the context signal, and filters for performing multiplication are set in the arithmetic circuits 50 as shown in FIG. 18(A). For example, when the description is made with a focus on the operation in the arithmetic circuits 50 in the first row, the first-column arithmetic circuit 50 in which $D_{11}$ is held performs an arithmetic operation with the filter F18. The obtained data is added to data output from the ninth-column arithmetic circuit 50, and the resulting data is output to the second-column arithmetic circuit 50. At the same time, the second-column arithmetic circuit 50 in which $D_{12}$ is held performs an arithmetic operation with the filter F10. The obtained data is added to the data output from the first-column arithmetic circuit 50, and the resulting data is output to the third-column arithmetic circuit 50. The arithmetic circuits 50 in the third column to the eighth column also perform an arithmetic operation with the respective filters F11 to F16 and output the obtained data to the arithmetic circuits 50. At the same time, the ninth-column arithmetic circuit 50 in which $D_{33}$ is held performs an arithmetic operation with the filter F17. The obtained data is added to the data output from the eighth-column arithmetic circuit 50, and the resulting data is output to the first-column arithmetic circuit 50. In the second and subsequent rows, an arithmetic operation of the held data and the filter is performed and the obtained data is output to the arithmetic circuits 50. From Time T12 to Time T17, the contexts "3 to 9" are set by switching of the context signal, weight data for performing multiplication in the following arithmetic circuits 50 is set, an arithmetic operation of the held input data and the filters is performed, and the obtained data is output to the arithmetic circuits 50.

FIG. 18(B) is a diagram visualizing the input data held in the arithmetic circuits 50 at Time T18.

At time T18, the context "10" is set by switching of the context signal, and filters for performing multiplication in the following arithmetic circuits 50 are set as shown in FIG. 18(B). For example, when the description is made with a focus on the operation in the arithmetic circuits 50 in the first row, the first-column arithmetic circuit 50 in which $D_{11}$ is held performs an arithmetic operation with the filter F11. The obtained data is added to data output from the ninth-column arithmetic circuit 50, and the resulting data is output to the second-column arithmetic circuit 50. Here, the data output to the second-column arithmetic circuit 50 is the product-sum operation data obtained by adding data multiplied in the arithmetic circuits 50 in the first column and the third to ninth columns. At the same time, the second-column arithmetic circuit 50 in which $D_{12}$ is held performs an arithmetic operation with the filter F12. The obtained data is added to the data output from the first-column arithmetic circuit 50, and the resulting data is output to the third-column arithmetic circuit 50. Here, the data output to the third-column arithmetic circuit 50 is the product-sum operation data obtained by adding data multiplied in the arithmetic circuits 50 in the first column, the second column, and the fourth to ninth columns. The arithmetic circuits 50 in the third column to the eighth column also perform an arithmetic operation with the respective filters F13 to F18 and output the obtained data to the arithmetic circuits 50. At the same time, the ninth-column arithmetic circuit 50 in which $D_{33}$ is held performs an arithmetic operation with the filter F10. The obtained data is added to the data output from the eighth-column arithmetic circuit 50, and the resulting data is output to the first-column arithmetic circuit 50. Here, the data output to the first-column arithmetic circuit 50 is the product-sum operation data obtained by adding data multiplied in the arithmetic circuits 50 in the second to ninth columns. In the second and subsequent rows, a product-sum operation of the held input data and the filter is performed and the obtained data is output to the arithmetic circuits 50. In other words, data obtained by the product-sum operation of $D_{11}$ to $D_{33}$ and a plurality of filters in each row is retained in each arithmetic circuit 50 in the state at Time T18.

FIG. 19(A) is a diagram visualizing the operation at Time $T_{read1}$.

An arrow in the row direction indicates the shift direction of the product-sum operation data obtained from T10 to T18. As illustrated in FIG. 19(A), at Time $T_{read1}$, the product-sum operation data held in the first to ninth rows are sequentially shifted to the adder circuit 41, and the sum of the obtained data is obtained in each column. The data obtained by the adder circuit 41 is processed with a ReLU in the arithmetic unit 23 outside the product-sum operation circuit 40, whereby data that are $D_{11}$ to $D_{33}$ subjected to the convolutional operation process are obtained.

FIG. 19(B) is a diagram visualizing the input data held in the arithmetic circuits 50 at Time Twrite2.

As illustrated in FIG. 19(B), $D_{12}$ to $D_{34}$ are set in the respective columns.

Figure 20:
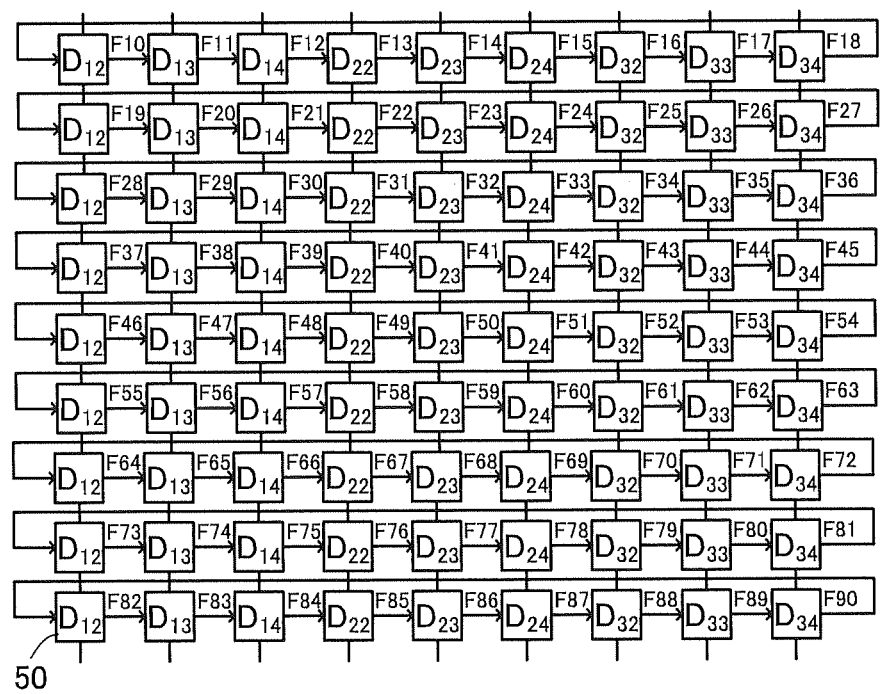
FIG. 20 A block

FIG. 20 is a diagram visualizing the input data held in the arithmetic circuits 50 at Time T19.

At time T19, the context "2" is set by switching of the context signal, and filters for performing multiplication in the following arithmetic circuits 50 are set as shown in FIG. 20. For example, when the description is made with a focus on the operation in the arithmetic circuits 50 in the first row, the first-column arithmetic circuit 50 in which $D_{12}$ is held performs an arithmetic operation with the filter F10. The obtained data is output to the second-column arithmetic circuit 50. At the same time, the second-column arithmetic circuit 50 in which $D_{13}$ is held performs an arithmetic operation with the filter F11. The obtained data is output to the third-column arithmetic circuit 50. The arithmetic circuits 50 in the third column to the eighth column also perform an arithmetic operation with the respective filters F12 to F17 and output the obtained data to the arithmetic circuits 50. At the same time, the ninth-column arithmetic circuit 50 in which $D_{34}$ is held performs an arithmetic operation with the filter F18. The obtained data is output to the first-column arithmetic circuit 50. In the second and subsequent rows, an arithmetic operation of the held input data and the filter is performed and the obtained data is output to the arithmetic circuits 50.

Subsequently, multiplication data are added by switching input data that is held in the arithmetic circuits 50 and a context, and an arithmetic operation corresponding to the convolutional operation process is performed.

In the structure of the neural network circuit of this embodiment, multiplication data and addition data can be efficiently generated in each arithmetic circuit and are combined with context switching, whereby product-sum operations based on arithmetic processing using different filters can be efficiently conducted. Therefore, a problem of the increase in circuit size of a neural network circuit, accompanied by the increase in input data, weight data, and the like, can be solved. In other words, product-sum operations for different processes can be performed using the same circuit; thus, circuit resources can be effectively utilized.

Here, an arithmetic model for the product-sum operation described with reference to FIG. 16 to FIG. 20 is described with reference to FIGS. 21(A) to 21(F).

In the description of FIGS. 21(A) to 21(F), the case of performing the product-sum operation of filters ($W_{11}$, $W_{12}$, $W_{13}$, $W_{14}$), ($W_{21}$, $W_{22}$, $W_{23}$, $W_{24}$), ($W_{31}$, $W_{32}$, $W_{33}$, $W_{34}$), and ($W_{41}$, $W_{42}$, $W_{43}$, $W_{44}$) having four different types of weight data and input data ($I_1$, $I_2$, $I_3$, $I_4$) is described. By using the above method for the arithmetic processing described with reference to FIG. 16 to FIG. 20, product-sum operations can proceed in parallel while data obtained by a plurality of arithmetic circuits are looped.

A product-sum operation with a plurality of filters (a convolutional operation) can be expressed by a matrix-vector product as shown in Formula (1).

$$\begin{pmatrix} Y_1 \\ Y_2 \\ Y_3 \\ Y_4 \end{pmatrix} = \begin{pmatrix} W_{11} & W_{12} & W_{13} & W_{14} \\ W_{21} & W_{22} & W_{23} & W_{24} \\ W_{31} & W_{23} & W_{33} & W_{34} \\ W_{41} & W_{24} & W_{43} & W_{44} \end{pmatrix} \begin{pmatrix} I_1 \\ I_2 \\ I_3 \\ I_4 \end{pmatrix} \quad (1)$$

A 4×4 matrix that consists of W corresponds to weight data (elements of one row correspond to components of one filter). A 1×4 matrix that is composed of I corresponds to input data. A 1×4 matrix that is composed of Y ($Y_1$ to $Y_4$) corresponds to data obtained by a product-sum operation.

Figure 21A:
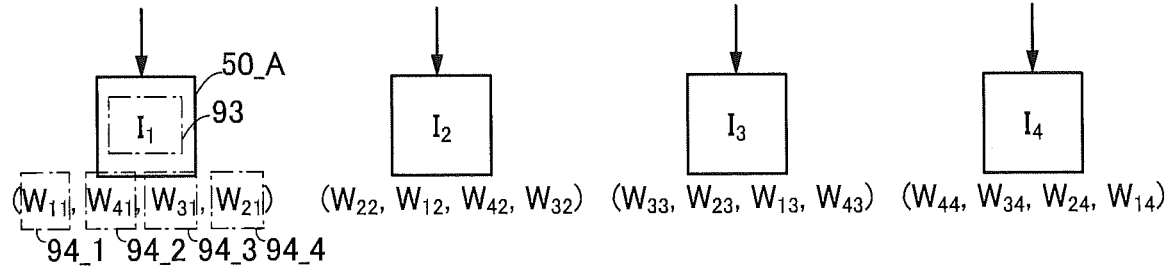
FIGS. 21A-21F are diagrams for describing a neural network circuit.

When applied to an arithmetic model for performing a product-sum operation using the above-described arithmetic circuit 50, the matrix-vector product of Formula (1) can be shown as in FIG. 21(A). That is, the input data $I_1$ to $I_4$ are held as input data 93 of respective arithmetic circuits 50_A. Moreover, the weight data of the filters ($W_{11}$, $W_{12}$, $W_{13}$, $W_{14}$), ($W_{21}$, $W_{22}$, $W_{23}$, $W_{24}$), ($W_{31}$, $W_{32}$, $W_{33}$, $W_{34}$), and ($W_{41}$, $W_{42}$, $W_{43}$, $W_{44}$) are written to memories of the respective arithmetic circuits 50A and can be used as different weight data 94_1 to 94_4 in response to context switching to generate multiplication data. Hereinafter, the description is made assuming that the arithmetic processing progresses every clock (1 clk).

Figure 21B:
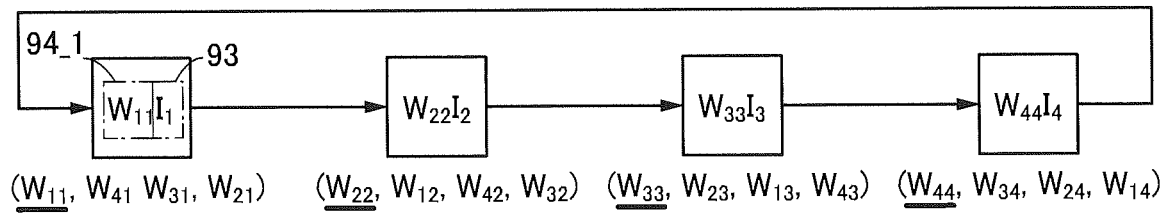

After 1 clk after input data is written to the arithmetic circuit 50_A, given weight data from a set of weight data is set by context switching. Specifically, the weight data ($W_{11}$, $W_{22}$, $W_{33}$, $W_{44}$) that are underlined in FIG. 21(B) are set, and the arithmetic circuits 50_A generate multiplication data with the held input data ($I_1$, $I_2$, $I_3$, $I_4$). The arithmetic circuits 50_A generate multiplication data ($W_{11} \cdot I_1$, $W_{22} \cdot I_2$, $W_{33} \cdot I_3$, $W_{44} \cdot I_4$) of the input data 93 and the weight data 94_1.

Figure 21C:
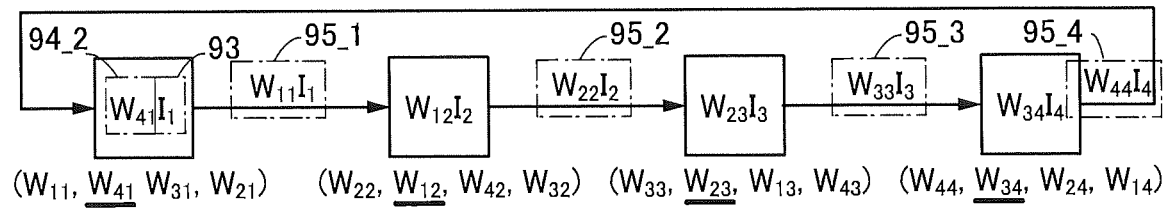

Next, in FIG. 21(C) after 1 clk from the state in FIG. 21(B), weight data of a context different from FIG. 21(B) is set. Specifically, the weight data ($W_{41}$, $W_{12}$, $W_{23}$, $W_{34}$) that are underlined in FIG. 21(C) are set, and the arithmetic circuits 50_A generate multiplication data with the held input data ($I_1$, $I_2$, $I_3$, $I_4$). The arithmetic circuits 50_A generate multiplication data ($W_{41} \cdot I_1$, $W_{12} \cdot I_2$, $W_{23} \cdot I_3$, $W_{34} \cdot I_4$) of the input data 93 and the weight data 94_2. Furthermore, the arithmetic circuits 90_A output the multiplication data ($W_{11} \cdot I_1$, $W_{22} \cdot I_2$, $W_{33} \cdot I_3$, $W_{44} \cdot I_4$), which are generated in the state of FIG. 21(B), as next-column addition data to the arithmetic circuits 50_A in the next columns.

Figure 21D:
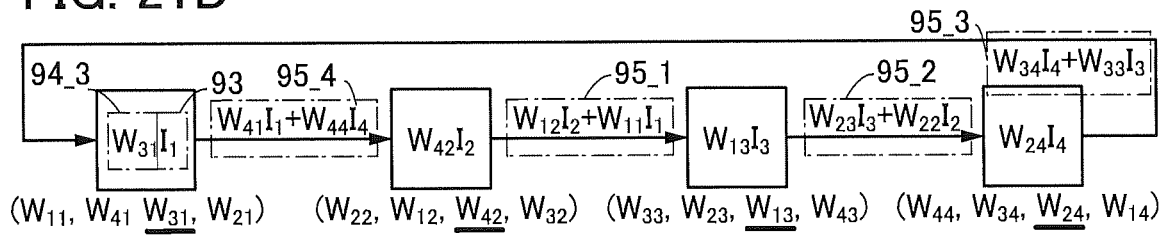

Next, in FIG. 21(D) after 1 clk from the state in FIG. 21(C), weight data of a context different from FIG. 21(C) is set. Specifically, the weight data ($W_{31}$, $W_{42}$, $W_{13}$, $W_{24}$) that are underlined in FIG. 21(D) are set, and the arithmetic circuits 50_A generate multiplication data with the held input data ($I_1$, $I_2$, $I_3$, $I_4$). For example, the arithmetic circuits 50_A generate multiplication data ($W_{31} \cdot I_1$, $W_{42} \cdot I_2$, $W_{13} \cdot I_3$, $W_{24} \cdot I_4$) of the input data 93 and the weight data 94_3. Furthermore, the arithmetic circuits 90_A output product-sum operation data ($W_{12} \cdot I_2 + W_{11} \cdot I_1$, $W_{23} \cdot I_3 + W_{22} \cdot I_2$, $W_{34} \cdot I_4 + W_{33} \cdot I_3$, $W_{41} \cdot I_1 + W_{44} \cdot I_4$) obtained by adding the multiplication data ($W_{41} \cdot I_1$, $W_{12} \cdot I_2$, $W_{23} \cdot I_3$, $W_{34} \cdot I_4$) to the addition data ($W_{11} \cdot I_1$, $W_{22} \cdot I_2$, $W_{33} \cdot I_3$, $W_{44} \cdot I_4$), which are output in FIG. 21(C), as next-column addition data to the arithmetic circuits 50_A in the next columns.

Figure 21E:
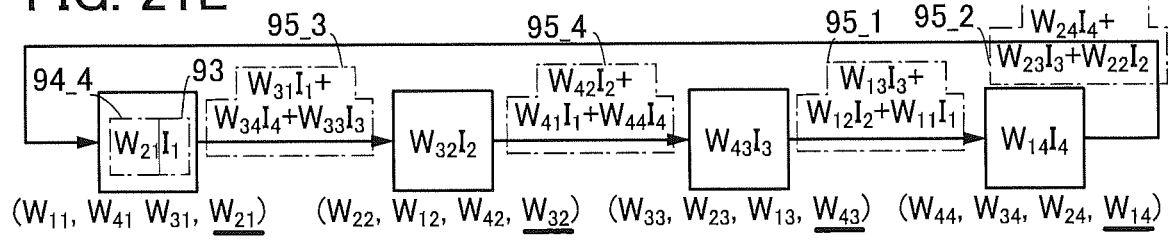

Next, in FIG. 21(E) after 1 clk from the state in FIG. 21(D), weight data of a context different from FIG. 21(D) is set. Specifically, the weight data ($W_{21}$, $W_{32}$, $W_{43}$, $W_{14}$) that are underlined in FIG. 21(E) are set, and the arithmetic circuits 50_A generate multiplication data with the held input data ($I_1$, $I_2$, $I_3$, $I_4$). For example, the arithmetic circuits 50_A generate multiplication data ($W_{21} \cdot I_1$, $W_{32} \cdot I_2$, $W_{43} \cdot I_3$, $W_{14} \cdot I_4$) of the input data 93 and the weight data 94_4. Furthermore, the arithmetic circuits 90_A output product-sum operation data ($W_{13} \cdot I_3 + W_{12} \cdot I_2 + W_{11} \cdot I_1$, $W_{24} \cdot I_4 + W_{23} \cdot I_3 + W_{22} \cdot I_2$, $W_{31} \cdot I_1 + W_{34} \cdot I_4 + W_{33} \cdot I_3$, $W_{42} \cdot I_2 + W_{41} \cdot I_1 + W_{44} \cdot I_4$) obtained by adding the multiplication data ($W_{31} \cdot I_1$, $W_{42} \cdot I_2$, $W_{13} \cdot I_3$, $W_{24} \cdot I_4$) to the addition data ($W_{12} \cdot I_2 + W_{11} \cdot I_1$, $W_{23} \cdot I_3 + W_{22} \cdot I_2$, $W_{34} \cdot I_4 + W_{33} \cdot I_3$, $W_{41} \cdot I_1 + W_{44} \cdot I_4$), which are output in FIG. 21(D), as next-column addition data to the arithmetic circuits 50_A in the next columns.

Figure 21F:
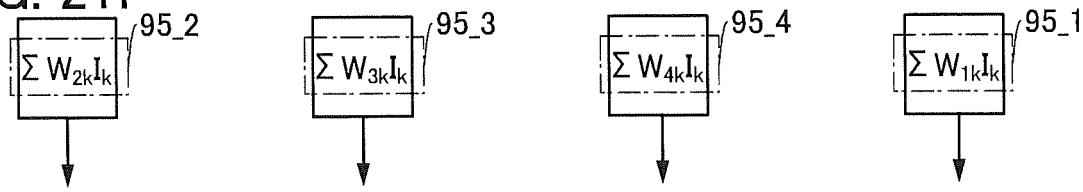

Next, in FIG. 21(E) after 1 clk from the state in FIG. 21(D), the arithmetic circuits 90_A obtain product-sum operation data obtained by adding the multiplication data ($W_{31} \cdot I_1$, $W_{42} \cdot I_2$, $W_{13} \cdot I_3$, $W_{24} \cdot I_4$) to the addition data ($W_{13} \cdot I_3 + W_{12} \cdot I_2 + W_{11} \cdot I_1$, $W_{24} \cdot I_4 + W_{23} \cdot I_3 + W_{22} \cdot I_2$, $W_{31} \cdot I_1 + W_{34} \cdot I_4 + W_{33} \cdot I_3$, $W_{42} \cdot I_2 + W_{41} \cdot I_1 + W_{44} \cdot I_4$), which are output in FIG. 21(E). As shown in FIG. 21(F), the respective arithmetic circuits can obtain product-sum operation data 95_2 ($W_{21} \cdot I_1 + W_{24} \cdot I_4 + W_{23} \cdot I_3 + W_{22} \cdot I_2$, $W_{31} \cdot I_1$), product-sum operation data 95_3 ($W_{32} \cdot I_2 + W_{31} \cdot I_1 + W_{34} \cdot I_4 + W_{33} \cdot I_3$), product-sum operation data 95_4 ($W_{43} \cdot I_3 + W_{42} \cdot I_2 + W_{41} \cdot I_1 + W_{44} \cdot I_4$), and product-sum operation data 95_1 ($W_{14} \cdot I_4 + W_{13} \cdot I_3 + W_{12} \cdot I_2 + W_{11} \cdot I_1$). The obtained product-sum operation data correspond to Y ($Y_1$ to $Y_4$) expressed by the matrix-vector product.

With the architecture in FIGS. 21(A) to 21(F), data access to an external memory is unnecessary during an arithmetic operation, and product-sum operation data can be efficiently obtained while data are transmitted in parallel between all the arithmetic circuits. Therefore, a problem of the increase in circuit size of a neural network circuit, accompanied by the increase in input data, weight data, and the like, can be solved.

FIG. 22 to FIG. 26 are diagrams for describing the operation at the time when the fully connected operation process 77 by the product-sum operation circuit 40 shown in FIG. 10 is performed using the data shown in FIGS. 11(B) and 11(C).

Figure 22A:
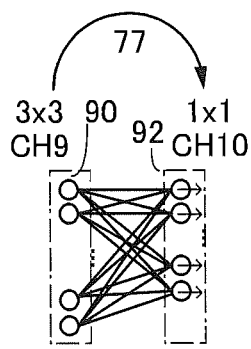
FIGS. 22A and 22B are diagrams for describing a neural network circuit.
Figure 22B:
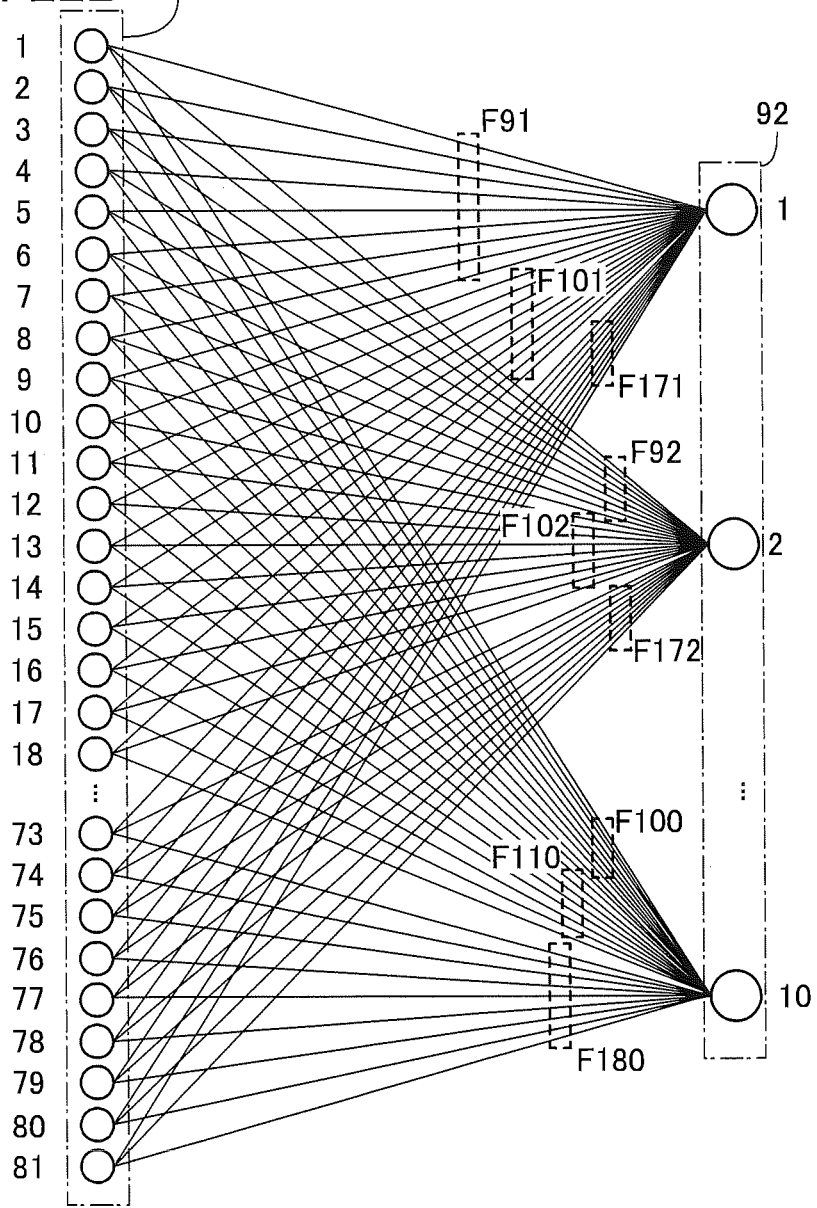

FIG. 22(A) selectively shows the fully connected operation process 77 described with reference to FIG. 9(B). FIG. 22(B) is a diagram for describing a convolutional operation process in which 81 pieces of the data 90 become the data 92 with the number of labels to be determined, here, the number of channels of 10 in the fully connected operation process 77.

FIG. 22(B) illustrates a state in which a product-sum operation of each of the 81 pieces of data and weight parameters is performed for one label of the data 92, and then arithmetic processing of adding the obtained values is performed. Although a filter is not used in the fully connected operation process, the fully connected operation process is performed utilizing the circuit resources of the aforementioned convolutional operation process, and thus the arithmetic operation is performed with a circuit size similar to that for the convolutional operation process. Accordingly, it is effective to perform product-sum operation with the 81 input data divided into groups of nine data. The product-sum operation is performed on every nine input data; a weight parameter group used for the product-sum operation performed on nine data of input data Nos. 1 to 9 (numbers given to the data 90 in FIG. 22(B)) and output data No. 1 (a number given to the data 92 in FIG. 22(B)) is referred to as F91. Moreover, weight parameter groups used for the product-sum operation performed on nine data of the input data Nos. 1 to 9 and output data Nos. 2 to 10 (numbers given to the data 92 in FIG. 22(B)) are referred to as F92 to F100. Similarly, weight parameter groups used for the product-sum operation performed on nine data of input data Nos. 10 to 18 (numbers given to the data 90 in FIG. 22(B)) and the output data Nos. 1 to 10 (the numbers given to the data 92 in FIG. 22(B)) are referred to as F101 to F110, F111 to F120, F121 to F130, F131 to F140, F141 to F150, F151 to F160, F161 to F170, and F171 to F180.

Figure 23A:
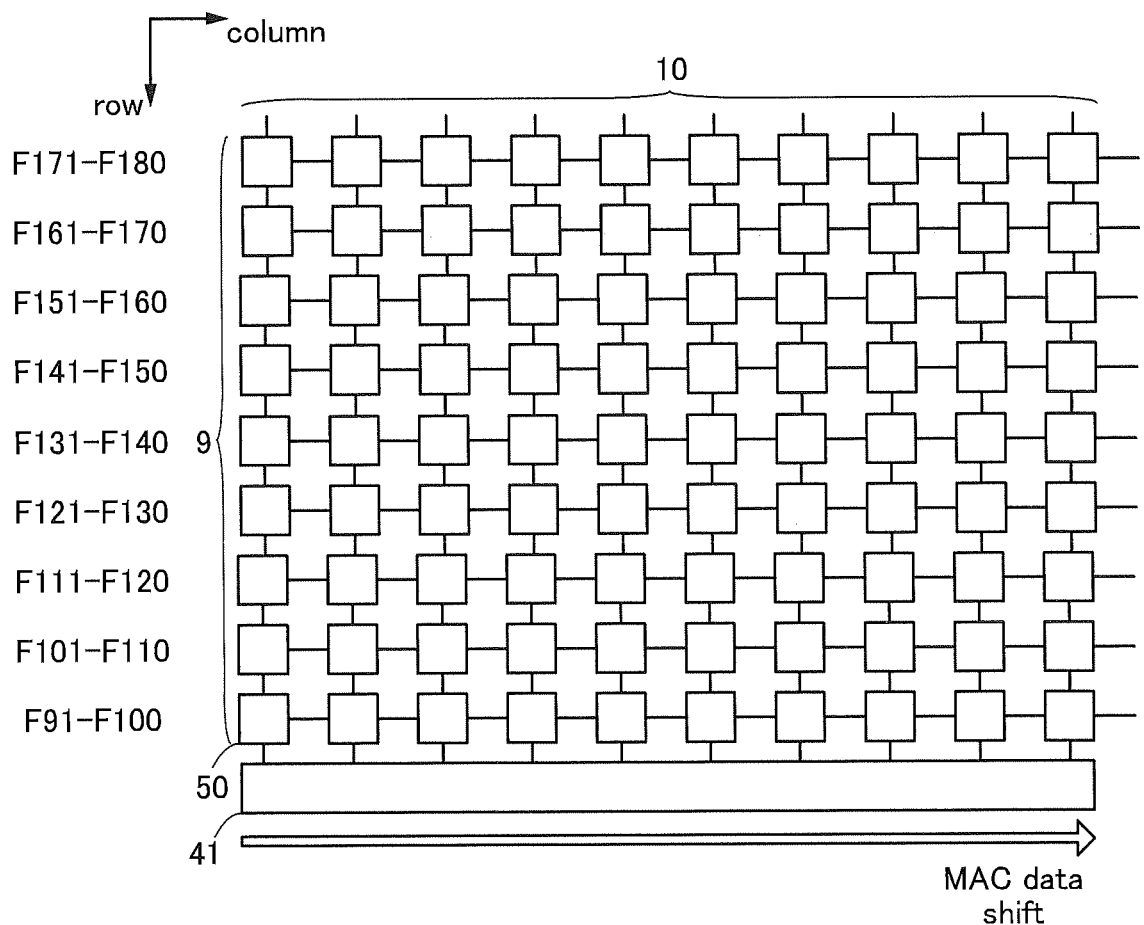
FIGS. 23A and 23B are diagrams for describing a neural network circuit.

The fully connected operation process 77 shown in FIGS. 22(A) and 22(B) is performed using 9×10 arithmetic circuits 50 in the product-sum operation circuit 40 shown in FIG. 10. In FIG. 23(A), the 9×10 arithmetic circuits 50 are arranged in a matrix, and the row direction and the column direction are shown. The column direction is a shift (MAC data shift) direction of product-sum operation data obtained from input data and weight data. FIG. 23(A) also illustrates the adder circuit 41.

In FIG. 23(A), the 81 pieces of data 90 are set in different arithmetic circuits 50. That is, in FIG. 23(A), the data are set such that data "1" to "9" are set in the arithmetic circuits 50 in the respective columns in the ninth row and "10" to "18" in the arithmetic circuits 50 in the respective columns in the eighth row. Data is not set (or "0" may be set) in the arithmetic circuits 50 in each column in the tenth row. In other words, multiplication data is zero, and an addition to addition data to be input is also zero.

In addition, in FIG. 23(A), in the arithmetic circuits 50 in the first row in the row direction, the weight data groups of F171 to F180 are set in the respective columns. Similarly, in FIG. 23(A), in the arithmetic circuits 50 in the second row in the row direction, the weight data groups of F161 to F170 are set in the respective columns. Also in the arithmetic circuits 50 in the third and subsequent rows, the weight data groups of F161 to F170 are set in the respective columns. In the arithmetic circuits 50 in the tenth column, blank data is set, and data is not given as data or a filter.

Note that as illustrated in FIG. 22(B), F91 to F180 need nine weight data groups (e.g., <F91, F101, ( . . . ), F171>, <F92, F102, ( . . . ), F172>, and <F100, F110, ( . . . ), F180>) for each channel when the fully connected operation process is performed. In the architecture of FIG. 23(A), the fully connected operation process is performed by performing product-sum operations with the use of a plurality of weight data groups and then adding the obtained data. Massively parallel fully connected operation processing can be efficiently performed with a small number of arithmetic circuits.

For example, in the context "11", weight data groups are set such that F171 weight data is set in the arithmetic circuit 50 in the first row and the first column, F172 weight data in the arithmetic circuit 50 in the first row and the second column, and F173 weight data in the arithmetic circuit 50 in the first row and the third column. A weight data group is set such that F179 weight data is set in the arithmetic circuit 50 in the first row and the ninth column; data and a weight data group are not set in the first row and the tenth column but F180 is made related thereto. In the context "12" and the following contexts, the weight data groups corresponding to the arithmetic circuits 50 are shifted in the column direction. The weight data group corresponding to the arithmetic circuit 50 in the tenth column returns to the first column. For example, in the context "12", weight data groups are set such that F180 weight data is set in the arithmetic circuit 50 in the first row and the first column, F171 weight data in the arithmetic circuit 50 in the first row and the second column, and F172 weight data in the arithmetic circuit 50 in the first row and the third column. The weight data that is set can be switched to weight data of another filter by context switching. A weight data group is set such that F178 weight data is set in the arithmetic circuit 50 in the first row and the ninth column; data and a weight data group are not set in the first row and the tenth column but F179 is made related thereto.

The weight data that is set can be switched to weight data of another weight data group by context switching. The context is switched until the weight data groups are shifted through the 10 columns of the arithmetic circuits. That is, the context is sequentially switched from the context "11" to "20".

The product-sum operation data obtained by shifting the arithmetic result data is read out to the adder circuit 41. The adder circuit 41 adds the product-sum operation data in one column. The thus obtained data corresponds to data after the fully connected operation process.

Figure 23B:
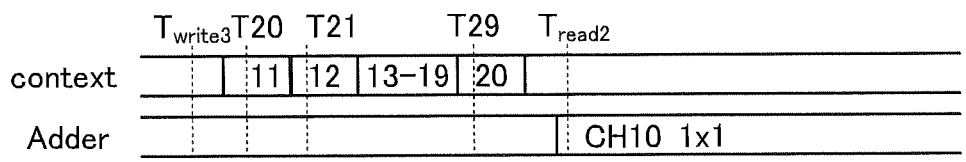

The summary of the above-described operation in FIG. 23(A) can be represented as in FIG. 23(B).

When the fully connected operation process 77 is performed, the context signal context switches the context from the context "11" to "20" sequentially to execute product-sum operations of 81 pieces of data "1" to "81" and different weight data groups. After the data "1" to "81" are set in the arithmetic circuits 50 at Time $T_{write3}$, the context is sequentially switched from the context "11" to "20" at Time T20 to T29. After the product-sum operation results of the 81 pieces of data "1" to "81" and the nine weight data groups are obtained in each of the arithmetic circuits 50, they are read out to the adder circuit 41 at Time $T_{read2}$ and data (CH10 1×1) obtained by the product-sum operation processing is obtained.

A more specific example is described with reference to FIG. 24 to FIG. 26.

FIG. 24(A) is a diagram visualizing the input data held in the arithmetic circuits 50 at Time $T_{write3}$. As illustrated in FIG. 24(A), the 81 pieces of data "1" to "81" are set in the arithmetic circuits 50 in the respective rows and columns. In the arithmetic circuits 50 in each row in the tenth column, "0" is shown as blank data. Note that a set of weight data is written to the memory 52 in the arithmetic circuit 50. The set of weight data is switched in response to context switching.

FIG. 24(B) is a diagram visualizing the data held in the arithmetic circuit 50 at Time T20. At time T20, the context "11" is set by switching of the context signal, and a weight data group for performing multiplication in the following arithmetic circuits 50 is set as shown in FIG. 24(B). An arrow in the column direction indicates the shift direction of multiplication data or addition data obtained by adding addition data of the previous column to the multiplication data. "F171" and the like written between the arithmetic circuits 50 in one row represent a weight data group for the product-sum operation with F171. Data obtained by the arithmetic operation is added to addition data of the previous column, and the resulting data is output as addition data to the arithmetic circuit 50 in the data shift direction.

For example, when the description is made with a focus on the operation in the arithmetic circuits 50 in the first row, the first-column arithmetic circuit 50 in which the data "73" is held performs arithmetic operation with F171. The obtained data is added to data output from the tenth-column arithmetic circuit 50 (0 in this case), and the resulting data is output to the second-column arithmetic circuit 50. At the same time, the second-column arithmetic circuit 50 in which the data "74" is held performs arithmetic operation with F172. The obtained data is added to the data output from the first-column arithmetic circuit 50, and the resulting data is output to the third-column arithmetic circuit 50. The arithmetic circuits 50 in the third column to the eighth column also perform an arithmetic operation of data and F173 to F178 and output the obtained data to the arithmetic circuits 50. At the same time, the ninth-column arithmetic circuit 50 in which the data "81" is held performs an arithmetic operation with F179. The obtained data is added to the data output from the eighth-column arithmetic circuit 50, and the resulting data is output to the tenth-column arithmetic circuit 50. At the same time, the tenth-column arithmetic circuit 50 in which data is not held cannot obtain multiplication data because of blank data. In other words, addition data output from the tenth-column arithmetic circuit 50 remains the same as the addition data output from the ninth-column arithmetic circuit 50.

FIG. 25(A) is a diagram visualizing the input data held in the arithmetic circuit 50 at Time T21. At time T21, the context "12" is set by switching of the context signal, and a weight data group for performing multiplication in the following arithmetic circuits 50 is set as shown in FIG. 25(A).

For example, when the description is made with a focus on the operation in the arithmetic circuits 50 in the first row, the first-column arithmetic circuit 50 in which the data "73" is held performs an arithmetic operation with F180. The obtained data is added to the data output from the tenth-column arithmetic circuit 50 (0 in this case), and the resulting data is output to the second-column arithmetic circuit 50. At the same time, the second-column arithmetic circuit 50 in which the data "74" is held performs an arithmetic operation with F171. The obtained data is added to the data output from the first-column arithmetic circuit 50 (in this case, the multiplication data of the data "73" and F171, obtained at Time T21), and the resulting data is output to the third-column arithmetic circuit 50. The arithmetic circuits 50 in the third column to the eighth column also perform an arithmetic operation of data and F172 to F177 and output the obtained data to the arithmetic circuits 50. At the same time, the ninth-column arithmetic circuit 50 in which the data "81" is held performs an arithmetic operation with F178. The obtained data is added to the data output from the eighth-column arithmetic circuit 50 (in this case, the multiplication data of the data "80" and F178, obtained at Time T21), and the resulting data is output to the tenth-column arithmetic circuit 50. At the same time, the tenth-column arithmetic circuit 50 in which data is not held cannot obtain multiplication data because of blank data. In other words, data output from the tenth-column arithmetic circuit 50 remains the same as the data output from the ninth-column arithmetic circuit 50 (in this case, the multiplication data of the data "81" and F179, obtained at Time T21).

From Time T22 to Time T28, the contexts "13" to "19" are set by switching of the context signal, weight data for performing multiplication in the following arithmetic circuits 50 is set, an arithmetic operation of the held data and the weight data group is performed, and the obtained data is output to the arithmetic circuits 50.

FIG. 25(B) is a diagram visualizing the input data held in the arithmetic circuit 50 at Time T29. At time T29, the context "20" is set by switching of the context signal, and a weight data group for performing multiplication in the following arithmetic circuits 50 is set as shown in FIG. 25(B).

For example, when the description is made with a focus on the operation in the arithmetic circuits 50 in the first row, the first-column arithmetic circuit 50 in which the data "73" is held performs an arithmetic operation with F172. The obtained data is added to the data output from the tenth-column arithmetic circuit 50 (in this case, the results of product-sum operations of a combination of the data "74" to "81" and F171 and F173 to F180), and the resulting data is output to the second-column arithmetic circuit 50. At the same time, the second-column arithmetic circuit 50 in which the data "74" is held performs an arithmetic operation with F173. The obtained data is added to the data output from the first-column arithmetic circuit 50 (in this case, the results of product-sum operations of a combination of the data "73" and the data "75" to "81" and F171, F172, and F174 to F180), and the resulting data is output to the third-column arithmetic circuit 50. The arithmetic circuits 50 in the third column to the eighth column also perform an arithmetic operation of data and F174 to F178 and output the obtained data to the arithmetic circuits 50. At the same time, the ninth-column arithmetic circuit 50 in which the data "81" is held performs an arithmetic operation with F180. The obtained data is added to the data output from the eighth-column arithmetic circuit 50 (in this case, the results of product-sum operations of a combination of the data "73" to "80" and F171 to F179), and the resulting data is output to the tenth-column arithmetic circuit 50. At the same time, the tenth-column arithmetic circuit 50 in which data is not held cannot obtain multiplication data because of blank data. In other words, data output from the tenth-column arithmetic circuit 50 remains the same as the data output from the ninth-column arithmetic circuit 50 (in this case, the results of product-sum operations of a combination of the data "73" to "81" and F171 to F179).

The arithmetic circuits 50 in the second row to the ninth column also perform an arithmetic operation with F91 to F170 and output the obtained data to the arithmetic circuits 50. In other words, the arithmetic circuits 50 in the state at Time T29 hold the results of the product-sum operation of the data held in each row and the weight data groups that are held in each row and obtained by switching the context signal.

FIG. 26 is a diagram visualizing the operation at Time $T_{read2}$. An arrow in the row direction indicates the shift direction of the product-sum operation data obtained from T20 to T29. As illustrated in FIG. 26, at Time $T_{read2}$, the product-sum operation data held in the first to ninth rows are sequentially shifted to the adder circuit 41, and the sum of the obtained data is obtained in each column. The obtained data is processed with a ReLU in the arithmetic unit 23 outside the product-sum operation circuit 40, whereby fully connected data is obtained.

In the structure of the neural network circuit of this embodiment, by switching the operation in accordance with the configuration of data to be input, the configurations of a filter and a weight data group, and the like, multiplication data and addition data can be efficiently generated in each arithmetic circuit and product-sum operations can be efficiently conducted. Therefore, a problem of the increase in circuit size of a neural network circuit, accompanied by the increase in input data, weight data, and the like, can be solved. In other words, product-sum operations for different processes can be performed using the same circuit; thus, circuit resources can be effectively utilized.

Embodiment 2

This embodiment will show an example of an IC into which the neural network circuit described in the above embodiment is incorporated (a neural network system IC).

As the neural network circuit described in the above embodiment, the arithmetic circuit 50 including a multiplier circuit and an adder circuit that are formed of Si transistors and a memory circuit using an OS transistor can be integrated into one die.

Figure 27:
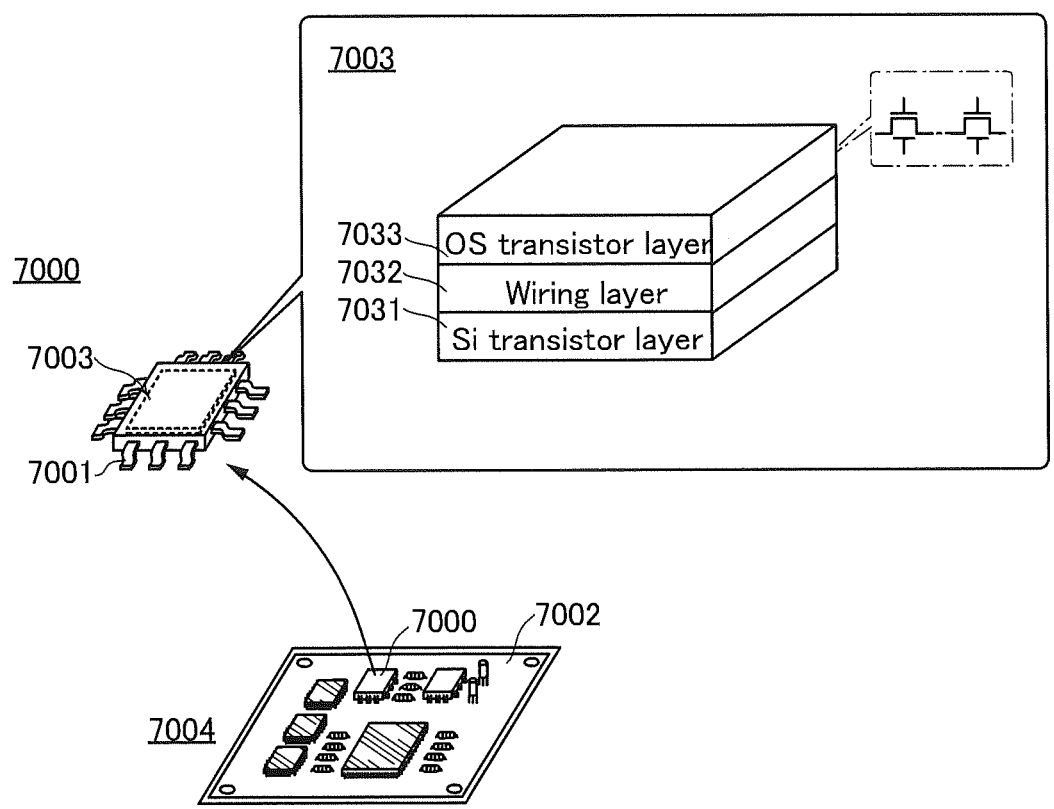
FIG. 27 is a schematic perspective view illustrating a structure example of an IC into which a neural network system is incorporated.

FIG. 27 illustrates an example of an IC incorporating a neural network circuit. A neural network system IC 7000 illustrated in FIG. 27 includes a lead 7001 and a circuit portion 7003. In the circuit portion 7003, various circuits described in the above embodiment are provided on one die. The circuit portion 7003 has a stacked-layer structure that is broadly divided into a Si transistor layer 7031, a wiring layer 7032, and an OS transistor layer 7033. Since the OS transistor layer 7033 can be stacked over the Si transistor layer 7031, the size of the neural network system IC 7000 can be easily reduced.

Although a QFP (Quad Flat Package) is used as a package of the neural network system IC 7000 in FIG. 27, the embodiment of the package is not limited thereto.

All the arithmetic circuits 50 formed of Si transistors and the memory circuits including OS transistors can be formed in the Si transistor layer 7031, the wiring layer 7032, and the OS transistor layer 7033. That is, the elements composed of the above-described neural network circuit can be formed through the same manufacturing process. Accordingly, the number of manufacturing steps for the IC described in this embodiment does not need to be increased even when the number of constituent elements is increased, and the neural network circuit can be incorporated into the IC at low cost.

Embodiment 3

In this embodiment, an OS memory that can be included in the memory circuit of the neural network circuit shown in the above embodiment will be described. In this embodiment, DOSRAM and NOSRAM are described as examples of the OS memory.

<<DOSRAM 1400>>

DOSRAM is described with reference to FIGS. 28(A) to 28(C).

A DOSRAM 1400 illustrated in FIG. 28(A) includes a controller 1405, a row circuit 1410, a column circuit 1415, and an MC-SA array 1420. The row circuit 1410 includes a decoder 1411, a word line driver 1412, a column selector 1413, and a sense amplifier driver 1414. The column circuit 1415 includes a global sense amplifier array 1416 and an input/output circuit 1417. The global sense amplifier array 1416 includes a plurality of global sense amplifiers 1447. The MC-SA array 1420 includes a memory cell array 1422, a sense amplifier array 1423, and global bit lines GBLL and GBLR.

<MC-SA Array 1420>

The MC-SA array 1420 has a stacked-layer structure where the memory cell array 1422 is stacked over the sense amplifier array 1423. The global bit lines GBLL and GBLR are stacked over the memory cell array 1422. The DOSRAM 1400 adopts, as the bit-line structure, a hierarchical bit line structure hierarchized with local bit lines and global bit lines.

The memory cell array 1422 includes N local memory cell arrays 1425<0> to 1425<N-1>, where N is an integer of 2 or more. As illustrated in FIG. 28(B), the local memory cell array 1425 includes a plurality of memory cells 1445, a plurality of word lines WL, and a plurality of bit lines BLL and BLR. The local memory cell array 1425 has an open bit-line architecture in the example of FIG. 28(B) but may have a folded bit-line architecture.

The memory cell 1445 illustrated in FIG. 28(A) includes an OS transistor MO45 and a capacitor C45. The OS transistor MO45 has a function of controlling charging and discharging of the capacitor C45. A gate of the OS transistor MO45 is electrically connected to the word line; its back gate is electrically connected to a wiring BGL; its first terminal is electrically connected to the bit line BLL or BLR; and its second terminal is electrically connected to a first terminal of the capacitor C45. A second terminal of the capacitor C45 is electrically connected to a wiring PCL. The wirings CSL and BGL are power supply lines for supplying a voltage.

The threshold voltage of the OS transistor MO45 can be changed with a voltage of the wiring BGL. For example, the voltage of a terminal B2 may be a fixed voltage (e.g., a negative constant voltage); alternatively, the voltage of the terminal B2 may be changed in response to the operation of the DOSRAM 1400.

The back gate of the OS transistor MO45 may be electrically connected to the gate, the source, or the drain of the OS transistor MO45. Alternatively, the back gate is not necessarily provided in the OS transistor MO45.

The sense amplifier array 1423 includes N local sense amplifier arrays 1426<0> to 426<N−1>. The local sense amplifier array 1426 includes one switch array 1444 and a plurality of sense amplifiers 1446. A bit line pair is electrically connected to the sense amplifier 1446. The sense amplifier 1446 has a function of precharging the bit line pair, a function of amplifying a voltage difference between the bit line pair, and a function of retaining the voltage difference. The switch array 1444 has a function of selecting a bit line pair and establishing electrical continuity between the selected bit line pair and a global bit line.

Here, a bit line pair refers to two bit lines that are compared by a sense amplifier at the same time. A global bit line pair refers to two global bit lines that are compared by a global sense amplifier at the same time. A bit line pair can be referred to as a pair of bit lines, and a global bit line pair can be referred to as a pair of global bit lines. Here, the bit line BLL and the bit line BLR form one bit line pair. The global bit line GBLL and the global bit line GBLR form one global bit line pair. In the following description, the expressions "bit line pair (BLL, BLR)" and "global bit line pair (GBLL, GBLR)" are also used.

<Controller 1405>

The controller 1405 has a function of controlling the overall operation of the DOSRAM 1400. The controller 1405 has a function of performing a logic operation on a command signal that is input from the outside and determining an operation mode, a function of generating control signals for the row circuit 1410 and the column circuit 1415 so that the determined operation mode is executed, a function of retaining an address signal that is input from the outside, and a function of generating an internal address signal.

<Row Circuit 1410>

The row circuit 1410 has a function of driving the MC-SA array 1420. The decoder 1411 has a function of decoding an address signal. The word line driver 1412 generates a selection signal for selecting the word line WL in a row that is to be accessed.

The column selector 1413 and the sense amplifier driver 1414 are circuits for driving the sense amplifier array 1423. The column selector 1413 has a function of generating a selection signal for selecting the bit line in a column that is to be accessed. With the selection signal from the column selector 1413, the switch array 1444 in each local sense amplifier array 1426 is controlled. With the control signal from the sense amplifier driver 1414, the plurality of local sense amplifier arrays 1426 are independently driven.

<Column Circuit 1415>

The column circuit 1415 has a function of controlling the input of data signals WDA[31:0] and a function of controlling the output of data signals RDA[31:0]. The data signals WDA[31:0] are write data signals, and the data signals RDA[31:0] are read data signals.

The global sense amplifier 1447 is electrically connected to the global bit line pair (GBLL, GBLR). The global sense amplifier 1447 has a function of amplifying a voltage difference between the global bit line pair (GBLL, GBLR) and a function of retaining the voltage difference. Data is written to and read from the global bit line pair (GBLL, GBLR) by the input/output circuit 1417.

The write operation of the DOSRAM 1400 is briefly described. Data is written to the global bit line pair by the input/output circuit 1417. The data of the global bit line pair is retained by the global sense amplifier array 1416. By the switch array 1444 of the local sense amplifier array 1426 specified by an address, the data of the global bit line pair is written to the bit line pair of a target column. The local sense amplifier array 1426 amplifies the written data and retains the amplified data. In the specified local memory cell array 1425, the word line WL of a target row is selected by the row circuit 1410, and the data retained at the local sense amplifier array 1426 is written to the memory cell 1445 of the selected row.

The read operation of the DOSRAM 1400 is briefly described. One row of the local memory cell array 1425 is specified by an address signal. In the specified local memory cell array 1425, the word line WL of a target row is in a selected state, and data of the memory cell 1445 is written to the bit line. A voltage difference between the bit line pair of each column is detected as data and retained by the local sense amplifier array 1426. Among the data retained in the local sense amplifier array 1426, the data of a column specified by the address is written to the global bit line pair by the switch array 1444. The global sense amplifier array 1416 determines and retains the data of the global bit line pair. The data retained in the global sense amplifier array 1416 is output to the input/output circuit 1417. Thus, the read operation is completed.

Data is rewritten by charging and discharging of the capacitor C45; hence, there is theoretically no limitation on rewrite cycles of the DOSRAM 1400, and data can be written and read with low energy. In addition, the memory cell 1445 has a simple circuit configuration, and thus the capacity can be easily increased. Thus, the DOSRAM 1400 is suitable for a memory device in which a large volume of data is frequently rewritten, for example, a frame memory used for image processing.

The OS transistor MO45 is an OS transistor. Since the off-state current of an OS transistor is extremely low, charge leakage from the capacitor C45 can be inhibited. Thus, the retention time of the DOSRAM 1400 is much longer than that of a DRAM, leading to a reduction in frequency of the refresh rate. Accordingly, power necessary for refresh operation can be reduced in the DOSRAM 1400.

Since the MC-SA array 1420 has a stacked-layer structure, the bit line can be shortened to a length that is close to the length of the local sense amplifier array 1426. A shorter bit line results in a smaller bit line capacitance, which can reduce the storage capacitance of the memory cell 1445. In addition, providing the switch array 1444 in the local sense amplifier array 1426 can reduce the number of long bit lines. For the above reasons, a load to be driven when the DOSRAM 1400 is accessed is reduced.

From the above, the use of the DOSRAM 1400 for the memory 52 shown in the above embodiment can reduce power consumption of the neural network system.

<<NOSRAM>>

NOSRAM is described with reference to FIG. 29 and FIG. 30. Here, a multi-level NOSRAM in which one memory cell stores multi-level data is described.

Figure 29:
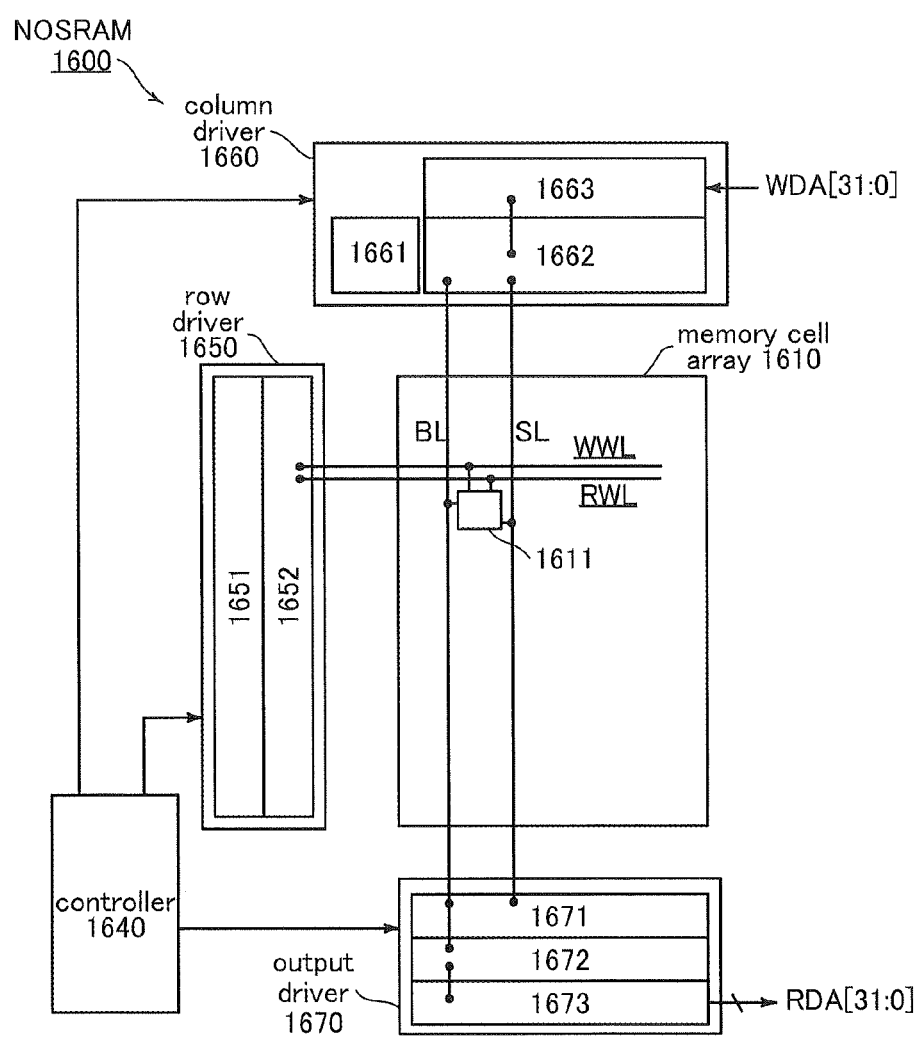
FIG. 29 is a functional block diagram illustrating a structure example of a NOSRAM.

A NOSRAM 1600 shown in FIG. 29 includes a memory cell array 1610, a controller 1640, a row driver 1650, a column driver 1660, and an output driver 1670.

The memory cell array 1610 includes a plurality of memory cells 1611, a plurality of word lines WWL and RWL, bit lines BL, and source lines SL. The word lines WWL are write word lines, and the word lines RWL are read word lines. In the NOSRAM 1600, one memory cell 1611 stores 3-bit (8-level) data.

The controller 1640 controls the NOSRAM 1600 as a whole and writes data WDA[31:0] and reads out data RDA[31:0]. The controller 1640 processes command signals from the outside (e.g., a chip enable signal and a write enable signal) to generate control signals for the row driver 1650, the column driver 1660, and the output driver 1670.

The row driver 1650 has a function of selecting a row to be accessed. The row driver 1650 includes a row decoder 1651 and a word line driver 1652.

The column driver 1660 drives the source lines SL and the bit lines BL. The column driver 1660 includes a column decoder 1661, a write driver 1662, and a DAC (digital-analog converter circuit) 1663.

The DAC 1663 converts 3-bit digital data into an analog voltage. The DAC 1663 converts every three bits of 32-bit data WDA[31:0] into an analog voltage.

The write driver 1662 has a function of precharging the source line SL, a function of bringing the source line SL into an electrically floating state, a function of selecting the source line SL, a function of inputting a write voltage generated by the DAC 1663 to the selected source line SL, a function of precharging the bit line BL, a function of bringing the bit line BL into an electrically floating state, and the like.

The output driver 1670 includes a selector 1671, an ADC (analog-digital converter circuit) 1672, and an output buffer 1673. The selector 1671 selects a source line SL to be accessed and transmits the voltage of the selected source line SL to the ADC 1672. The ADC 1672 has a function of converting an analog voltage into 3-bit digital data. The voltage of the source line SL is converted into 3-bit data in the ADC 1672, and the output buffer 1673 stores the data output from the ADC 1672.

<Memory Cell>

Figure 30A:
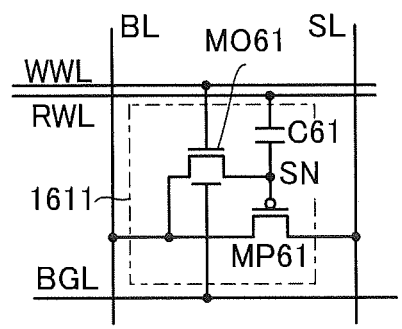
FIGS. 30A-30E are circuit diagrams illustrating structure examples of memory cells.

FIG. 30(A) is a circuit diagram showing a configuration example of the memory cell 1611. The memory cell 1611 is a 2T gain cell, and the memory cell 161 is electrically connected to the word lines WWL and RWL, the bit line BL, the source line SL, and the wiring BGL. The memory cell 1611 includes a node SN, an OS transistor MO61, a transistor MP61, and a capacitor C61. The OS transistor MO61 is a write transistor. The transistor MP61 is a read transistor and is configured with a p-channel Si transistor, for example. The capacitor C61 is a storage capacitor for retaining the voltage of the node SN. The node SN is a data retention node and corresponds to a gate of the transistor MP61 here.

Since the write transistor of the memory cell 1611 is configured with the OS transistor MO61, the NOSRAM 1600 can retain data for a long time.

Figure 30B:
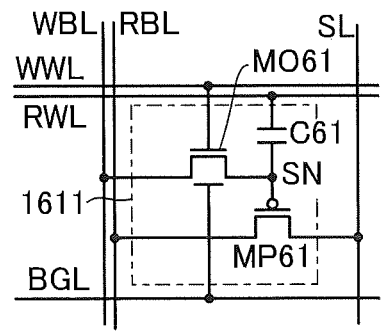

In the example of FIG. 30(A), a common bit line is used for writing and reading; alternatively, a write bit line WBL and a read bit line RBL may be provided as shown in FIG. 30(B).

Figure 30C:
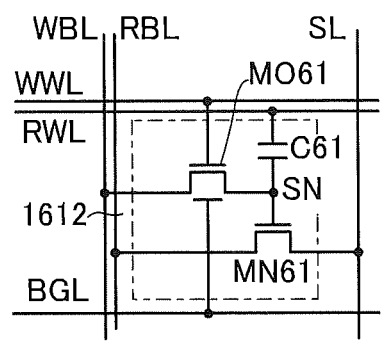
Figure 30D:
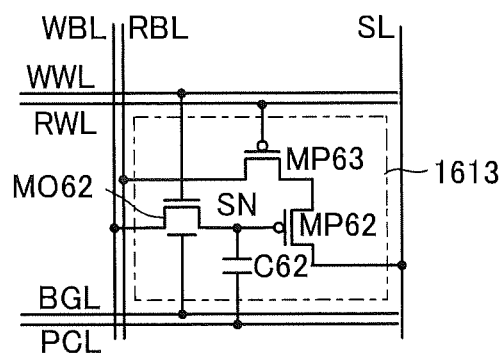
Figure 30E:
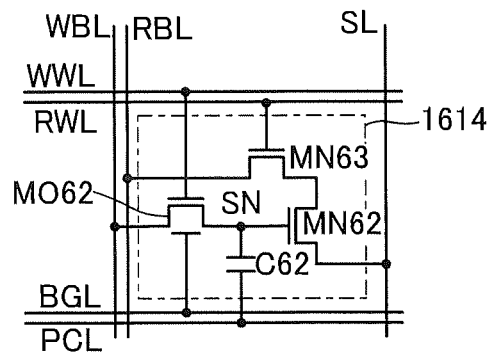

FIG. 30(C) to FIG. 30(E) show other configuration examples of the memory cell. FIG. 30(C) to FIG. 30(E) show examples where the write bit line and the read bit line are provided; however, a bit line shared in writing and reading may be provided as in FIG. 30(A).

A memory cell 1612 shown in FIG. 30(C) is a modification example of the memory cell 1611 where the read transistor is changed into an n-channel transistor (MN61). The transistor MN61 may be an OS transistor or a Si transistor.

In the memory cells 1611 and 1612, the OS transistors MO61 may be an OS transistor without a back gate.

A memory cell 1613 shown in FIG. 30(D) is a 3T gain cell and is electrically connected to the word lines WWL and RWL, the bit lines WBL and RBL, the source line SL, and the wirings BGL and PCL. The memory cell 1613 includes the node SN, an OS transistor MO62, a transistor MP62, a transistor MP63, and a capacitor C62. The OS transistor MO62 is a write transistor. The transistor MP62 is a read transistor, and the transistor MP63 is a selection transistor.

A memory cell 1614 shown in FIG. 30(E) is a modification example of the memory cell 1613 where the read transistor and the selection transistor are changed into n-channel transistors (MN62 and MN63). Each of the transistors MN62 and MN63 may be an OS transistor or a Si transistor.

The OS transistors provided in the memory cells 1611 to 1614 may each be a transistor without a back gate or a transistor with a back gate.

Data is rewritten by charging and discharging of the capacitor C61; hence, there is theoretically no limitation on rewrite cycles of the NOSRAM 1600, and data can be written and read with low energy. Furthermore, since data can be retained for a long time, the refresh rate can be reduced. Thus, the DOSRAM 1400 is suitable for a memory device in which a large volume of data is frequently rewritten, for example, a frame memory used for image processing.

The use of the NOSRAM 1600 for the memory 52 shown in the above embodiment can reduce power consumption of the neural network circuit.

Notes on the Description in this Specification and the Like

The following are notes on the description of the foregoing embodiments and the structures in the embodiments.

One embodiment of the present invention can be constituted by appropriately combining the structure described in an embodiment with any of the structures described in the other embodiments. In addition, in the case where a plurality of structure examples are described in one embodiment, some of the structure examples can be combined as appropriate.

Note that a content (or part thereof) in an embodiment can be applied to, combined with, or replaced with another content in the same embodiment and/or a content (or part thereof) in another embodiment or other embodiments.

Note that in each embodiment, a content described in the embodiment is a content described with reference to a variety of diagrams or a content described with text in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be created.

In this specification and the like, components are classified on the basis of the functions and shown as blocks independent of each other in block diagrams. However, in an actual circuit or the like, it may be difficult to separate components on the basis of the functions, so that one circuit may be associated with a plurality of functions or several circuits may be associated with one function. Therefore, the segmentation of a block in the block diagrams is not limited by any of the components described in the specification, and can be differently determined as appropriate depending on situations.

In drawings, the size, the layer thickness, or the region is determined arbitrarily for description convenience, and therefore is not limited to the illustrated scale. Note that the drawings are schematically shown for clarity, and embodiments of the present invention are not limited to shapes or values shown in the drawings. For example, the following can be included: variation in signal, voltage, or current due to noise or difference in timing.

In this specification and the like, the terms "one of a source and a drain" (or a first electrode or a first terminal) and "the other of the source and the drain" (or a second electrode or a second terminal) are used to describe the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, the term such as an "electrode" or a "wiring" does not limit a function of the component. For example, an "electrode" is used as part of a "wiring" in some cases, and vice versa. Furthermore, the term "electrode" or "wiring" can also mean formation of a plurality of electrodes or wirings formed in an integrated manner.

In this specification and the like, voltage and potential can be interchanged with each other as appropriate. The term "voltage" refers to a potential difference from a reference potential. When the reference potential is a ground voltage, for example, "voltage" can be replaced with "potential". The ground potential does not necessarily mean 0 V. Potentials are relative values, and a potential applied to a wiring or the like is sometimes changed depending on the reference potential.

Note that in this specification and the like, the terms such as "film" and "layer" can be interchanged with each other depending on the case or circumstances. For example, the term "conductive layer" can be changed into the term "conductive film" in some cases. For another example, the term "insulating film" can be changed into the term "insulating layer" in some cases.

In this specification and the like, a switch is conducting (on) or not conducting (off) to determine whether current flows therethrough or not. Alternatively, a switch has a function of selecting and changing a current path.

For example, an electrical switch or a mechanical switch can be used. That is, a switch is not limited to a certain element and can be any element capable of controlling current.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined.

Note that in the case where a transistor is used as a switch, the "on state" of the transistor refers to a state in which a source and a drain of the transistor can be regarded as being electrically short-circuited. In addition, the "off state" of the transistor refers to a state in which the source and the drain of the transistor can be regarded as being electrically disconnected. In the case where a transistor operates just as a switch, the polarity (conductivity type) of the transistor is not particularly limited.

An example of a mechanical switch is a switch formed using a MEMS (micro electro mechanical systems) technology, such as a digital micromirror device (DMD). Such a switch includes an electrode that can be moved mechanically, and operates by controlling conduction and non-conduction in accordance with movement of the electrode.

In this specification and the like, the channel length refers to, for example, the distance between a source and a drain in a region where a semiconductor (or a portion where current flows in a semiconductor when a transistor is on) and a gate electrode overlap each other, or a region where a channel is formed in a top view of the transistor.

In this specification and the like, the channel width refers to, for example, the length of a portion where a source and a drain face each other in a region where a semiconductor (or a portion where current flows in a semiconductor when a transistor is on) and a gate electrode overlap each other, or a region where a channel is formed.

In this specification and the like, the expression "A and B are connected" means the case where A and B are electrically connected as well as the case where A and B are directly connected. Here, the expression "A and B are electrically connected" means the case where electric signals can be transmitted and received between A and B when an object having any electric action exists between A and B.

This application is based on Japanese Patent Application Serial No. 2017-080355 filed with Japan Patent Office on Apr. 14, 2017, the entire contents of which are hereby incorporated herein by reference.

REFERENCE NUMERALS

C45 capacitor
C61 capacitor
C62 capacitor
MN61 transistor
MN62 transistor
MO45 OS transistor
MO61 OS transistor
MO62 OS transistor
MP61 transistor
MP62 transistor
MP63 transistor
T0 Time
T1 Time
T2 Time
T3 Time
T4 Time
T7 Time
T8 Time
T10 Time
T11 Time
T12 Time
T17 Time
T18 Time
T19 Time
T20 Time
T21 Time
T22 Time
T28 Time
T29 Time
$T_{write2}$ Time 10 data processing circuit
11 interface
12 clock generator circuit
13 master controller
14 data driver
15 word driver
20 neural network circuit
21 memory controller
22 memory
23 arithmetic unit
24 data input/output circuit
30 arithmetic portion
31 register circuit
40 product-sum operation circuit
41 adder circuit
50 arithmetic circuit
50_A arithmetic circuit
50_n arithmetic circuit
50_1 arithmetic circuit
50_2 arithmetic circuit
50_3 arithmetic circuit
50A arithmetic circuit
51 input register
52 memory
53 multiplier circuit
54 adder circuit
55A output register
55B output register
56A switching circuit
56B switching circuit
57A memory element
57B memory element
57C memory element
58 power switch
61 input layer
62 intermediate layer
63 output layer
70 input process
71 input data
72 operation process
73 operation process
74 pooling operation process
75 operation process
76 pooling operation process
77 fully connected operation process
81 filter
82 filter
82_1 filter
82_2 filter
82_3 filter
82_9 filter
83 symbol
84 data
85 filter
86 data
87 data
88 filter
89 data
90 data
90_A arithmetic circuit
91 filter
92 data
93 input data
94_1 data
94_2 data
94_3 data
94_4 data
95_1 product-sum operation data
95_2 product-sum operation data
95_3 product-sum operation data
95_4 product-sum operation data
96 memory cell
97 transistor
98 transistor
161 memory cell
1400 DOSRAM
1405 controller
1410 row circuit
1411 decoder
1412 word line driver
1413 column selector
1414 sense amplifier driver
1415 column circuit
1416 global sense amplifier array
1417 input/output circuit
1420 MC-SA array
1422 memory cell array
1423 sense amplifier array
1425 local memory cell array
1426 local sense amplifier array
1444 switch array
1445 memory cell
1446 sense amplifier
1447 global sense amplifier
1600 NOSRAM
1610 memory cell array
1611 memory cell
1611-1614 memory cell
1612 memory cell
1613 memory cell
1614 memory cell
1640 controller
1650 row driver
1651 row decoder
1652 word line driver
1660 column driver
1661 column decoder
1662 driver
1663 DAC
1670 output driver
1671 selector
1672 ADC
1673 output buffer
7000 neural network system IC
7001 lead
7003 circuit portion
7031 Si transistor layer
7032 wiring layer
7033 OS transistor layer

What is claimed is:

1. A neural network circuit comprising a first arithmetic circuit, a second arithmetic circuit, and a third arithmetic circuit,
  wherein:
  each of the first to third arithmetic circuits comprises a first register, a memory, a multiplier circuit, an adder circuit, and a switching circuit,
  the first register is configured to hold input data,
  the memory is configured to store weight data,
  the memory is configured to output weight data varying in response to switching of a context signal that is input to the memory, the multiplier circuit included in the first arithmetic circuit is configured to output multiplication data corresponding to a product of the weight data and the input data, the adder circuit included in the first arithmetic circuit is configured to output first addition data, the first addition data corresponds to a sum of the multiplication data and second addition data output from the adder circuit included in the second arithmetic circuit, the first addition data is data output to the adder circuit included in the third arithmetic circuit, the switching circuit is configured to control electrical connection between the first register and the multiplier circuit, and electrical connection in the switching circuit is configured to be controlled in response to switching of the context signal.

2. The neural network circuit according to claim 1, wherein a programmable switch element is included between the first arithmetic circuit and the second arithmetic circuit, and between the second arithmetic circuit and the third arithmetic circuit, and wherein the programmable switch element is configured to switch electrical connection between the first to third arithmetic circuits by switching of the context signal.

3. The neural network circuit according to claim 1, wherein the memory comprises a transistor, and wherein the transistor comprises an oxide semiconductor in a channel formation region.

4. The neural network circuit according to claim 1, wherein the first addition data and the second addition data are data used for convolutional operation processing or fully connected operation processing.

5. The neural network circuit according to claim 1, wherein the first arithmetic circuit comprises a second register, and wherein the second register is configured to hold the first addition data or the multiplication data.

6. The neural network circuit according to claim 1, further comprising a circuit configured to perform activation function processing and a circuit configured to perform pooling operation processing.

7. A neural network circuit comprising a first arithmetic circuit, a second arithmetic circuit, and a third arithmetic circuit, wherein:

the first arithmetic circuit comprises a first register, a first memory, a first multiplier circuit, and a first adder circuit, the second arithmetic circuit comprises a second register, a second memory, a second multiplier circuit, and a second adder circuit, the third arithmetic circuit comprises a third register, a third memory, a third multiplier circuit, and a third adder circuit, the first to third registers are configured to hold respective first to third input data, each of the first to third memories is configured to store weight data, the first to third memories are configured to output respective first to third weight data varying in response to switching of a context signal that is input to each of the first to third memories, the first multiplier circuit is configured to output first multiplication data corresponding to a product of the first weight data and the first input data, the second multiplier circuit is configured to output second multiplication data corresponding to a product of the second weight data and the second input data, the third multiplier circuit is configured to output third multiplication data corresponding to a product of the third weight data and the third input data, the first adder circuit is configured to output first addition data, the second adder circuit is configured to output second addition data, the third adder circuit is configured to output third addition data, the second addition data corresponds to a sum of the second multiplication data and the first addition data, the first addition data comprises the first multiplication data and the third addition data, the first arithmetic circuit comprises a switching circuit, the switching circuit is configured to control electrical connection between the first register and the first multiplier circuit, and electrical connection in the switching circuit is configured to be controlled in response to switching of the context signal.

8. The neural network circuit according to claim 7, wherein a programmable switch element is included between the first to third arithmetic circuits, and wherein the programmable switch element is configured to switch electrical connection between the first to third arithmetic circuits by switching of the context signal.

9. The neural network circuit according to claim 7, wherein each of the first to third memories comprises a transistor, and wherein the transistor comprises an oxide semiconductor in a channel formation region.

10. The neural network circuit according to claim 7, wherein the first to third addition data are data used for convolutional operation processing or fully connected operation processing.

11. The neural network circuit according to claim 7, wherein:

the first arithmetic circuit comprises a fourth register, the second arithmetic circuit comprises a fifth register, the third arithmetic circuit comprises a sixth register, the fourth register is configured to hold the first addition data or the first multiplication data, the fifth register is configured to hold the second addition data or the second multiplication data, and the sixth register is configured to hold the third addition data or the third multiplication data.

12. The neural network circuit according to claim 7, further comprising a circuit configured to perform activation function processing and a circuit configured to perform pooling operation processing.

* * * * *